US009584701B2

(12) United States Patent
Kelly

(10) Patent No.: US 9,584,701 B2
(45) Date of Patent: Feb. 28, 2017

(54) IMAGE PROCESSING SYSTEM AND METHOD

(71) Applicant: PANAMORPH, INC., Colorado Springs, CO (US)

(72) Inventor: Shawn L. Kelly, Colorado Springs, CO (US)

(73) Assignee: PANAMORPH, INC., Colorado Springs, CO (US)

( * ) Notice: Subject to any disclaimer, the term of this patent is extended or adjusted under 35 U.S.C. 154(b) by 0 days.

(21) Appl. No.: 15/109,664

(22) PCT Filed: Jan. 6, 2015

(86) PCT No.: PCT/US2015/010387
§ 371 (c)(1),
(2) Date: Jul. 5, 2016

(87) PCT Pub. No.: WO2015/131872
PCT Pub. Date: Sep. 11, 2015

(65) Prior Publication Data
US 2016/0373613 A1 Dec. 22, 2016

Related U.S. Application Data

(60) Provisional application No. 61/924,197, filed on Jan. 6, 2014, provisional application No. 61/938,436, filed
(Continued)

(51) Int. Cl.
G06K 9/00 (2006.01)
G06K 9/40 (2006.01)
(Continued)

(52) U.S. Cl.
CPC ............ H04N 1/56 (2013.01); *G06T 9/00* (2013.01); *H04N 19/00* (2013.01);
(Continued)

(58) Field of Classification Search
CPC ........ H04N 1/56; H04N 19/00; H04N 19/186; H04N 19/44; H04N 19/60; G06T 9/00
(Continued)

(56) References Cited

U.S. PATENT DOCUMENTS 6,349,152 B1* 2/2002 Chaddha ............. H03M 7/3082
375/E7.049
7,366,319 B2* 4/2008 Andrew ................. H04N 19/70
341/56
(Continued)

FOREIGN PATENT DOCUMENTS

WO 2012153224 A1 11/2012

OTHER PUBLICATIONS

Crocker, Lee, Boulay, Paul and Morra, Mike; "DHALF.TXT", Internet document downloaded on Dec. 23, 2913, 25 pages.
(Continued)

Primary Examiner — Kanjibhai Patel
(74) Attorney, Agent, or Firm — Raggio & Dinnin, P.C.

(57) ABSTRACT

A selected color component (R, G, B) for each of a plurality of image pixels (32, P) of an image cell (42, C) is encoded to form a corresponding color component ($E_R$, $E_G$, $E_B$) of a corresponding plurality of encoded pixels (40, $P_E$) in one-to-one correspondence with the image pixels (32, P). A bit length of each color component ($E_R$, $E_G$, $E_B$) of an encoded pixel (40, $P_E$) is less than that of a corresponding image pixel (32, P). The encoded pixels (40, $P_E$) are subsequently decoded to generate a corresponding decoded image cell (64, $C'_k$) containing decoded image pixels (62, P') in one-to-one correspondence with both the encoded pixels (40, $P_E$) and with the original image pixels (32, P), of the same bit length as the original image pixels (32, P), and containing extended color information in excess of the corresponding base color information contained in the corresponding most-
(Continued)

significant (MS) portions of the color components (R, G, B) of the original image pixels (32, P) having the same bit length as the encoded color components ($E_R$, $E_G$, $E_B$).

17 Claims, 41 Drawing Sheets

Related U.S. Application Data on Feb. 11, 2014, provisional application No. 61/942,146, filed on Feb. 20, 2014, provisional application No. 61/945,782, filed on Feb. 27, 2014, provisional application No. 61/978,778, filed on Apr. 11, 2014.

(51) Int. Cl.
| | |
|---|---|
| *H04N 1/56* | (2006.01) |
| *H04N 19/186* | (2014.01) |
| *H04N 19/44* | (2014.01) |
| *G06T 9/00* | (2006.01) |
| *H04N 19/00* | (2014.01) |
| *H04N 19/60* | (2014.01) |

(52) U.S. Cl.
CPC ........... *H04N 19/186* (2014.11); *H04N 19/44* (2014.11); *H04N 19/60* (2014.11)

(58) Field of Classification Search
USPC .......................................... 382/162, 232–233
See application file for complete search history.

(56) References Cited

U.S. PATENT DOCUMENTS

| | | | | |
|---|---|---|---|---|
| 7,412,104 | B2* | 8/2008 | Talapov | H04N 19/50 375/E7.144 |
| 7,856,147 | B2* | 12/2010 | Srinidhi | H04N 19/46 382/233 |
| 2007/0165035 | A1 | 7/2007 | Duluk, Jr. et al. | |
| 2010/0034287 | A1 | 2/2010 | Roman | |
| 2011/0316973 | A1 | 12/2011 | Miller et al. | |

OTHER PUBLICATIONS

Ford, Adrian and Roberts, Alan; "Colour Space Conversions", Aug. 11, 1998, Internet document downloaded on Feb. 26, 2014 from http://poynton.com/PDFs/coloureq.pdf, 31 pages.

Zervos, Michalis, "Image dithering in Matlab", Internet document downloaded on Feb. 11, 2014 from http://michal.is/projects/image-dithering-in-matlab/, 13 pages.

Unknown Author, "Ordered Dithering", Internet document downloaded on Feb. 11, 2014 from http://www.visgraf.impa.br/Courses/ip00/proj/Dithering1/ordered_dithering.html, 2 pages.

Wikipedia, the free encylopedia, "Ordered dithering", Internet document downloaded on Feb. 11, 2014, 3 pages.

Wikipedia, the free encylopedia, "Chrominance", Internet document downloaded on Feb. 24, 2014 from http://en.wikipedia.org/wiki/Chrominance, 3 pages.

Wikipedia, the free encylopedia, "Luma (video)", Internet document downloaded on Feb. 24, 2014 from http://en.wikipedia.org/wiki/Luma_(video), 2 pages.

PCT-ISA/US, International Search Report and Written Opinion of International Searching Authority & Search History in International Application No. PCT/US15/10387, Apr. 10, 2015, 10 pages.

* cited by examiner

| | 1 | 2 | 3 | 4 | 5 | 6 | 7 | 8 | 9 | 10 |
|---|---|---|---|---|---|---|---|---|---|---|
| 1 | B(1,1) | B(1,2) | B(1,3) | B(1,4) | B(1,5) | B(1,6) | B(1,7) | B(1,8) | B(1,9) | B(1,10) |
| 2 | B(2,1) | B(2,2) | B(2,3) | B(2,4) | B(2,5) | B(2,6) | B(2,7) | B(2,8) | B(2,9) | B(2,10) |
| 3 | B(3,1) | B(3,2) | B(3,3) | B(3,4) | B(3,5) | B(3,6) | B(3,7) | B(3,8) | B(3,9) | B(3,10) |
| 4 | B(4,1) | B(4,2) | B(4,3) | B(4,4) | B(4,5) | B(4,6) | B(4,7) | B(4,8) | B(4,9) | B(4,10) |
| 5 | B(5,1) | B(5,2) | B(5,3) | B(5,4) | B(5,5) | B(5,6) | B(5,7) | B(5,8) | B(5,9) | B(5,10) |
| 6 | B(6,1) | B(6,2) | B(6,3) | B(6,4) | B(6,5) | B(6,6) | B(6,7) | B(6,8) | B(6,9) | B(6,10) |
| 7 | B(7,1) | B(7,2) | B(7,3) | B(7,4) | B(7,5) | B(7,6) | B(7,7) | B(7,8) | B(7,9) | B(7,10) |
| 8 | B(8,1) | B(8,2) | B(8,3) | B(8,4) | B(8,5) | B(8,6) | B(8,7) | B(8,8) | B(8,9) | B(8,10) |
| 9 | B(9,1) | B(9,2) | B(9,3) | B(9,4) | B(9,5) | B(9,6) | B(9,7) | B(9,8) | B(9,9) | B(9,10) |
| 10 | B(10,1) | B(10,2) | B(10,3) | B(10,4) | B(10,5) | B(10,6) | B(10,7) | B(10,8) | B(10,9) | B(10,10) |

FIG. 8

| p\q | 1 | 2 | 3 | 4 | 5 |
|---|---|---|---|---|---|
| | 1 | 2 | 3 | 4 | 5 | 6 | 7 | 8 | 9 | 10 |

| | 1 | 2 | 3 | 4 | 5 | 6 | 7 | 8 | 9 | 10 |
|---|---|---|---|---|---|---|---|---|---|---|
| 1 | Q(1,1) | Q(1,2) | Q(1,3) | Q(1,4) | Q(1,5) | Q(1,6) | Q(1,7) | Q(1,8) | Q(1,9) | Q(1,10) |
| 2 | Q(2,1) | Q(2,2) | Q(2,3) | Q(2,4) | Q(2,5) | Q(2,6) | Q(2,7) | Q(2,8) | Q(2,9) | Q(2,10) |
| 3 | Q(3,1) | Q(3,2) | Q(3,3) | Q(3,4) | Q(3,5) | Q(3,6) | Q(3,7) | Q(3,8) | Q(3,9) | Q(3,10) |
| 4 | Q(4,1) | Q(4,2) | Q(4,3) | Q(4,4) | Q(4,5) | Q(4,6) | Q(4,7) | Q(4,8) | Q(4,9) | Q(4,10) |
| 5 | Q(5,1) | Q(5,2) | Q(5,3) | Q(5,4) | Q(5,5) | Q(5,6) | Q(5,7) | Q(5,8) | Q(5,9) | Q(5,10) |
| 6 | Q(6,1) | Q(6,2) | Q(6,3) | Q(6,4) | Q(6,5) | Q(6,6) | Q(6,7) | Q(6,8) | Q(6,9) | Q(6,10) |
| 7 | Q(7,1) | Q(7,2) | Q(7,3) | Q(7,4) | Q(7,5) | Q(7,6) | Q(7,7) | Q(7,8) | Q(7,9) | Q(7,10) |
| 8 | Q(8,1) | Q(8,2) | Q(8,3) | Q(8,4) | Q(8,5) | Q(8,6) | Q(8,7) | Q(8,8) | Q(8,9) | Q(8,10) |
| 9 | Q(9,1) | Q(9,2) | Q(9,3) | Q(9,4) | Q(9,5) | Q(9,6) | Q(9,7) | Q(9,8) | Q(9,9) | Q(9,10) |
| 10 | Q(10,1) | Q(10,2) | Q(10,3) | Q(10,4) | Q(10,5) | Q(10,6) | Q(10,7) | Q(10,8) | Q(10,9) | Q(10,10) |

*FIG. 9*

|  | J1=2q-1 | j2=2q |
|---|---|---|
| i1=2p-1 | C(1,1)=Q(i1, j1) | C(1,2)=Q(i1, j2) |
| i2=2p | C(2,1)=Q(i2, j1) | C(2,2)=Q(i2, j2) |

*FIG. 10a*

|  | 1 | 2 |
|---|---|---|
| 1 | UL=C(1,1): [MS, LS] | UR=C(1,2): [MS, LS] |
| 2 | LL=C(2,1): [MS, LS] | LR=C(2,2): [MS, LS] |

*FIG. 10b*

|  | 1 | 2 |
|---|---|---|
| 1 | $C^{MS}(1,1) \| C^{LS}(1,1)$ | $C^{MS}(1,2) \| C^{LS}(1,2)$ |
| 2 | $C^{MS}(2,1) \| C^{LS}(2,1)$ | $C^{MS}(2,2) \| C^{LS}(2,2)$ |

*FIG. 11*

|  | 1 | 2 |
|---|---|---|
| 1 | $C^{MS}(1,1)$ | $C^{MS}(1,2)$ |
| 2 | $C^{MS}(2,1)$ | $C^{MS}(2,2)$ |

*FIG. 12*

|  | 1 | 2 |
|---|---|---|
| 1 | $C^{LS}(1,1)$ | $C^{LS}(1,2)$ |
| 2 | $C^{LS}(2,1)$ | $C^{LS}(2,2)$ |

*FIG. 15*

|  | 1 | 2 |
|---|---|---|
| 1 | D(1,1) | D(1,2) |
| 2 | D(2,1) | D(2,2) |

| ID | Dither Pattern | Cell Error Energy | Dithered Energy |
|---|---|---|---|
| 1 | T T / T T | 0-3 | 0 |
| 2 | B T / T T | 4-7 | 16 |
| 3 | T B / T T | 8-11 | 16 |
| 4 | T T / T B | 12-15 | 16 |
| 5 | T T / B T | 16-19 | 16 |
| 6 | B B / T T | 20-23 | 32 |
| 7 | T B / T B | 24-27 | 32 |
| 8 | T T / B B | 28-31 | 32 |
| 9 | B T / B T | 32-35 | 32 |
| 10 | B T / T B | 36-39 | 32 |
| 11 | T B / B T | 40-43 | 32 |
| 12 | B B / T B | 44-47 | 48 |
| 13 | T B / B B | 48-51 | 48 |
| 14 | B T / B B | 52-55 | 48 |
| 15 | B B / B T | 56-59 | 48 |
| 16 | B B / B B | 60 | 64 |

|  | j1=2q-1 | j2=2q |
|---|---|---|
| i1=2p-1 | D(1,1)=Q(i1, j1) | D(1,2)=Q(i1, j2) |
| i2=2p | D(2,1)=Q(i2, j1) | D(2,2)=Q(i2, j2) |

|  | 1 | 2 |
|---|---|---|
| 1 | UL=D(1,1) | UR=D(1,2) |
| 2 | LL=D(2,1) | LR=D(2,2) |

|  | 1 | 2 |
|---|---|---|
| 1 | C'(1,1) = C'$^{MS}$(1,1) ∥ C'$^{LS}$ | C'(1,2) = C'$^{MS}$(1,2) ∥ C'$^{LS}$ |
| 2 | C'(2,1) ) = C'$^{MS}$(2,1) ∥ C'$^{LS}$ | C'(2,2) = C'$^{MS}$(2,2) ∥ C'$^{LS}$ |

| ID | Cell Energy | PV | #1's | 8 | 7 | 6 | 5 | 4 | 3 | 2 | 1 |
|---|---|---|---|---|---|---|---|---|---|---|---|
| 1 | 0 to 7 | 0 | 0 | T | T | T | T | T | T | T | T |
| 2 | 8 to 15 | 1 | 1 | T | T | T | T | T | T | T | B |
| 3 | 16 to 23 | 2 | 1 | T | T | T | T | T | T | B | T |
| 4 | 24 to 31 | 4 | 1 | T | T | T | T | T | B | T | T |
| 5 | 32 to 39 | 8 | 1 | T | T | T | T | B | T | T | T |
| 6 | 40 to 47 | 16 | 1 | T | T | T | B | T | T | T | T |
| 7 | 48 to 55 | 32 | 1 | T | T | B | T | T | T | T | T |
| 8 | 56 to 63 | 64 | 1 | T | B | T | T | T | T | T | T |
| 9 | 64 to 71 | 128 | 1 | B | T | T | T | T | T | T | T |
| 10 | 72 to 79 | 3 | 2 | T | T | T | T | T | T | B | B |
| 11 | 80 to 87 | 5 | 2 | T | T | T | T | T | B | T | B |
| 12 | 88 to 95 | 6 | 2 | T | T | T | T | T | B | B | T |
| 13 | 96 to 103 | 9 | 2 | T | T | T | T | B | T | T | B |
| 14 | 104 to 111 | 10 | 2 | T | T | T | T | B | T | B | T |
| 15 | 112 to 119 | 12 | 2 | T | T | T | T | B | B | T | T |
| 16 | 120 to 127 | 17 | 2 | T | T | T | B | T | T | T | B |
| 17 | 128 to 135 | 18 | 2 | T | T | T | B | T | T | B | T |
| 18 | 136 to 143 | 20 | 2 | T | T | T | B | T | B | T | T |
| 19 | 144 to 151 | 24 | 2 | T | T | T | B | B | T | T | T |
| 20 | 152 to 159 | 33 | 2 | T | T | B | T | T | T | T | B |
| 21 | 160 to 167 | 34 | 2 | T | T | B | T | T | T | B | T |
| 22 | 168 to 175 | 36 | 2 | T | T | B | T | T | B | T | T |
| 23 | 176 to 183 | 40 | 2 | T | T | B | T | B | T | T | T |
| 24 | 184 to 191 | 48 | 2 | T | T | B | B | T | T | T | T |
| 25 | 192 to 199 | 65 | 2 | T | B | T | T | T | T | T | B |
| 26 | 200 to 207 | 66 | 2 | T | B | T | T | T | T | B | T |
| 27 | 208 to 215 | 68 | 2 | T | B | T | T | T | B | T | T |
| 28 | 216 to 223 | 72 | 2 | T | B | T | T | B | T | T | T |
| 29 | 224 to 231 | 80 | 2 | T | B | T | B | T | T | T | T |
| 30 | 232 to 239 | 96 | 2 | T | B | B | T | T | T | T | T |
| 31 | 240 to 247 | 129 | 2 | B | T | T | T | T | T | T | B |
| 32 | 248 to 255 | 130 | 2 | B | T | T | T | T | T | B | T |
| 33 | 256 to 263 | 132 | 2 | B | T | T | T | T | B | T | T |
| 34 | 264 to 271 | 136 | 2 | B | T | T | T | B | T | T | T |
| 35 | 272 to 279 | 144 | 2 | B | T | T | B | T | T | T | T |
| 36 | 280 to 287 | 160 | 2 | B | T | B | T | T | T | T | T |
| 37 | 288 to 295 | 192 | 2 | B | B | T | T | T | T | T | T |
| 38 | 296 to 303 | 7 | 3 | T | T | T | T | T | B | B | B |
| 39 | 304 to 311 | 11 | 3 | T | T | T | T | B | T | B | B |
| 40 | 312 to 319 | 13 | 3 | T | T | T | T | B | B | T | B |
| 41 | 320 to 327 | 14 | 3 | T | T | T | T | B | B | B | T |
| 42 | 328 to 335 | 19 | 3 | T | T | T | B | T | T | B | B |
| 43 | 336 to 343 | 21 | 3 | T | T | T | B | T | B | T | B |

FIG. 36b

| ID | Cell Energy | PV | #1's | 8 | 7 | 6 | 5 | 4 | 3 | 2 | 1 |
|---|---|---|---|---|---|---|---|---|---|---|---|
| 44 | 344 to 351 | 22 | 3 | T | T | T | B | T | B | B | T |
| 45 | 352 to 359 | 25 | 3 | T | T | T | B | B | T | T | B |
| 46 | 360 to 367 | 26 | 3 | T | T | T | B | B | T | B | T |
| 47 | 368 to 375 | 28 | 3 | T | T | T | B | B | B | T | T |
| 48 | 376 to 383 | 35 | 3 | T | T | B | T | T | T | B | B |
| 49 | 384 to 391 | 37 | 3 | T | T | B | T | T | B | T | B |
| 50 | 392 to 399 | 38 | 3 | T | T | B | T | T | B | B | T |
| 51 | 400 to 407 | 41 | 3 | T | T | B | T | B | T | T | B |
| 52 | 408 to 415 | 42 | 3 | T | T | B | T | B | T | B | T |
| 53 | 416 to 423 | 44 | 3 | T | T | B | T | B | B | T | T |
| 54 | 424 to 431 | 49 | 3 | T | T | B | B | T | T | T | B |
| 55 | 432 to 439 | 50 | 3 | T | T | B | B | T | T | B | T |
| 56 | 440 to 447 | 52 | 3 | T | T | B | B | T | B | T | T |
| 57 | 448 to 455 | 56 | 3 | T | T | B | B | B | T | T | T |
| 58 | 456 to 463 | 67 | 3 | T | B | T | T | T | T | B | B |
| 59 | 464 to 471 | 69 | 3 | T | B | T | T | T | B | T | B |
| 60 | 472 to 479 | 70 | 3 | T | B | T | T | T | B | B | T |
| 61 | 480 to 487 | 73 | 3 | T | B | T | T | B | T | T | B |
| 62 | 488 to 495 | 74 | 3 | T | B | T | T | B | T | B | T |
| 63 | 496 to 503 | 76 | 3 | T | B | T | T | B | B | T | T |
| 64 | 504 to 511 | 81 | 3 | T | B | T | B | T | T | T | B |
| 65 | 512 to 519 | 82 | 3 | T | B | T | B | T | T | B | T |
| 66 | 520 to 527 | 84 | 3 | T | B | T | B | T | B | T | T |
| 67 | 528 to 535 | 88 | 3 | T | B | T | B | B | T | T | T |
| 68 | 536 to 543 | 97 | 3 | T | B | B | T | T | T | T | B |
| 69 | 544 to 551 | 98 | 3 | T | B | B | T | T | T | B | T |
| 70 | 552 to 559 | 100 | 3 | T | B | B | T | T | B | T | T |
| 71 | 560 to 567 | 104 | 3 | T | B | B | T | B | T | T | T |
| 72 | 568 to 575 | 112 | 3 | T | B | B | B | T | T | T | T |
| 73 | 576 to 583 | 131 | 3 | B | T | T | T | T | T | B | B |
| 74 | 584 to 591 | 133 | 3 | B | T | T | T | T | B | T | B |
| 75 | 592 to 599 | 134 | 3 | B | T | T | T | T | B | B | T |
| 76 | 600 to 607 | 137 | 3 | B | T | T | T | B | T | T | B |
| 77 | 608 to 615 | 138 | 3 | B | T | T | T | B | T | B | T |
| 78 | 616 to 623 | 140 | 3 | B | T | T | T | B | B | T | T |
| 79 | 624 to 631 | 145 | 3 | B | T | T | B | T | T | T | B |
| 80 | 632 to 639 | 146 | 3 | B | T | T | B | T | T | B | T |
| 81 | 640 to 647 | 148 | 3 | B | T | T | B | T | B | T | T |
| 82 | 648 to 655 | 152 | 3 | B | T | T | B | B | T | T | T |
| 83 | 656 to 663 | 161 | 3 | B | T | B | T | T | T | T | B |
| 84 | 664 to 671 | 162 | 3 | B | T | B | T | T | T | B | T |
| 85 | 672 to 679 | 164 | 3 | B | T | B | T | T | B | T | T |
| 86 | 680 to 687 | 168 | 3 | B | T | B | T | B | T | T | T |

FIG. 36c

| ID | Cell Energy | PV | #1's | 8 | 7 | 6 | 5 | 4 | 3 | 2 | 1 |
|---|---|---|---|---|---|---|---|---|---|---|---|
| 87 | 688 to 695 | 176 | 3 | B | T | B | B | T | T | T | T |
| 88 | 696 to 703 | 193 | 3 | B | B | T | T | T | T | T | B |
| 89 | 704 to 711 | 194 | 3 | B | B | T | T | T | T | B | T |
| 90 | 712 to 719 | 196 | 3 | B | B | T | T | T | B | T | T |
| 91 | 720 to 727 | 200 | 3 | B | B | T | T | B | T | T | T |
| 92 | 728 to 735 | 208 | 3 | B | B | T | B | T | T | T | T |
| 93 | 736 to 743 | 224 | 3 | B | B | B | T | T | T | T | T |
| 94 | 744 to 751 | 15 | 4 | T | T | T | T | B | B | B | B |
| 95 | 752 to 759 | 23 | 4 | T | T | T | B | T | B | B | B |
| 96 | 760 to 767 | 27 | 4 | T | T | T | B | B | T | B | B |
| 97 | 768 to 775 | 29 | 4 | T | T | T | B | B | B | T | B |
| 98 | 776 to 783 | 30 | 4 | T | T | T | B | B | B | B | T |
| 99 | 784 to 791 | 39 | 4 | T | T | B | T | T | B | B | B |
| 100 | 792 to 799 | 43 | 4 | T | T | B | T | B | T | B | B |
| 101 | 800 to 807 | 45 | 4 | T | T | B | T | B | B | T | B |
| 102 | 808 to 815 | 46 | 4 | T | T | B | T | B | B | B | T |
| 103 | 816 to 823 | 51 | 4 | T | T | B | B | T | T | B | B |
| 104 | 824 to 831 | 53 | 4 | T | T | B | B | T | B | T | B |
| 105 | 832 to 839 | 54 | 4 | T | T | B | B | T | B | B | T |
| 106 | 840 to 847 | 57 | 4 | T | T | B | B | B | T | T | B |
| 107 | 848 to 855 | 58 | 4 | T | T | B | B | B | T | B | T |
| 108 | 856 to 863 | 60 | 4 | T | T | B | B | B | B | T | T |
| 109 | 864 to 871 | 71 | 4 | T | B | T | T | T | B | B | B |
| 110 | 872 to 879 | 75 | 4 | T | B | T | T | B | T | B | B |
| 111 | 880 to 887 | 77 | 4 | T | B | T | T | B | B | T | B |
| 112 | 888 to 895 | 78 | 4 | T | B | T | T | B | B | B | T |
| 113 | 896 to 903 | 83 | 4 | T | B | T | B | T | T | B | B |
| 114 | 904 to 911 | 85 | 4 | T | B | T | B | T | B | T | B |
| 115 | 912 to 919 | 86 | 4 | T | B | T | B | T | B | B | T |
| 116 | 920 to 927 | 89 | 4 | T | B | T | B | B | T | T | B |
| 117 | 928 to 935 | 90 | 4 | T | B | T | B | B | T | B | T |
| 118 | 936 to 943 | 92 | 4 | T | B | T | B | B | B | T | T |
| 119 | 944 to 951 | 99 | 4 | T | B | B | T | T | T | B | B |
| 120 | 952 to 959 | 101 | 4 | T | B | B | T | T | B | T | B |
| 121 | 960 to 967 | 102 | 4 | T | B | B | T | T | B | B | T |
| 122 | 968 to 975 | 105 | 4 | T | B | B | T | B | T | T | B |
| 123 | 976 to 983 | 106 | 4 | T | B | B | T | B | T | B | T |
| 124 | 984 to 991 | 108 | 4 | T | B | B | T | B | B | T | T |
| 125 | 992 to 999 | 113 | 4 | T | B | B | B | T | T | T | B |
| 126 | 1000 to 1007 | 114 | 4 | T | B | B | B | T | T | B | T |
| 127 | 1008 to 1015 | 116 | 4 | T | B | B | B | T | B | T | T |
| 128 | 1016 to 1023 | 120 | 4 | T | B | B | B | B | T | T | T |
| 129 | 1024 to 1031 | 135 | 4 | B | T | T | T | T | B | B | B |

FIG. 36d

| ID | Cell Energy | PV | #1's | 8 | 7 | 6 | 5 | 4 | 3 | 2 | 1 |
|---|---|---|---|---|---|---|---|---|---|---|---|
| 130 | 1032 to 1039 | 139 | 4 | B | T | T | T | B | T | B | B |
| 131 | 1040 to 1047 | 141 | 4 | B | T | T | T | B | B | T | B |
| 132 | 1048 to 1055 | 142 | 4 | B | T | T | T | B | B | B | T |
| 133 | 1056 to 1063 | 147 | 4 | B | T | T | B | T | T | B | B |
| 134 | 1064 to 1071 | 149 | 4 | B | T | T | B | T | B | T | B |
| 135 | 1072 to 1079 | 150 | 4 | B | T | T | B | T | B | B | T |
| 136 | 1080 to 1087 | 153 | 4 | B | T | T | B | B | T | T | B |
| 137 | 1088 to 1095 | 154 | 4 | B | T | T | B | B | T | B | T |
| 138 | 1096 to 1103 | 156 | 4 | B | T | T | B | B | B | T | T |
| 139 | 1104 to 1111 | 163 | 4 | B | T | B | T | T | T | B | B |
| 140 | 1112 to 1119 | 165 | 4 | B | T | B | T | T | B | T | B |
| 141 | 1120 to 1127 | 166 | 4 | B | T | B | T | T | B | B | T |
| 142 | 1128 to 1135 | 169 | 4 | B | T | B | T | B | T | T | B |
| 143 | 1136 to 1143 | 170 | 4 | B | T | B | T | B | T | B | T |
| 144 | 1144 to 1151 | 172 | 4 | B | T | B | T | B | B | T | T |
| 145 | 1152 to 1159 | 177 | 4 | B | T | B | B | T | T | T | B |
| 146 | 1160 to 1167 | 178 | 4 | B | T | B | B | T | T | B | T |
| 147 | 1168 to 1175 | 180 | 4 | B | T | B | B | T | B | T | T |
| 148 | 1176 to 1183 | 184 | 4 | B | T | B | B | B | T | T | T |
| 149 | 1184 to 1191 | 195 | 4 | B | B | T | T | T | B | B | B |
| 150 | 1192 to 1199 | 197 | 4 | B | B | T | T | T | B | T | B |
| 151 | 1200 to 1207 | 198 | 4 | B | B | T | T | T | B | B | T |
| 152 | 1208 to 1215 | 201 | 4 | B | B | T | T | B | T | T | B |
| 153 | 1216 to 1223 | 202 | 4 | B | B | T | T | B | T | B | T |
| 154 | 1224 to 1231 | 204 | 4 | B | B | T | T | B | B | T | T |
| 155 | 1232 to 1239 | 209 | 4 | B | B | T | B | T | T | T | B |
| 156 | 1240 to 1247 | 210 | 4 | B | B | T | B | T | T | B | T |
| 157 | 1248 to 1255 | 212 | 4 | B | B | T | B | T | B | T | T |
| 158 | 1256 to 1263 | 216 | 4 | B | B | T | B | B | T | T | T |
| 159 | 1264 to 1271 | 225 | 4 | B | B | B | T | T | T | T | B |
| 160 | 1272 to 1279 | 226 | 4 | B | B | B | T | T | T | B | T |
| 161 | 1280 to 1287 | 228 | 4 | B | B | B | T | T | B | T | T |
| 162 | 1288 to 1295 | 232 | 4 | B | B | B | T | B | T | T | T |
| 163 | 1296 to 1303 | 240 | 4 | B | B | B | B | T | T | T | T |
| 164 | 1304 to 1311 | 31 | 5 | T | T | T | B | B | B | B | B |
| 165 | 1312 to 1319 | 47 | 5 | T | T | T | B | T | B | B | B |
| 166 | 1320 to 1327 | 55 | 5 | T | T | B | B | T | B | B | B |
| 167 | 1328 to 1335 | 59 | 5 | T | T | B | B | B | T | B | B |
| 168 | 1336 to 1343 | 61 | 5 | T | T | B | B | B | B | T | B |
| 169 | 1344 to 1351 | 62 | 5 | T | T | B | B | B | B | B | T |
| 170 | 1352 to 1359 | 79 | 5 | T | B | T | T | B | B | B | B |
| 171 | 1360 to 1367 | 87 | 5 | T | B | T | B | T | B | B | B |
| 172 | 1368 to 1375 | 91 | 5 | T | B | T | B | B | T | B | B |

| ID | Cell Energy | | | PV | #1's | 8 | 7 | 6 | 5 | 4 | 3 | 2 | 1 |
|---|---|---|---|---|---|---|---|---|---|---|---|---|---|
| 173 | 1376 | to | 1383 | 93 | 5 | T | B | T | B | B | B | T | B |
| 174 | 1384 | to | 1391 | 94 | 5 | T | B | T | B | B | B | B | T |
| 175 | 1392 | to | 1399 | 103 | 5 | T | B | B | T | T | B | B | B |
| 176 | 1400 | to | 1407 | 107 | 5 | T | B | B | T | B | T | B | B |
| 177 | 1408 | to | 1415 | 109 | 5 | T | B | B | T | B | B | T | B |
| 178 | 1416 | to | 1423 | 110 | 5 | T | B | B | T | B | B | B | T |
| 179 | 1424 | to | 1431 | 115 | 5 | T | B | B | B | T | T | B | B |
| 180 | 1432 | to | 1439 | 117 | 5 | T | B | B | B | T | B | T | B |
| 181 | 1440 | to | 1447 | 118 | 5 | T | B | B | B | T | B | B | T |
| 182 | 1448 | to | 1455 | 121 | 5 | T | B | B | B | B | T | T | B |
| 183 | 1456 | to | 1463 | 122 | 5 | T | B | B | B | B | T | B | T |
| 184 | 1464 | to | 1471 | 124 | 5 | T | B | B | B | B | B | T | T |
| 185 | 1472 | to | 1479 | 143 | 5 | B | T | T | T | B | B | B | B |
| 186 | 1480 | to | 1487 | 151 | 5 | B | T | T | B | T | B | B | B |
| 187 | 1488 | to | 1495 | 155 | 5 | B | T | T | B | B | T | B | B |
| 188 | 1496 | to | 1503 | 157 | 5 | B | T | T | B | B | B | T | B |
| 189 | 1504 | to | 1511 | 158 | 5 | B | T | T | B | B | B | B | T |
| 190 | 1512 | to | 1519 | 167 | 5 | B | T | B | T | T | B | B | B |
| 191 | 1520 | to | 1527 | 171 | 5 | B | T | B | T | B | T | B | B |
| 192 | 1528 | to | 1535 | 173 | 5 | B | T | B | T | B | B | T | B |
| 193 | 1536 | to | 1543 | 174 | 5 | B | T | B | T | B | B | B | T |
| 194 | 1544 | to | 1551 | 179 | 5 | B | T | B | B | T | T | B | B |
| 195 | 1552 | to | 1559 | 181 | 5 | B | T | B | B | T | B | T | B |
| 196 | 1560 | to | 1567 | 182 | 5 | B | T | B | B | T | B | B | T |
| 197 | 1568 | to | 1575 | 185 | 5 | B | T | B | B | B | T | T | B |
| 198 | 1576 | to | 1583 | 186 | 5 | B | T | B | B | B | T | B | T |
| 199 | 1584 | to | 1591 | 188 | 5 | B | T | B | B | B | B | T | T |
| 200 | 1592 | to | 1599 | 199 | 5 | B | B | T | T | T | B | B | B |
| 201 | 1600 | to | 1607 | 203 | 5 | B | B | T | T | B | T | B | B |
| 202 | 1608 | to | 1615 | 205 | 5 | B | B | T | T | B | B | T | B |
| 203 | 1616 | to | 1623 | 206 | 5 | B | B | T | T | B | B | B | T |
| 204 | 1624 | to | 1631 | 211 | 5 | B | B | T | B | T | T | B | B |
| 205 | 1632 | to | 1639 | 213 | 5 | B | B | T | B | T | B | T | B |
| 206 | 1640 | to | 1647 | 214 | 5 | B | B | T | B | T | B | B | T |
| 207 | 1648 | to | 1655 | 217 | 5 | B | B | T | B | B | T | T | B |
| 208 | 1656 | to | 1663 | 218 | 5 | B | B | T | B | B | T | B | T |
| 209 | 1664 | to | 1671 | 220 | 5 | B | B | T | B | B | B | T | T |
| 210 | 1672 | to | 1679 | 227 | 5 | B | B | B | T | T | T | B | B |
| 211 | 1680 | to | 1687 | 229 | 5 | B | B | B | T | T | B | T | B |
| 212 | 1688 | to | 1695 | 230 | 5 | B | B | B | T | T | B | B | T |
| 213 | 1696 | to | 1703 | 233 | 5 | B | B | B | T | B | T | T | B |
| 214 | 1704 | to | 1711 | 234 | 5 | B | B | B | T | B | T | B | T |
| 215 | 1712 | to | 1719 | 236 | 5 | B | B | B | T | B | B | T | T |

FIG. 36e

| ID | Cell Energy | | | PV | #1's | 8 | 7 | 6 | 5 | 4 | 3 | 2 | 1 |
|---|---|---|---|---|---|---|---|---|---|---|---|---|---|
| 216 | 1720 | to | 1727 | 241 | 5 | B | B | B | B | T | T | T | B |
| 217 | 1728 | to | 1735 | 242 | 5 | B | B | B | B | T | T | B | T |
| 218 | 1736 | to | 1743 | 244 | 5 | B | B | B | B | T | B | T | T |
| 219 | 1744 | to | 1751 | 248 | 5 | B | B | B | B | B | T | T | T |
| 220 | 1752 | to | 1759 | 63 | 6 | T | T | B | B | B | B | B | B |
| 221 | 1760 | to | 1767 | 95 | 6 | T | B | T | B | B | B | B | B |
| 222 | 1768 | to | 1775 | 111 | 6 | T | B | B | T | B | B | B | B |
| 223 | 1776 | to | 1783 | 119 | 6 | T | B | B | B | T | B | B | B |
| 224 | 1784 | to | 1791 | 123 | 6 | T | B | B | B | B | T | B | B |
| 225 | 1792 | to | 1799 | 125 | 6 | T | B | B | B | B | B | T | B |
| 226 | 1800 | to | 1807 | 126 | 6 | T | B | B | B | B | B | B | T |
| 227 | 1808 | to | 1815 | 159 | 6 | B | T | T | B | B | B | B | B |
| 228 | 1816 | to | 1823 | 175 | 6 | B | T | B | T | B | B | B | B |
| 229 | 1824 | to | 1831 | 183 | 6 | B | T | B | B | T | B | B | B |
| 230 | 1832 | to | 1839 | 187 | 6 | B | T | B | B | B | T | B | B |
| 231 | 1840 | to | 1847 | 189 | 6 | B | T | B | B | B | B | T | B |
| 232 | 1848 | to | 1855 | 190 | 6 | B | T | B | B | B | B | B | T |
| 233 | 1856 | to | 1863 | 207 | 6 | B | B | T | T | B | B | B | B |
| 234 | 1864 | to | 1871 | 215 | 6 | B | B | T | B | T | B | B | B |
| 235 | 1872 | to | 1879 | 219 | 6 | B | B | T | B | B | T | B | B |
| 236 | 1880 | to | 1887 | 221 | 6 | B | B | T | B | B | B | T | B |
| 237 | 1888 | to | 1895 | 222 | 6 | B | B | T | B | B | B | B | T |
| 238 | 1896 | to | 1903 | 231 | 6 | B | B | B | T | T | B | B | B |
| 239 | 1904 | to | 1911 | 235 | 6 | B | B | B | T | B | T | B | B |
| 240 | 1912 | to | 1919 | 237 | 6 | B | B | B | T | B | B | T | B |
| 241 | 1920 | to | 1927 | 238 | 6 | B | B | B | T | B | B | B | T |
| 242 | 1928 | to | 1935 | 243 | 6 | B | B | B | B | T | T | B | B |
| 243 | 1936 | to | 1943 | 245 | 6 | B | B | B | B | T | B | T | B |
| 244 | 1944 | to | 1951 | 246 | 6 | B | B | B | B | T | B | B | T |
| 245 | 1952 | to | 1959 | 249 | 6 | B | B | B | B | B | T | T | B |
| 246 | 1960 | to | 1967 | 250 | 6 | B | B | B | B | B | T | B | T |
| 247 | 1968 | to | 1975 | 252 | 6 | B | B | B | B | B | B | T | T |
| 248 | 1976 | to | 1983 | 127 | 7 | T | B | B | B | B | B | B | B |
| 249 | 1984 | to | 1991 | 191 | 7 | B | T | B | B | B | B | B | B |
| 250 | 1992 | to | 1999 | 223 | 7 | B | B | T | B | B | B | B | B |
| 251 | 2000 | to | 2007 | 239 | 7 | B | B | B | T | B | B | B | B |
| 252 | 2008 | to | 2015 | 247 | 7 | B | B | B | B | T | B | B | B |
| 253 | 2016 | to | 2023 | 251 | 7 | B | B | B | B | B | T | B | B |
| 254 | 2024 | to | 2031 | 253 | 7 | B | B | B | B | B | B | T | B |
| 255 | 2032 | to | 2039 | 254 | 7 | B | B | B | B | B | B | B | T |
| 256 | 2040 | | | 255 | 8 | B | B | B | B | B | B | B | B |

FIG. 36f

IMAGE PROCESSING SYSTEM AND METHOD

CROSS-REFERENCE TO RELATED APPLICATIONS

The instant application claims the benefit of the following prior U.S. provisional applications: U.S. Provisional Application Ser. No. 61/924,197 filed on 6 Jan. 2014, U.S. Provisional Application Ser. No. 61/938,436 filed on 11 Feb. 2014, U.S. Provisional Application Ser. No. 61/942,146 filed on 20 Feb. 2014, U.S. Provisional Application Ser. No. 61/945,782 filed on 27 Feb. 2014, and U.S. Provisional Application Ser. No. 61/978,778 filed on 11 Apr. 2014, each of which is incorporated by reference herein in its entirety.

BRIEF DESCRIPTION OF THE DRAWINGS

FIG. 2 illustrates an example of a portion of an extended-color-precision image comprising a 10×10 array of pixels;

FIG. 3 illustrates an image pixel of the extended-color-precision image illustrated in FIG. 2, comprising image data partitioned into most-significant and least-significant data portions.

FIG. 4a illustrates an image pixel formed from the most-significant data portion of the pixel illustrated in FIG. 3;

FIG. 4b illustrates an image pixel formed from the least-significant data portion of the pixel illustrated in FIG. 3;

FIG. 5 illustrates an image formed by extracting the most-significant portions of each component of each pixel of the image illustrated in FIG. 2;

FIG. 7a illustrates a subset of first-color components of the extended-color-precision image illustrated in FIG. 2, partitioned into a plurality of 2×2 cells;

FIG. 7b illustrates a subset of second-color components of the extended-color-precision image illustrated in FIG. 2, partitioned into a plurality of 2×2 cells;

FIG. 7c illustrates a subset of third-color components of the extended-color-precision image illustrated in FIG. 2, partitioned into a plurality of 2×2 cells;

FIG. 8 illustrates a generalized subset of components of the extended-color-precision image illustrated in FIG. 2, 7a, 7b or 7c, for a particular color, partitioned into a plurality of 2×2 cells;

FIG. 9 illustrates a generalized 2×2 cell of the generalized subset of the extended-color-precision image components illustrated in FIG. 8;

FIG. 10a illustrates a first aspect of a generalized 2×2 cell corresponding to the generalized 2×2 cell illustrated in FIG. 9;

FIG. 10b illustrates a second aspect of a generalized 2×2 cell corresponding to the generalized 2×2 cell illustrated in FIG. 9;

FIG. 11 illustrates a generalized 2×2 cell containing the most-significant portion of the data of the generalized 2×2 cell illustrated in FIG. 10b;

FIG. 12 illustrates a generalized 2×2 cell containing the least-significant portion of the data of the generalized 2×2 cell illustrated in FIG. 10b;

FIG. 14 illustrates a table of dithering patterns and associated cell error and dithered energy levels, as used by the encoding processes illustrated in FIGS. 13 and 16, and as used by the decoding processes illustrated in FIGS. 23 and 26;

FIG. 15 illustrates a generalized 2×2 cell containing encoded data values generated from and corresponding to the data illustrated in FIGS. 9-12;

FIG. 16 illustrates an example of a portion of an encoded image comprising a 10×10 array of encoded pixels, generated from and corresponding to the extended-color-precision image illustrated in FIG. 2;

FIG. 19a illustrates a subset of first-color components of the encoded image illustrated in FIG. 17, partitioned into a plurality of 2×2 cells;

FIG. 19b illustrates a subset of second-color components of the encoded image illustrated in FIG. 17, partitioned into a plurality of 2×2 cells;

FIG. 21 illustrates a generalized 2×2 cell of the generalized subset of the encoded image components illustrated in FIG. 20;

FIG. 22 illustrates a generalized 2×2 cell corresponding to the generalized 2×2 cell illustrated in FIG. 21;

FIG. 24 illustrates a generalized 2×2 cell containing decoded data values generated from and corresponding to the data illustrated in FIGS. 21 and 22;

FIG. 25 illustrates an example of a portion of an extended-color-precision decoded image comprising a 10×10 array of pixels, generated from and corresponding to the encoded image illustrated in FIG. 16 and corresponding to the extended-color-precision image illustrated in FIG. 2;

FIGS. 36a-f illustrate a second embodiment of a table of dithering patterns and associated cell error energy levels, as used by the encoding processes illustrated in FIG. 13, and as used by the decoding processes illustrated in FIG. 23;

DESCRIPTION OF EMBODIMENT(S)

Figure 1:
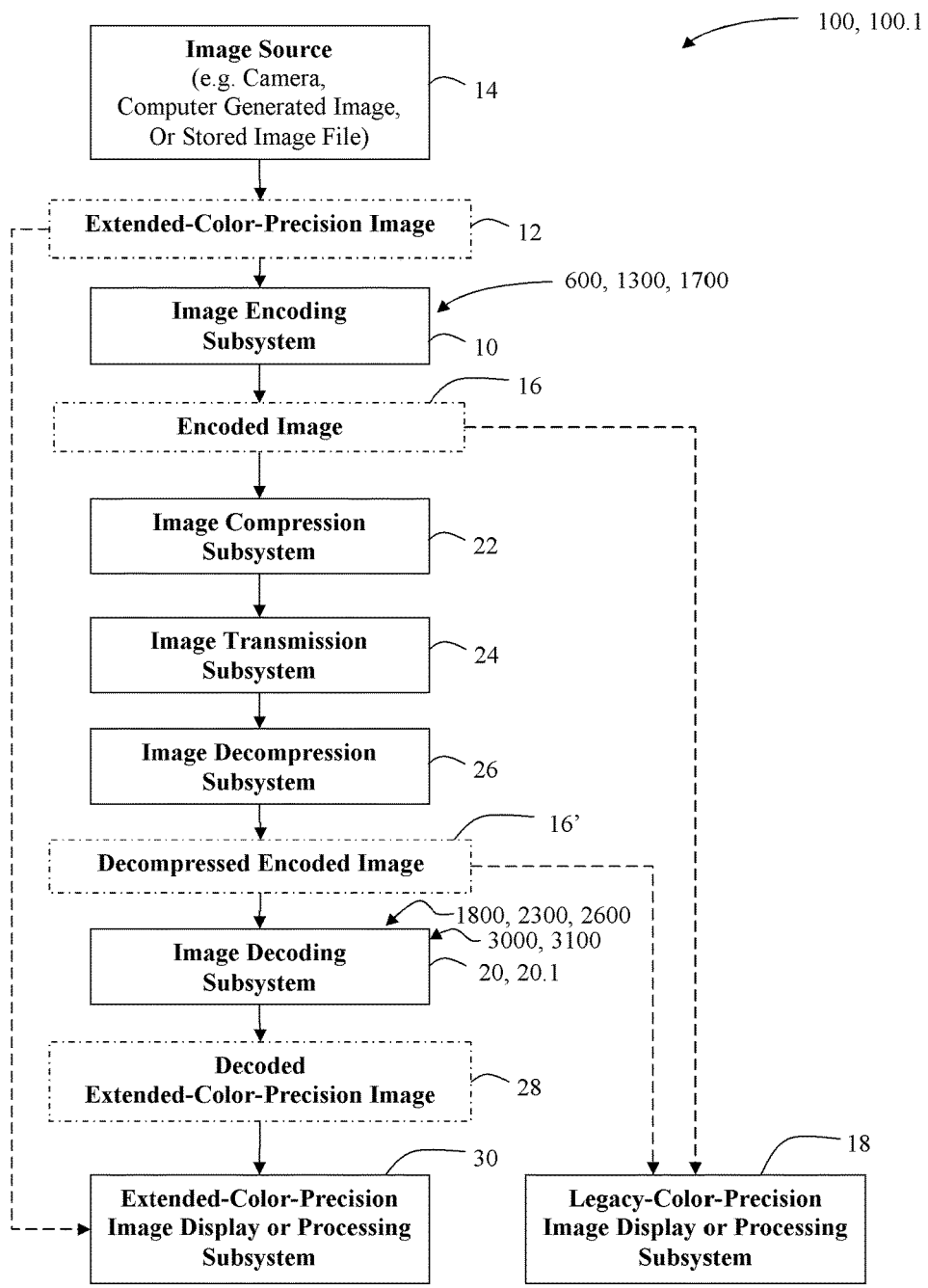
FIG. 1 illustrates a block diagram of a first aspect of an image processing system incorporating image encoding and image decoding subsystems and associated processes.

Many of today's standardized video components work with digital pixel-based images having integer values of 8 bits per each of three visual tri-stimulus color components comprised by each pixel (or similar parameters such as luminance and two difference values of chrominance which can be transformed to or from tri-stimulus color values). For example, RGB images are commonly transmitted and displayed with 8 bits for each value of red, green and blue color components which constitute the pixel's composite 24-bit color value. There are two primary reasons for the development and acceptance of this standard. First, the standardized highest and lowest values of red, green and blue color components, together comprising a color "gamut" for a particular standard, represent a range of possible colors that has been deemed minimally sufficient to produce realistic images. Second, the number of discrete values representable by 8 bits per color component has been deemed minimally acceptable to prevent visual banding or "posturization" in smooth spatial gradients in the original image as long as all colors are between the minimum and maximum standardized color values within the standardized gamut. Such prevention of visual banding is fundamentally based on the limited ability of the human visual system to discern any individual or composite color between any two consecutive 8-bit levels, making such changes appear relatively gradual. Note that such discernment is not necessarily uniform throughout the range of colors possible and the specific standardized color of each 8-bit value need also not necessarily be uniformly distributed. However, for simplicity, such characteristics can be assumed uniform in the context of the following description.

Recent evolutions in video communication and display technology suggest the adoption of a new, deeper (ie purer and more saturated) gamut or range of standardized tri-stimulus color qualities—represented with pixels of relatively higher, or extended, color precision, for example, 10 bits to 12 bits for each color component instead of just 8 bits—to support a more aggressively realistic presentation of video imagery such as, for example, from film-based movies. The natural consequence of such a deeper range of colors is that the specific color associated with two consecutive digital color values is now discernable by the human eye if only the most-significant 8 bits of precision of each color component are used, resulting in visual banding artifacts when displaying only the most-significant 8 bits of precision of each color component. Accordingly, there exists a need for new standards to promote greater pixel bit depths of 10 bits to 12 bits (or more) for each possible color component (i.e. 30-bit and 36-bit composite color, respectively) within such larger color gamuts to again provide a substantially invisible difference between consecutive color values, thereby preserving visibly smooth transitions without banding, whether the image is displayed on a legacy, i.e. 24-bit composite color display, or a display adapted to display a relatively extended-color-precision image, e.g. with 30-bit or 36-bit composite color.

An increase in pixel value bit depth or, equivalently, in the precision of a color component value, presents three primary challenges. First, a greater number of bits per value naturally implies larger amounts of data to be transmitted and stored, requiring greater bandwidth and storage capabilities. Second, increased precision can naturally lead to significantly greater variation in the lesser significant bits of the image, almost to the point of an apparent randomness in such lesser bit values from one pixel to the next. This greater variation is substantially more challenging for associated data-compression algorithms, relative to images of smaller bit depth and therefore less variation. Third, 30-bit or 36-bit composite color content (i.e. 3×10 bits per color component or 3×12 bits per color component) is atypical of current conventional video components and therefore provides a challenge if backward compatibility is desired, i.e. so as to provide for displaying the associated image on a legacy display device that is adapted only for 24-bit composite color, i.e. 8 bits per color component.

Referring to FIG. 1, a first aspect of an image processing system 100, 100.1 incorporates an image encoding subsystem 10 that encodes an extended-color-precision image 12 from an image source 14 so as to generate a corresponding relatively-lower-color-precision, i.e. a legacy-color-precision, encoded image 16 suitable for display on, or use by, a legacy-color-precision image display or processing subsystem 18, without substantial associated visual banding, but which can also be decoded by a first aspect an associated image decoding subsystem 20, 20.1—following a conventional compression, transmission and decompression of the encoded image 16 by respective image compression 22, image transmission 24 and image decompression 26 subsystems, wherein the image compression subsystem 22 compresses the encoded image 16, and the image decompression subsystem generates a corresponding decompressed encoded image 16' that is then decoded by the image decoding subsystem 20, 20.1—so as generate a decoded extended-color-precision image 28 that is suitable for display on, or use by, an extended-color-precision image display or processing subsystem 30. For example, the image source 14 may comprise, but is not limited to, either an electronic-image from a video camera, a digitized image from a digitizer, a computer-generated image or a stored image file.

Figure 2:
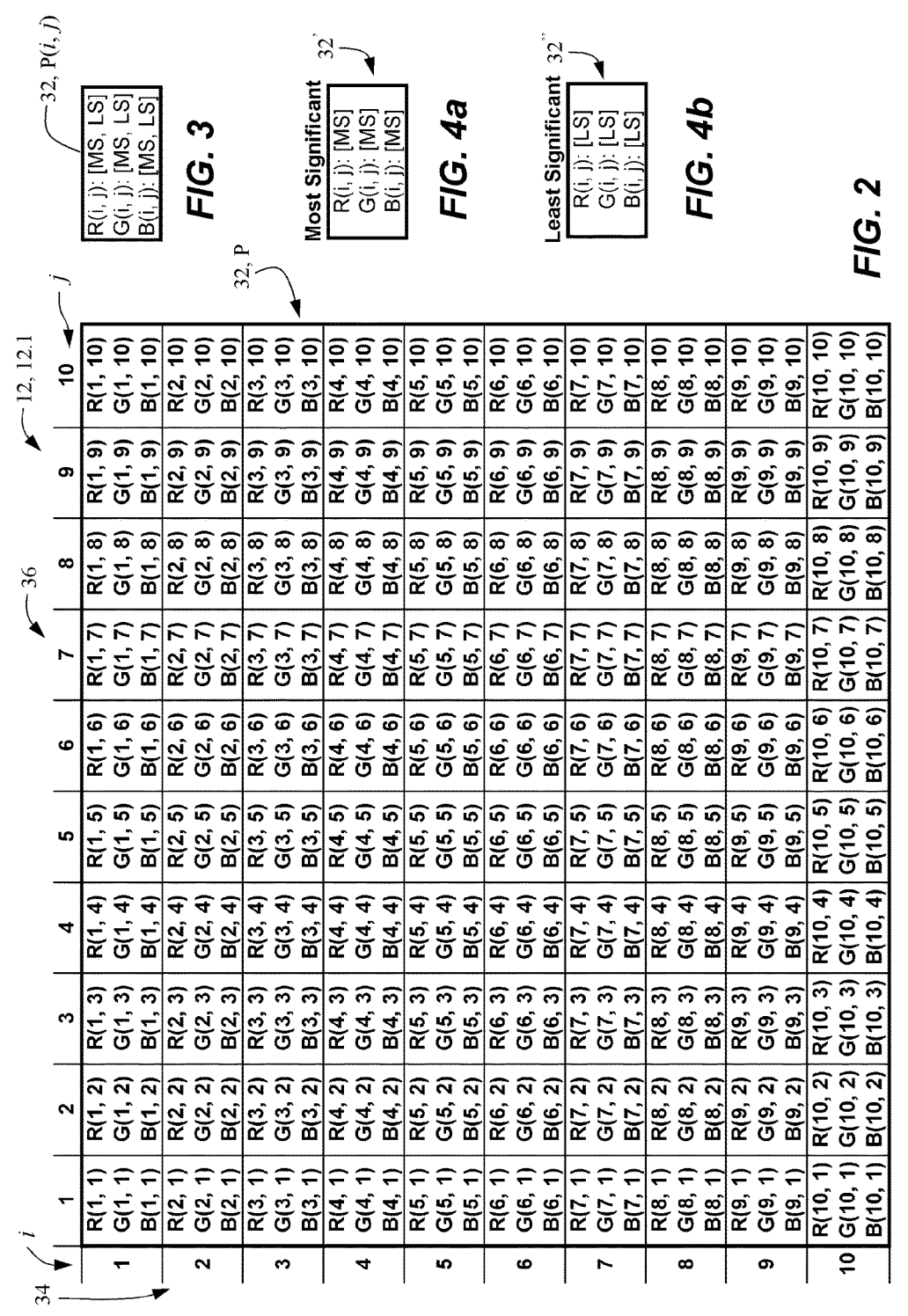

Referring also to FIG. 2, an example of an extended-color-precision image 12, 12.1 is illustrated comprising a 10×10 array of 100 relatively extended-color-precision pixels 32, P organized as ten rows 34—each identified by row index i—and ten columns 36—each identified by column index j. Each pixel 32, P(i, j) comprises a plurality of three color components R(i, j), G(i, j) and B(i, j) that represent the levels of the corresponding color of the pixel 32, P(i, j), i.e. red R(i, j), green G(i, j), and blue B(i, j) when either displayed on, or subsequently processed by, the associated extended-color-precision image display or processing subsystem 30.

Referring to FIG. 3, each relatively extended-color-precision pixel 32, P(i, j) comprises three color components R, G, B, each comprising a most-significant portion MS of $N_{MS}$ bits in length,—for example, the bit length of color components of legacy-color-precision image display or processing subsystem 18, e.g. 8 bits—and a least-significant portion LS of $N_{LS}$ bits in length, so that the total bit length of each pixel 32, P(i, j) is equal to $N_{MS}+N_{LS}$. For example, in one embodiment, each color component R, G, B is 12 bits in length, with $N_{MS}=8$ and $N_{LS}=4$.

The $3\times(N_{MS}+N_{LS})$-bit pixel 32 may be partitioned into a corresponding $(3\times N_{MS})$-bit pixel 32', illustrated in FIG. 4a, and a $(3\times N_{LS})$-bit pixel 32'', illustrated in FIG. 4b, respectively comprising the most significant $N_{MS}$ bits, and the least-significant $N_{LS}$ bits, respectively, of each color component of the $(3\times(N_{MS}+N_{LS}))$-bit pixel 32.

Figure 5:
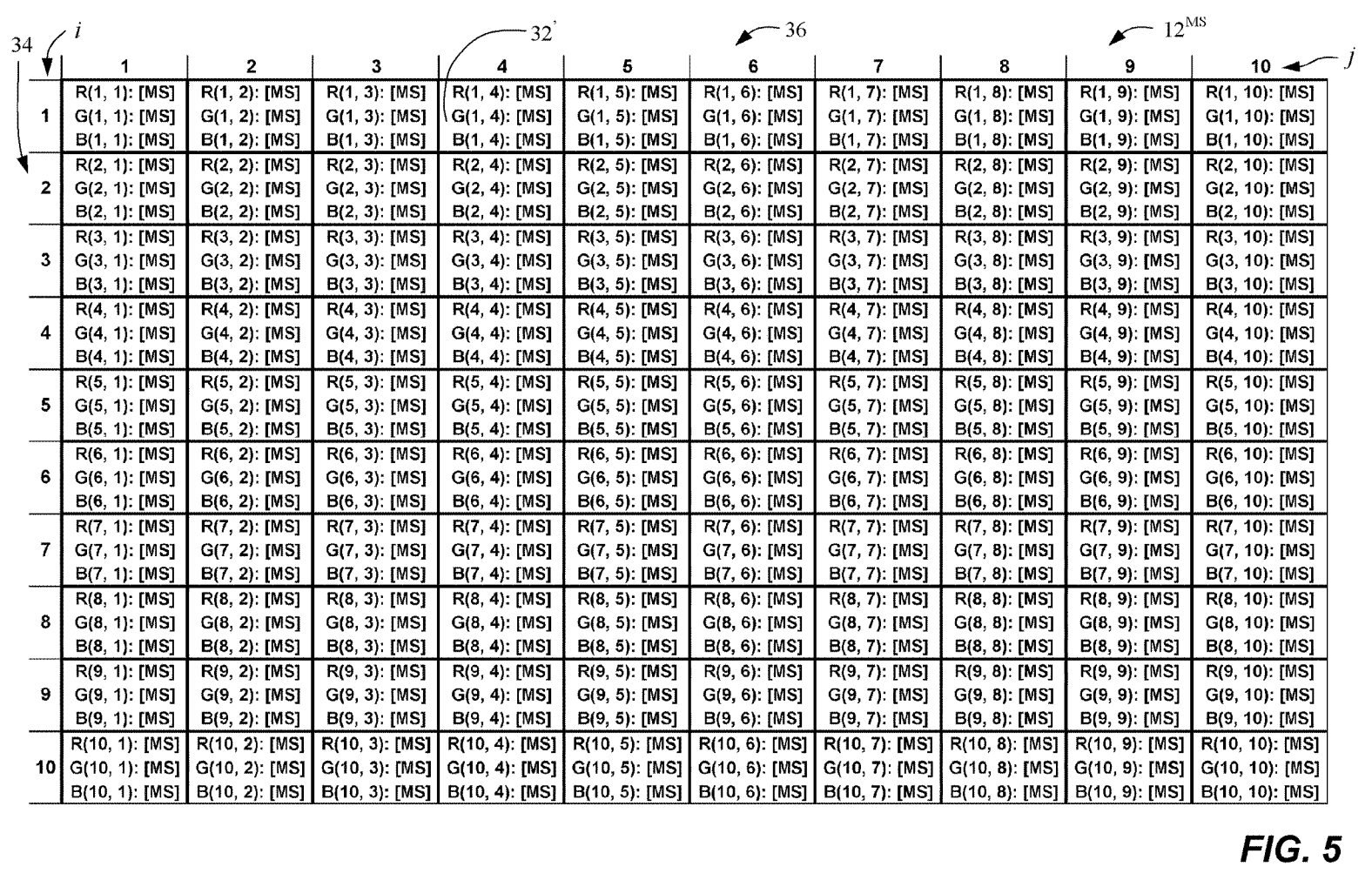

For example, referring to FIG. 5, a legacy-color-precision image $12^{MS}$ comprising $(3\times N_{MS})$-bit pixels 32' extracted from the most-significant portions MS of the extended-color-precision pixels 32, P of extended-color-precision image 12, 12.1 could be displayed on a legacy-color-precision image display or processing subsystem 18. However, once extracted from the extended-color-precision image 12, 12.1, the legacy-color-precision image $12^{MS}$ by itself does not have sufficient information to provide for reconstructing the associated extended-color-precision image 12, 12.1, or a relatively-high-fidelity approximation thereof, as is otherwise provided for by the image encoding subsystem 10 disclosed herein.

Figure 6:
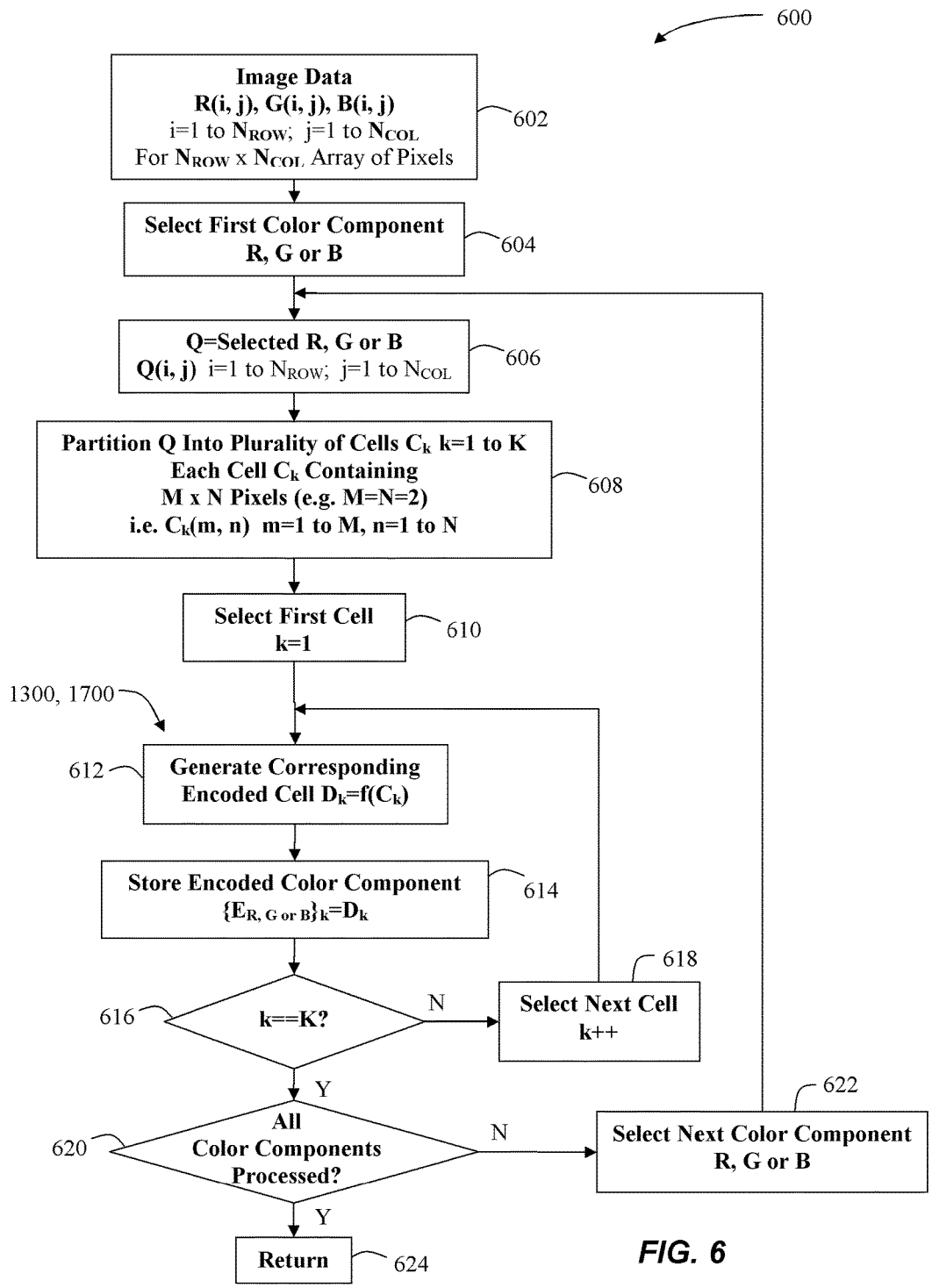
FIG. 6 illustrates a flow chart of a relatively-higher-level portion of an image encoding process carried out by the image encoding subsystem illustrated in FIG. 1.

Referring to FIG. 6, the image encoding subsystem 10 operates in accordance with an image encoding process 600 that provides for generating the encoded image 16 that is suitable for display on, or use by, a legacy-color-precision image display or processing subsystem 18, and that may be subsequently decoded by the image decoding subsystem 20, 20.1 so as to provide for generating the decoded extended-color-precision image 28 that is suitable for display on, or use by, extended-color-precision image display or processing subsystem 30, substantially without the above-described visual banding or "posturization" artifact in either the displayed or processed encoded image 16, or the displayed or processed decoded extended-color-precision image 28.

Figures 7A, 7B:
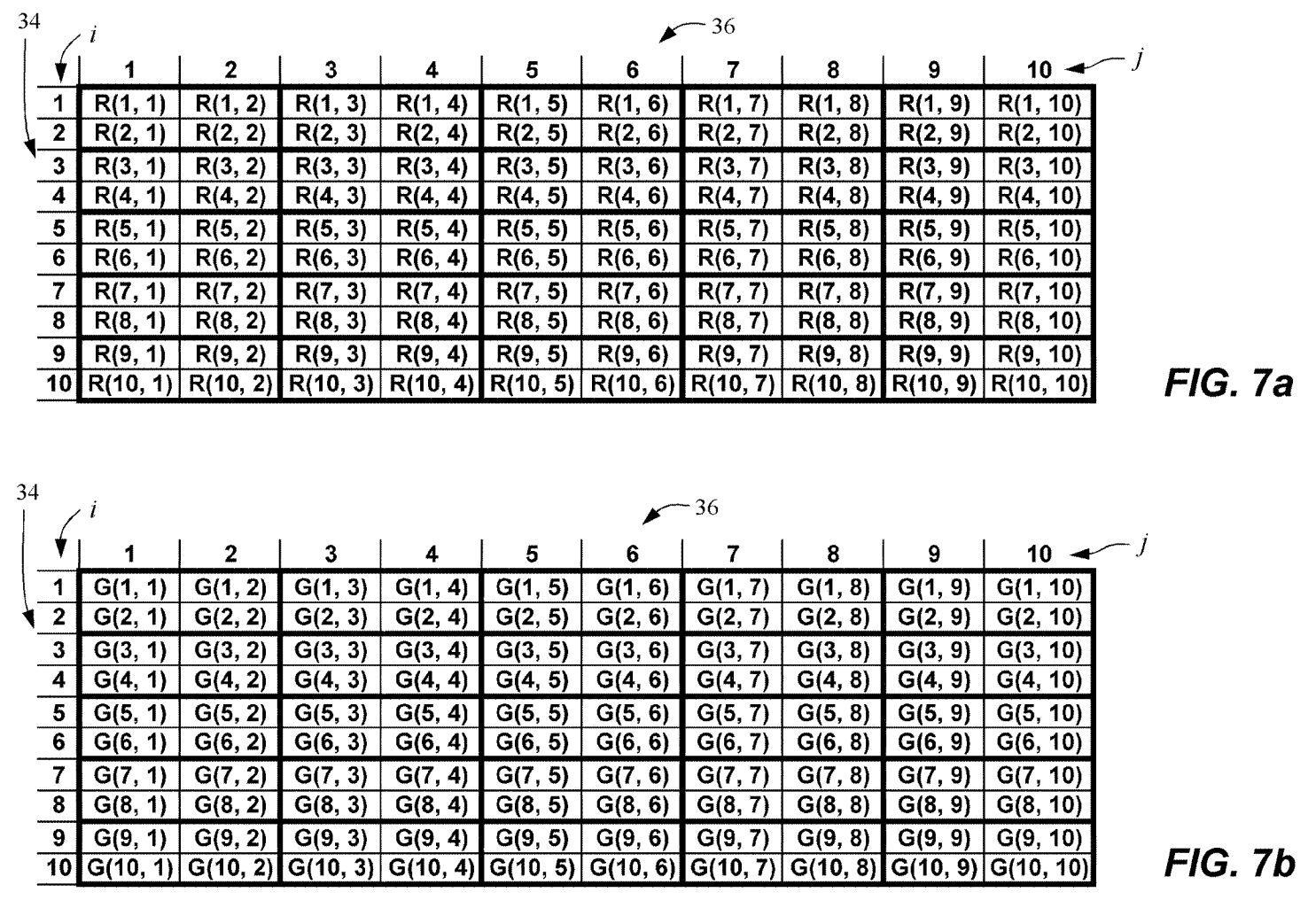

The image encoding process 600 begins with step (602), with input of an array of pixels 32, P of the extended-color-precision image 12, each pixel 32, P(i, j) comprising values for each of the three color components R(i, j), G(i, j) and B(i, j), the array comprising $N_{ROW}$ rows and $N_{COL}$ columns, each row being identified by index i, and each column being identified by index j. For example, FIG. 2 illustrates an example of a 10×10 portion of an extended-color-precision image 12, 12.1. The image encoding process 600 encodes each of the three color components R, G and B separately, and then recombines the resulting three encoded color components $E_R$, $E_G$ and $E_B$ so as to form the resulting encoded image 16 comprising an array of $N_{ROW}$ rows and $N_{COL}$ columns of encoded pixels 40, $P_E$, (illustrated in FIG. 16) wherein each of the three encoded color components $E_R(i, j)$, $E_G(i, j)$ and $E_B(i, j)$ is $N_{MS}$ bits in length, so as to provide for display on, or use by, a legacy-color-precision image display or processing subsystem 18. Accordingly, in step (604), the first of the three color components R, G and B is selected, for example, a sub-array of red R(i, j) color components comprising an array of $N_{ROW}$ rows and $N_{COL}$ columns, for example, as illustrated in FIG. 7a. In step (606), the selected color component is assigned to the corresponding selected-color-component array Q of $N_{ROW}$ rows and $N_{COL}$ columns,—for example, as illustrated in FIG. 8,—wherein each element Q(i, j) of the selected-color-component array Q is in one-to-one correspondence with the corresponding selected color component R(i, j), G(i, j) or B(i, j).

Then, referring to FIGS. 7a-c, 8, 9 and 10a-b, in step (608), the selected-color-component array Q is partitioned into a plurality of image cells 42, C, K in number, each image cell 42, $C_k$ comprising an array of M rows and N columns with M×N elements, wherein the elements of the image cells 42, $C_k$ are collectively in one-to-one correspondence with the elements Q(i, j) of the selected-color-component array Q. For example, in the embodiments illustrated herein, M=N=2, and for the 10×10 array portions illustrated in FIGS. 7a-c and 8, there are 25 such image cells 42, $C_k$, which are delineated by the bold-line internal borders in each of FIGS. 7a-c and 8. FIG. 9 illustrates a single image cell 42, $C_k$ from the selected-color-component array Q containing elements Q(i1, j1), Q(i1, j2), Q(i2, j1) and Q(i2, j2), wherein i1=2p−1, i2=2p, j1=2q−1 and j2=2q, wherein p and q are indexes of the image cells 42, $C_k$ within the selected-color-component array Q. Then, in step (610), the first image cell 42, $C_k$ is selected for encoding, for example, by setting k=1.

Referring to FIGS. 10a and 10b, each element of image cell 42, $C_k$ contains an extended-color-precision value comprising a concatenation of a most significant portion MS, $C_k^{MS}$ and a least significant portion LS, $C_k^{LS}$, with the upper left UL value given by $C_k(1,1)$, the upper right UR value given by $C_k(1,2)$, the lower left LL value given by $C_k(2,1)$, and the lower right LR value given by $C_k(2,2)$, all for a single color component R, G or B. Referring to FIGS. 11 and 12, the most significant $C_k^{MS}$ and least significant $C_k^{LS}$ portions may then be accessed separately with respect to separate corresponding image cell portions $42^{MS}$, $C_k^{MS}$ and $42^{LS}$, $C_k^{LS}$, respectively.

Figure 13:
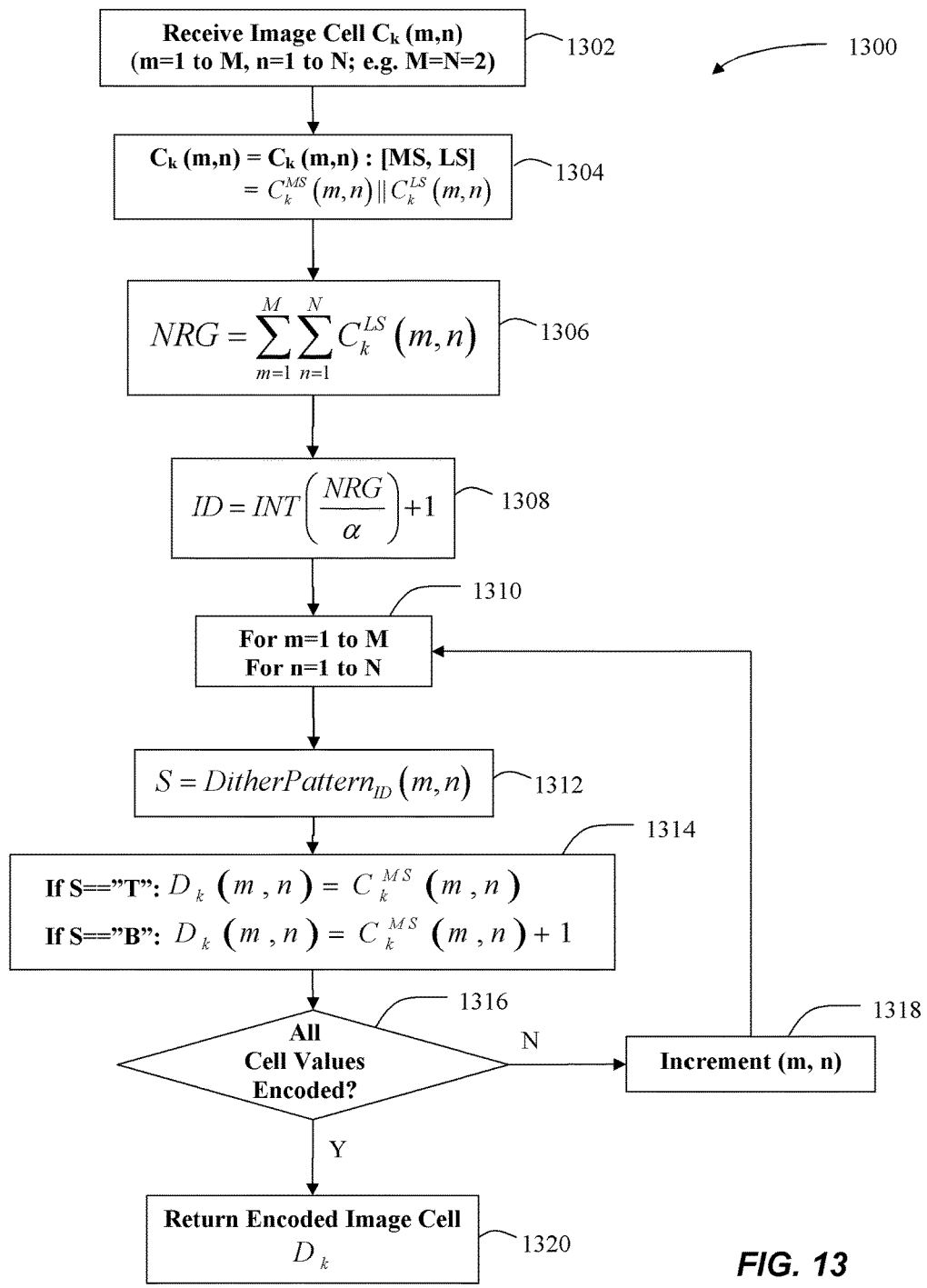
FIG. 13 illustrates a flow chart of a first embodiment of a relatively-lower-level portion of an image encoding process called from the process illustrated in FIG. 6 and carried out by the image encoding subsystem illustrated in FIG. 1.
Figure 17:
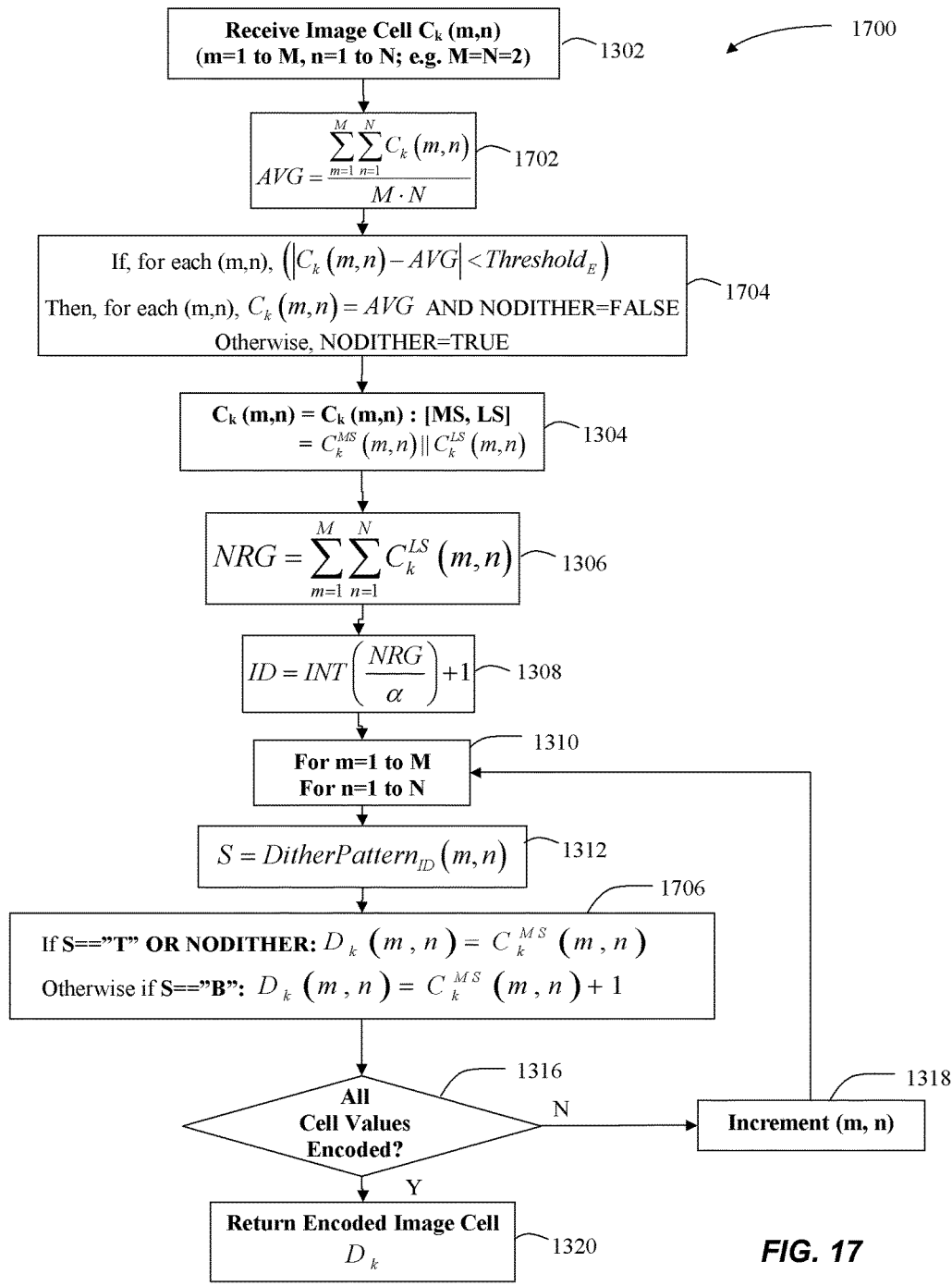
FIG. 17 illustrates a flow chart of a second embodiment of a relatively-lower-level portion of an image encoding process called from the process illustrated in FIG. 6 and carried out by the image encoding subsystem illustrated in FIG. 1.

In step (612), the selected image cell 42, $C_k$ is encoded in accordance with an image encoding subprocess 1300, 1700, a first embodiment 1300 of which is illustrated in FIG. 13, a second embodiment 1700 of which is illustrated in FIG. 17.

Referring to FIG. 13, the first embodiment of the image encoding subprocess 1300 commences with step (1302), with the receipt of the image cell 42, $C_k$ containing extended-color-precision values $C_k(m, n)$ for the color component R, G, or B being encoded. In step (1304), each extended-color-precision value $C_k(m, n)$ is partitioned into a most-significant portion MS, $C_k^{MS}$ and a least significant portion LS, $C_k^{LS}$ each respectively $N_{MS}$ bits in length and $N_{LS}$ bits in length, wherein $N_{MS}$ is the bit length of color component values of a corresponding legacy-color-precision image. Then, in step (1306), a cell error energy 44, NRG is calculated as the sum of the values of each of the least-significant portions $C_k^{LS}$ of each of the elements of the image cell 42, $C_k$. For example, for 12-bit extended-color-precision values $C_k(m, n)$, with $N_{MS}$=8, then $N_{LS}$=4, and the cell error energy 44, NRG is calculated as the sum of the values of the least-significant 4-bit portions of each element $C_k(m, n)$ of the image cell 42, $C_k$. Then, in step (1308), the value of a corresponding index 46, ID is determined responsive to the value of the cell error energy 44, NRG, either by reverse table lookup using the pattern table 48 illustrated in FIG. 14—wherein index 46, ID is determined as the value from the first column 50 of the pattern table 48 from the row for which the value of the cell error energy 44, NRG is within the range of values (assuming $N_{LS}$=4) indicated in the third column 52 of the pattern table 48,—or by the following equations:

$$ID = INT\left(\frac{NRG}{\alpha}\right) + 1 \qquad (1)$$

where $$\alpha = \frac{N \cdot M \cdot 2^{N_{LS}}}{2^{N \cdot M}}. \qquad (2)$$

With the maximum value of the least-significant portion LS being $(2^{N_{LS}}-1)$, the value of cell error energy 44, NRG will be between 0 and $N \cdot M \cdot (2^{N_{LS}}-1)$, or, for $N_{LS}$=4 and M=N=2, between 0 and 60, as indicated in the third column 52 of the pattern table 48 illustrated in FIG. 14.

The second column 54 of the pattern table 48 contains a corresponding dither pattern array 56, which is an M×N array of binary values,—for example, equal to either "T" or "B", but generally any two different values, for example, 0 and 1—wherein there is a one-to-one correspondence between elements of the dither pattern array 56 and elements of the image cell 42, $C_k$. For each different value of index 46, ID in the pattern table 48 there is corresponding unique combination of values of the elements of the dither pattern array 56 arranged in according with a corresponding dither pattern 56'. For example, for the 2×2 dither pattern array 56 of the pattern table 48 illustrated in FIG. 14, for ID=1, each of the elements of the corresponding dither pattern array 56 is set to the first binary value, i.e. "T". For ID=2 to 5, each of the elements of the corresponding dither pattern array 56 is set to the first binary value, i.e. "T", except for the upper left UL, the upper right UR, the lower right LR and the lower left LL elements, respectively, which are set to the second binary value, i.e. "B". For ID=6 to 11, half of the elements of the corresponding dither pattern array 56 are set to the first binary value, i.e. "T", and the remaining half of the elements are set to the second binary value, i.e. "B", the remaining half being the upper row, the right column, the lower row, the left column, the upper left UL and lower right LR, and the upper right UR and lower left LL elements, respectively. For ID=12 to 15, each of the elements of the corresponding dither pattern array 56 is set to the second binary value, i.e. "B", except for the lower left LL, upper left UL, the upper right UR, and the lower right LR elements, respectively, which are set to the first binary value, i.e. "T". Finally, for ID=16, each of the elements of the corresponding dither pattern array 56 is set to the second binary value, i.e. "B". Accordingly, the pattern table 48 accounts for all possible permutations of the binary-valued dither pattern array 56.

Returning to FIG. 13, in steps (1310)-(1318), the value of each element of an encoded image cell 58, $D_k$—of $N_{MS}$ bits in length—is determined responsive to the value of a corresponding element of the corresponding image cell 42, $C_k(m, n)$. For example, FIG. 15 illustrates a 2×2 encoded image cell 58, $D_k$ generated from, and corresponding to, the image cell 42, $C_k(m, n)$ and image cell portions $42^{MS}$, $C_k^{MS}$ and $42^{LS}$, $C_k^{LS}$ illustrated in FIGS. 9-12. In steps (1310), (1316) and (1318), indexes m and n are set to provide for successively selecting each of the elements of the dither pattern array 56 associated with the index 46, ID determined in step (1308), and for successively pointing to corresponding elements $C_k(m, n)$ of the associated image cell 42, $C_k$ and to corresponding elements $D_k(m, n)$ of the corresponding encoded image cell 58, $D_k$. More particularly, in step (1310), the row index m is stepped from 1 to M, and the column index n is stepped from 1 to M for each value of the row index m. In steps (1312) and (1314), if the value of the selected element (m, n) of the dither pattern array 56 is equal to the first binary value, i.e. "T", then the corresponding value of the corresponding element of the encoded image cell 58, $D_k(m, n)$ is set equal to the corresponding value of the corresponding element of the most-significant portion of the image cell 42, $C_k^{MS}(m, n)$, so as to generate what is referred to as a "truncated" version of the corresponding element of the extended-color-precision image cell $C_k(m, n)$. If the value of the selected element (m, n) of the dither pattern array 56 is equal to the second binary value, i.e. "B", then the corresponding value of the corresponding element of the encoded image cell 58, $D_k(m, n)$ is set equal to the corresponding value of the corresponding element of the most-significant portion of the image cell 42, $C_k^{MS}(m, n)$ incremented by 1, so as to generate what is referred to as a "bumped" value of the corresponding element of the extended-color-precision image cell $C_k(m, n)$. For example, for a particular image cell 42, $C_k$, if the value of the cell error energy 44, NRG was equal to 13, then the value of index 46, ID from the first column 50 of the pattern table 48 would be 4, so that the values of the upper left UL: $D_k(1,1)$, upper right UR: $D_k(1,2)$ and lower left UL: $D_k(2,1)$ elements of the encoded image cell 58, $D_k$ would be "truncated" values of the corresponding elements of the corresponding extended-color-precision image cell $C_k$, and the value of the lower right LR: $D_k(2,2)$ element of the encoded image cell 58, $D_k$ would be "bumped" value of the corresponding element of the corresponding extended-color-precision image cell $C_k$.

As will be seen hereinbelow, the above-described "truncation" and "bumping" of the values of the elements of the extended-color-precision image cell $C_k(m, n)$, in accordance with an associated particular dither pattern array 56 responsive to the associated value of cell error energy 44, NRG provides for recovering an approximation of the corresponding least-significant portion of the image cell 42, $C_k^{LS}(m, n)$ responsive to the values of the elements of the encoded image cell 58, $D_k(m, n)$, which thereby provides for recovering an aesthetically-pleasing approximation of the extended-color-precision image cell $C_k(m, n)$ from the values of the encoded image cell 58, $D_k(m, n)$ alone, without requiring any other extra data.

For a 2×2 image cell 42, $C_k$ of pixel elements, with each element either truncated, or bumped by the value of one legacy-color-precision least-significant bit (LSB), according to the dithering pattern 56', for a given dithering pattern 56', in most cases, each particular cell error energy 44, NRG can be achieved with a variety of combinations of associated values of the least-significant portions LS of the elements of the image cell 42, $C_k$. For a cell error energy 44, NRG value of either 0 or $4*(2^{N_{LS}}-1)$, then the least-significant portion LS each of the elements of that cell would have to either be 0 or $(2^{N_{LS}}-1)$, respectively, however these conditions are exceptions. For example, for a cell error energy 44, NRG value of 1, the least-significant portion LS any one of the four elements of that image cell 42, $C_k$ could be equal to 1. However, once the dithering pattern 56' is selected responsive to the overall cell error energy 44, NRG, the choice of which elements to "truncate" or "bump" is then predetermined by the dithering pattern 56', independent of the particular values of the elements of the image cell 42, $C_k$, wherein the particular association of dithering patterns 56' to cell error energy 44, NRG levels is predetermined responsive to the resulting visual appearance of the resulting images for a variety of images.

Following the encoding of element (n, m) of the encoded image cell 58, $D_k(m, n)$, in step (1316), if all elements (n, m) have not been encoded, then in step (1318) the cell row m an column n indices are incremented per the loop control logic of step (1310), and the encoding process of steps (1312) and (1314) is repeated so as to generate the next element (n, m) of the encoded image cell 58, $D_k(m, n)$. Otherwise, from step (1316), the encoded image cell 58, $D_k$ is returned in step (1320), thereby completing step (612) of the image encoding process 600.

Figure 16:
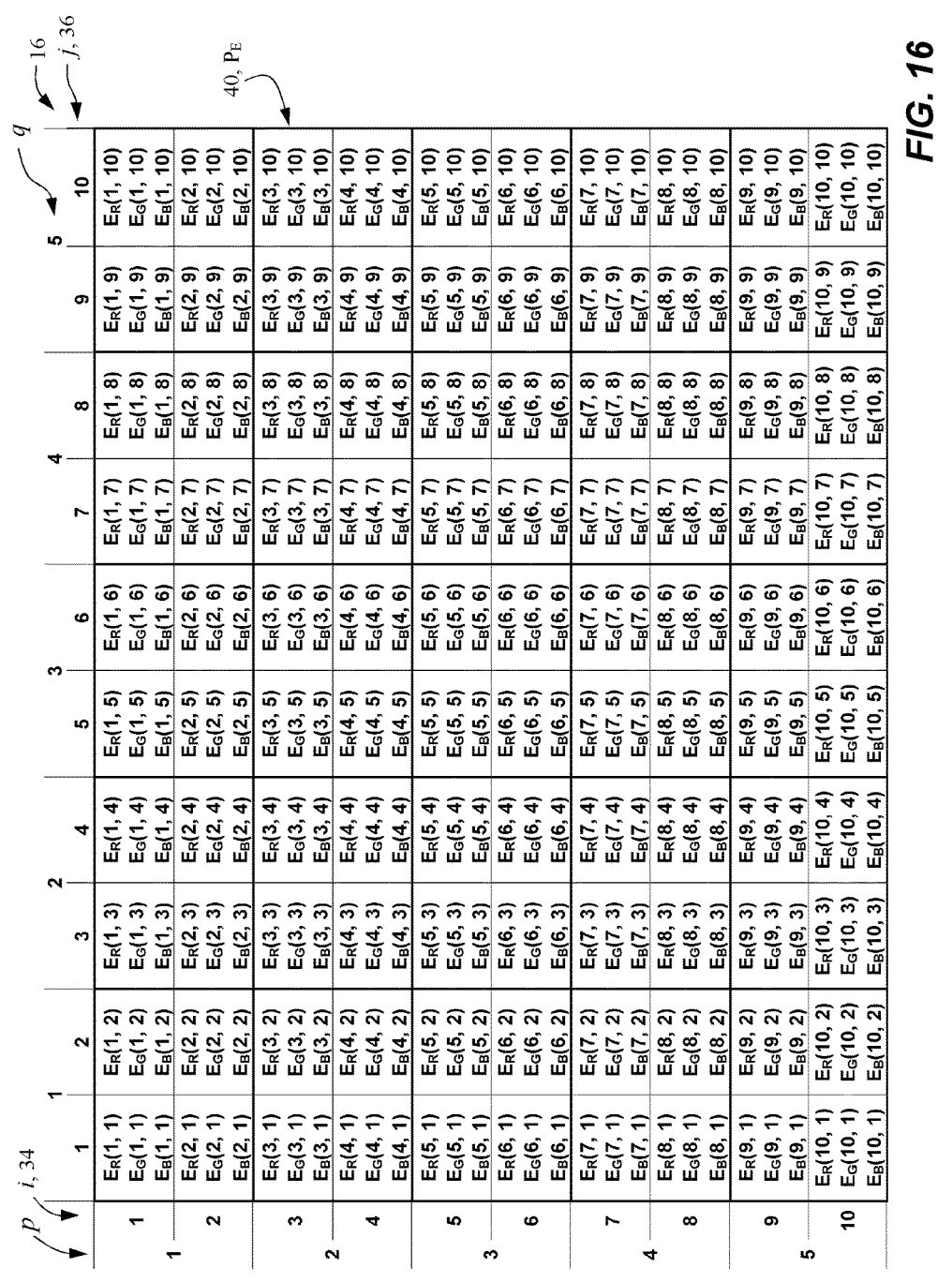

Returning to FIG. 6, following step (612), in step (614), the $k^{th}$ encoded image cell 58, $D_k$ for the currently selected color component R, G or B is stored in the corresponding portions of the corresponding encoded pixels 40, $P_E$ of the encoded image 16. FIG. 16 illustrates the encoded pixels 40, $P_E$ of a 10×10 portion of an encoded image 16 generated from, and corresponding to, the extended-color-precision image 12, 12.1 illustrated in FIG. 2. For example, designating the selected color component as X, then step (614) would result in $E_X(2p-1,2q-1)=D_k(1,1)$, $E_X(2p,2q-1)=D_k(2,1)$, $E_X(2p-1,2q)=D_k(1,2)$, $E_X(2p,2q)=D_k(2,2)$, wherein indexes (p, q) of cells within the encoded image 16 correspond to index k of the associated image cell 42, $C_k$ and encoded image cell 58, $D_k$. For example, with respect to the encoded image 16 illustrated in FIG. 16, k=5. (p−1)+q.

Then, in step (616), if all K image cells 42, $C_k$ have not been processed, then in step (618), index k is incremented so as to point to the next cell, and the image encoding process 600 is repeated beginning with step (612). Otherwise, from step (616), if, in step (620), all color components R, G and B have not been processed, then, in step (622), the next color component R, G or B is selected, and the image encoding process 600 is repeated beginning with step (606), for example, by then selecting either a sub-array of green G(i, j) color components, for example, as illustrated in FIG. 7b, or a sub-array of blue B(i, j) color components, for example, as illustrated in FIG. 7c. Otherwise, from step (620), in step (624), the image encoding process 600 completes and returns to the point of invocation, with the encoded image 16 complete and suitable for display on, or use by, a legacy-color-precision image display or processing subsystem 18.

Accordingly, the image encoding process 600 provides for forming the encoded image 16 by dithering the values of each element of each image cell 42, $C_k$, by either "truncation" or "bumping". Given that each image cell 42, $C_k$ contains MxN elements, the total number of unique patterns by which the values of the elements of the image cell 42, $C_k$ are either truncated or bumped is $2^{M\times N}$, so as to provide for 16 unique dither patterns 56' for a 2×2 image cell 42, $C_k$, as illustrated by the dither pattern arrays 56 of the second column 54 of the pattern table 48 of FIG. 14. The "Dithered Energy" listed in the fourth column 60 of the pattern table 48 is the energy added to an image cell 42, $C_k$ after truncating each pixel value and then bumping values according to the associated dither pattern 56', and is equal to the number of "bumped" elements times $2^{N_{LS}}$. The "Cell Error Energy" of the third column 52 of the pattern table 48 is the range of cell error energies by which a given dither pattern 56' is selected, which is also used for subsequently decoding the encoded image 16. The relatively large number of dither patterns 56' of the image encoding process 600 provides for a relatively random pattern of dithering by an amount that is less than or equal to one least-significant bit (LSB), which is relatively difficult to discern in the encoded image 16, while simultaneously embedding information within the encoded image 16 sufficient to provide for recovering an aesthetically-pleasing decoded extended-color-precision image 28 therefrom.

One limitation of the above-described first embodiment of the image encoding subprocess 1300 is that it is possible for a relatively smoothly varying image cell 42, $C_k$ of extended-color-precision values to create what appears like a dithered pattern even before any value is bumped during creation of the corresponding legacy-color-precision values of the encoded image cell 58, $D_k$. For example, consider an image cell 42, $C_k$ where the extended-color-precision value of one pixel of an image cell 42, $C_k$ is just one extended-color-precision least-significant bit (LSB) below the next higher legacy-color-precision value, but where its neighbor is exactly equal to that legacy-color-precision value. These two pixel values are therefore very close together in the extended-color-precision image 12 but are then as far apart in value as they can be when truncated—i.e. the full value of a least-significant bit (LSB) of the legacy-color-precision image. This is exacerbated if dithering causes the higher pixel value of the two to be bumped, resulting in two neighboring pixels in an encoded image cell 58, $D_k$ differing by the twice the value of a least-significant bit (LSB). Accordingly, in some cases it may be possible for relatively small variations in the extended-color-precision image 12 to be increased in the encoded image 16, which can create ambiguity when later identifying the proper dither pattern 56' during a subsequent decoding process.

Referring to FIG. 17, this limitation can be mitigated by a second embodiment of the image encoding subprocess 1700 that can alternatively be used to perform step (612) of the image encoding process 600. More particularly, the second embodiment of the image encoding subprocess 1700 is the same as the first embodiment of the image encoding subprocess 1300, except for additional steps (1702) and (1704) between step (1302) and step (1304), and except for step (1314) being superseded by step (1706). More particularly, following step (1302), in step (1702), a cell average AVG of the values $C_k(m, n)$ of the image cell 42, $C_k$ is calculated by dividing the sum of the values $C_k(m, n)$ of all the elements of the image cell 42, $C_k$, i.e. $C_k(m, n)$ for m=1 to M and n=1 to N, by the number (M·N) of elements in the image cell 42, $C_k$. Then, in step (1704), if each of the values $C_k(m, n)$ of the image cell 42, $C_k$ deviates from the cell average AVG by no more than a corresponding leveling threshold Threshold$_E$, then a NODITHER flag is set to FALSE (meaning that the associated cell 42, $C_k$ is a "selected cell", i.e. selected for dithering) and the value $C_k(m, n)$ of each element of the image cell 42, $C_k$ is set equal to the cell average AVG. Accordingly, for a 2×2 image cell 42, $C_k$, If $(|C_k(1,1)-AVG|<Threshold_E$ AND $|C_k(1,2)-AVG|<Threshold_E$ AND $|C_k(2,1)-AVG|<Threshold_E$ AND $|C_k(2,2)-AVG|<Threshold_E)$ Then $C_k(1,1)=C_k(1,2)=C_k(2,1)=C_k(2,2)=AVG.$ (3)

Otherwise, the NODITHER flag is set to TRUE (meaning that the associated cell 42, $C_k$ is NOT a "selected cell"), so as to prevent subsequent dithering of cells that exhibit substantial inter-pixel variation.

For example, the leveling threshold Threshold$_E$ is typically empirically determined, but is generally less than the value of one least-significant bit (LSB) in legacy-color-precision space, i.e. less than $2^{N_{LS}}$ in extended-color-precision space, so as to provide for all the truncated pixel values in the encoded image 16 to vary by no more than one least-significant bit (LSB) even if bumped, thereby removing any ambiguity when trying to determine the associated dither pattern 56' during the associated decoding process described hereinbelow. Furthermore, because the leveling process sets all extended-color-precision values of the image cell 42, $C_k$ to the average value of the corresponding original values, the corresponding cell error energy 44, NRG is conserved. Accordingly, the steps (1702) and (1704) of the second embodiment of the image encoding subprocess 1700 provides for more effectively determining the dither patterns 56' that had been used when creating the encoded image 16, from the values of the encoded image 16 during a subsequent decoding process.

Following step (1704), the second embodiment of the image encoding subprocess 1700 continues with step (1304) et seq, the same as for the first embodiment of the image encoding subprocess 1300 described hereinabove and illustrated in FIG. 13, except for step (1706) that supersedes step (1314), wherein, if the NODITHER flag was set in step (1704), then, in step (1706), the corresponding value of the corresponding element of the encoded image cell 58, $D_k(m, n)$ is set equal to the corresponding value of the corresponding element of the most-significant portion of the image cell 42, $C_k^{MS}(m, n)$ for each element $D_k(m, n)$ of the encoded image cell 58, $D_k(m, n)$. Alternatively, if the NODITHER flag is set, then, in step (1706), the corresponding value of the corresponding element of the encoded image cell 58, $D_k(m, n)$ may be set equal to the value of the corresponding element of the of the image cell 42, $C_k^{MS\|LS}(m, n)$ rounded to a most-significant precision, for each element $D_k(m, n)$ of the encoded image cell 58, $D_k(m, n)$.

In accordance with a third embodiment, in step (1704) of the second embodiment of the image encoding subprocess 1700, if the conditions of step (1704) are not satisfied, then, alternatively, the elements $C_k(m, n)$ of the image cell 42, $C_k$ could be dithered in accordance with a conventional dithering process, instead of dithering in accordance with above-described steps (1304)-(1318), for example, in accordance with—but not limited to—conventional dithering processes described in either http://en.wikipedia.org/wiki/Ordered-_dithering or http://michal.is/projects/image-dithering-in-matlab/, each of which documents is incorporated herein by reference.

Accordingly, the value of each element $D_k(m, n)$ of each pixel 32 of the encoded image cell 58, $D_k(m, n)$ for each image cell 42, $C_k$ for which the conditions of step (1704) are not satisfied—i.e. for each "non-selected" image cell 42, $C_k$— is set to a legacy-color-precision value, for example, an 8-bit value, that is either a truncated version, a rounded version, or a conventionally dithered version of the corresponding original value of the image cell 42, $C_k$ (m, n).

Figure 18:
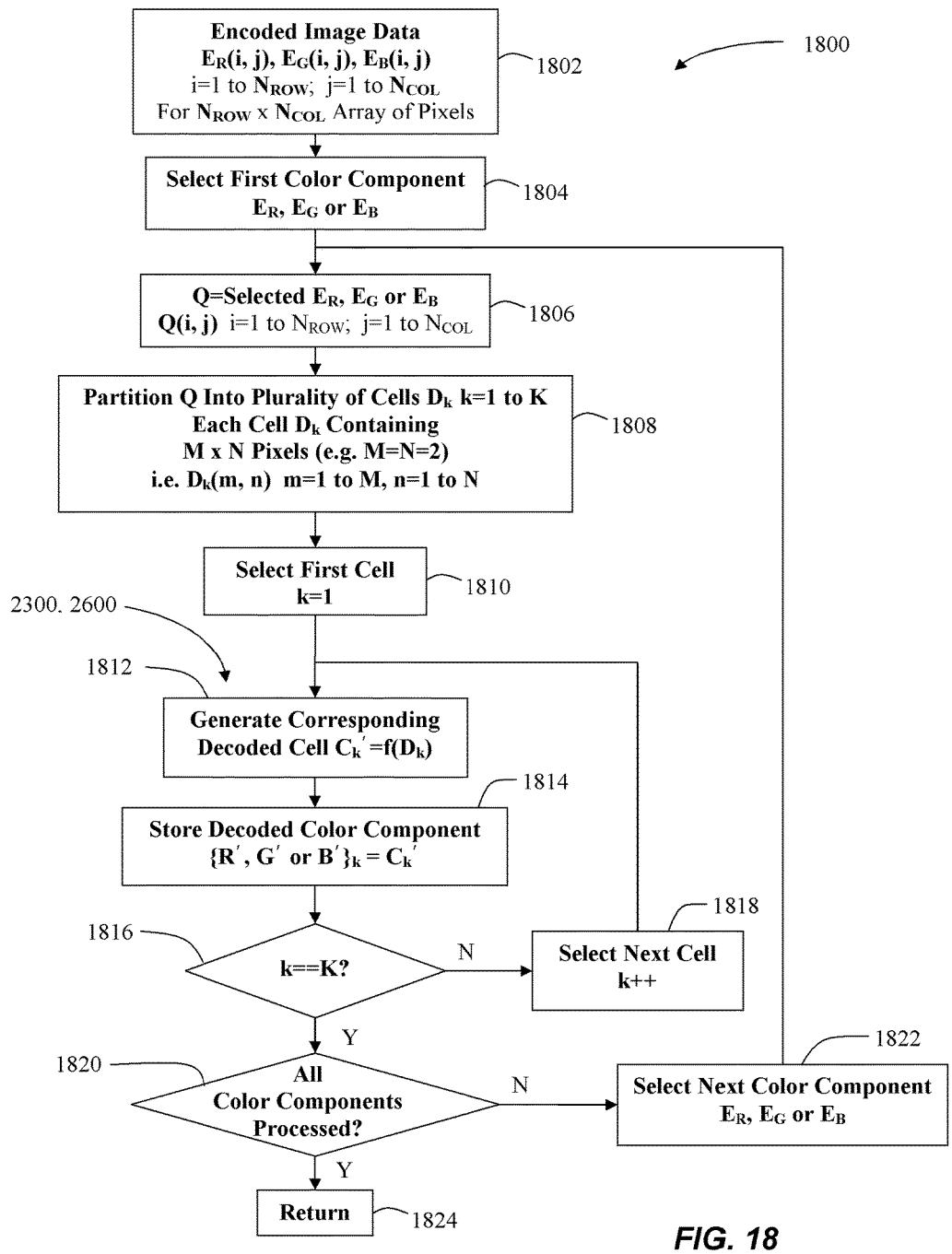
FIG. 18 illustrates a flow chart of a first aspect of a relatively-higher-level portion of an image decoding process carried out by the image decoding subsystem illustrated in FIG. 1.

Referring to FIG. 18, in accordance with a first embodiment, the image decoding subsystem 20, 20.1 operates in accordance with a first aspect of an image decoding process 1800 that provides for transforming an encoded image 16, 16' into a decoded extended-color-precision image 28 that is suitable for display on, or use by, extended-color-precision image display or processing subsystem 30 substantially without the above-described visual banding or "posturization" artifacts.

It has been observed that the graininess of dithering patterns 56' is most noticeable in image cells 42, C of pixel elements where the original variation of each pixel element value in the extended-color-precision image cells 42, C is relatively small. For example, consider a 2×2 extended-color-precision image cell 42, C of pixel elements wherein all pixel values of that image cell 42, C have variations from each other so small that they are only resolvable with extended-color-precision. If an energy analysis and subsequent dithering results in three of such pixel element values being truncated and the remaining pixel value being bumped in the encoded image 16, 16', that single bumped pixel element will now stand out prominently against the other three. On the other hand, consider a 2×2 extended-color-precision image cell 42, C of pixel elements wherein one or more pixels have values significantly different from the others even when represented with only legacy-color-precision. In this case the result of dithering is far less noticeable because the pixel value variations within the cell are already much greater than any added variation caused by dithering. Accordingly, it is assumed that noticeable artificial graininess in a dithered image can be significantly reduced by removing contributions to such graininess only from those cells having pixel to pixel value variations caused by dithering and not by the natural variations inherent in a particular extended-color-precision image cell 42, C.

Accordingly, the decoding process begins by selecting an encoded image cell 58, $D_k$, which will comprise pixel element values which vary from the average of all pixel element values in such a cell by no more than a threshold, for example, by no more than the value of one least-significant-bit LSB of the encoded pixels 40, $P_E$ (i.e. legacy-color-precision). If each pixel element in such a selected cell can have only one of two values and if only small variations in the corresponding extended-color-precision image cell 42, $C_k$ element values are assumed, then it is further assumed that the higher of such values are likely to represent bumped pixel element values and the lower of such values are likely to represent only truncated pixel values. Since all such pixel element values are only one least-significant-bit LSB from each other, this process produces a unique condition where no one pixel element value can equal the average value of all four pixel elements unless all four pixel element values are identical. Accordingly, if any pixel element value is greater than the average value of all pixel elements then it can be identified as one which has been bumped. Similarly, if any pixel value is less than the average value of all pixels then it can be identified as one which has only been truncated. Since it has been assumed that all pixel element values of such an encoded image cells 58, $D_k$ were the result of dithering, such cell analysis therefore leads to a determination of which dithering pattern 56' had been used to encode that encoded image cells 58, $D_k$.

Figures 19A, 19B:
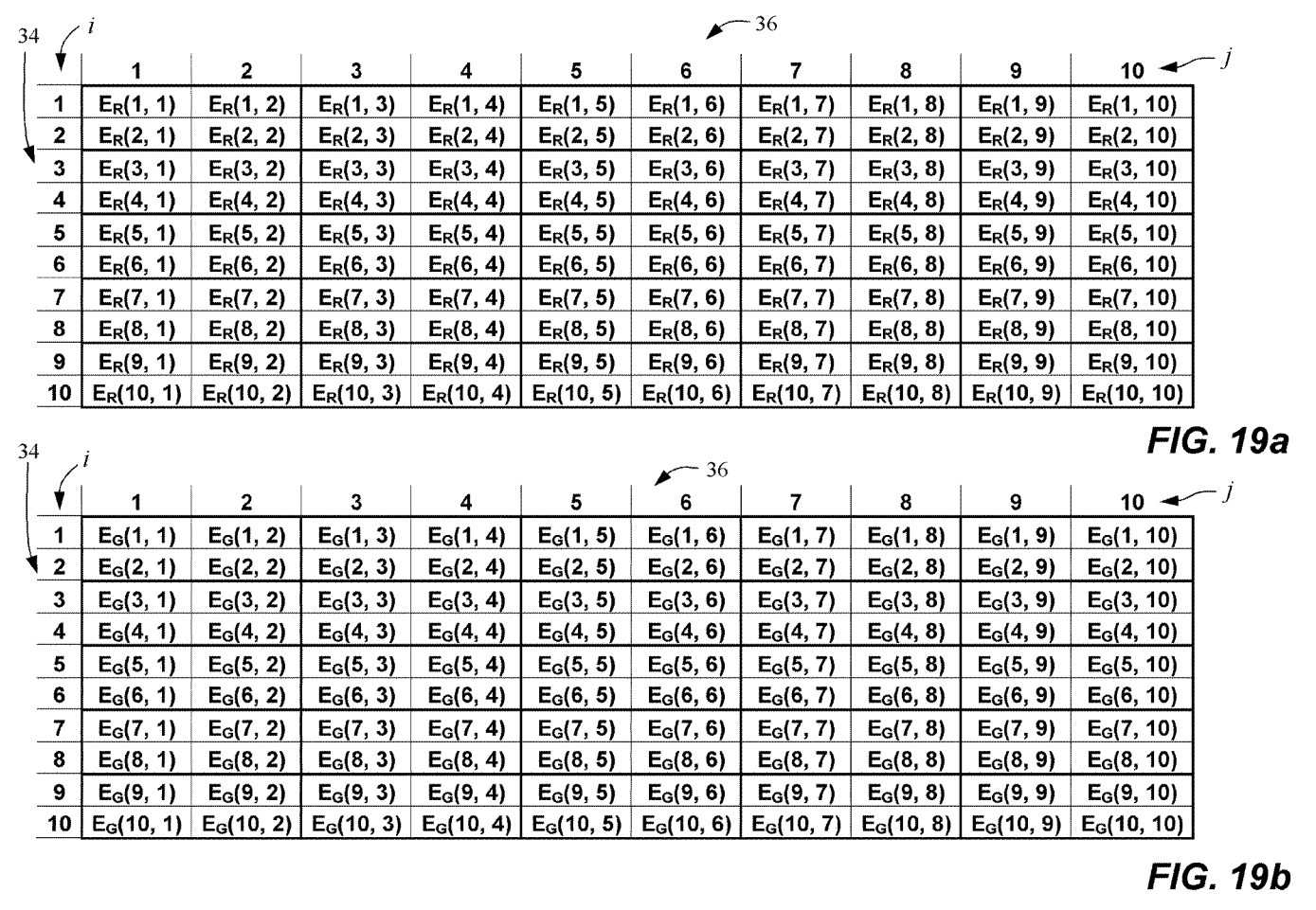
Figure 19C:
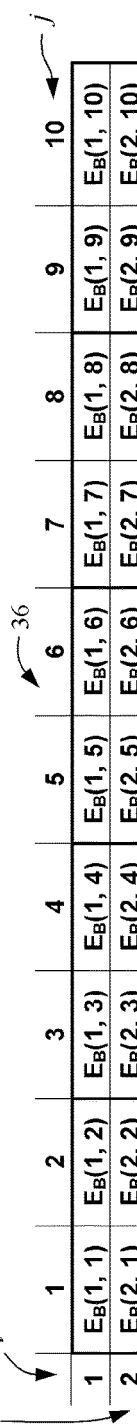
FIG. 19c illustrates a subset of third-color components of the encoded image illustrated in FIG. 17, partitioned into a plurality of 2×2 cells.
Figure 20:
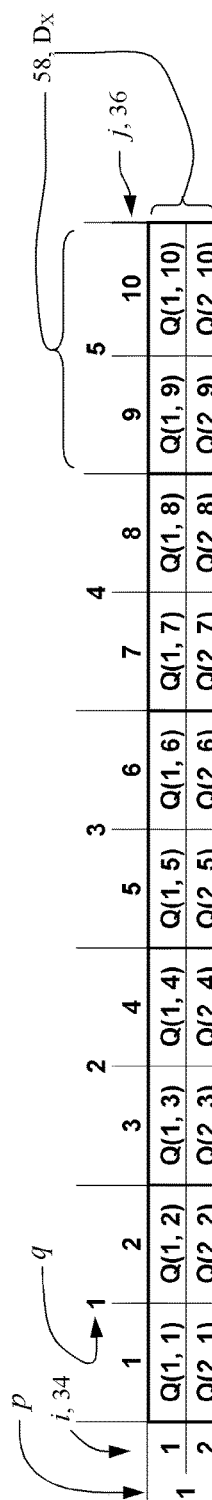
FIG. 20 illustrates a generalized subset of components of the encoded image illustrated in FIG. 17, 19a, 19b or 19c, for a particular color, partitioned into a plurality of 2×2 cells.

The first embodiment of the image decoding process 1800 begins with step (1802), with input of an array of encoded pixels 40, $P_E$ of the legacy-color-precision encoded image 16, 16', each encoded pixel 40, $P_E(i, j)$ comprising values for each of the three encoded color components $E_R(i, j)$, $E_G(i, j)$ and $E_B(i, j)$, the array comprising $N_{ROW}$ rows and $N_{COL}$ columns, each row being identified by index i, each column being identified by index j. For example, FIG. 16 illustrates an example of a 10×10 portion of an encoded image 16, 16'. The first embodiment of the image decoding process 1800 decodes each of the three encoded color components $E_R$, $E_G$ and $E_B$ separately, and then recombines the resulting three decoded color components R', G' and B' so as to form the resulting decoded extended-color-precision image 28 comprising an array of $N_{ROW}$ rows and $N_{COL}$ columns of decoded pixels 62, P', wherein each of the three decoded color components R'(i, j), G'(i, j) and B'(i, j) is $N_{MS}+N_{LS}$ bits in length, so as to provide for display on, or use by, an extended-color-precision image display or processing subsystem 30. Accordingly, in step (1804), the first of the three encoded color components $E_R$, $E_G$ and $E_B$ is selected, for example, a sub-array of red $E_R(i, j)$ encoded color components comprising an array of $N_{ROW}$ rows and $N_{COL}$ columns, for example, as illustrated in FIG. 19a. In step (1806), the selected color component is assigned to the corresponding selected-color-component array Q of $N_{ROW}$ rows and $N_{COL}$ columns,—for example, as illustrated in FIG. 20,—wherein each element Q(i, j) of the selected-color-component array Q is in one-to-one correspondence with the corresponding selected encoded color component $E_R(i, j)$, $E_G(i, j)$ or $E_B(i, j)$.

Then, referring to FIGS. 19a-c and 20-22, in step (1808), the selected-color-component array Q is partitioned into a plurality of encoded image cell 58, D, K in number, each encoded image cell 58, $D_k$ comprising an array of M rows and N columns with M×N elements, wherein the elements of the encoded image cell 58, $D_k$ are collectively in one-to-one correspondence with the elements Q(i, j) of the selected-color-component array Q. For example, in the embodiments illustrated herein, M=N=2, and for the 10×10 array portions illustrated in FIGS. 19a-c and 20, there are 25 such encoded image cell 58, $D_k$, which are delineated by the bold-line internal borders in each of FIGS. 19a-c and 20. FIG. 21 illustrates a single encoded image cell 58, $D_k$ from the selected-color-component array Q containing elements Q(i1, j1), Q(i1, j2), Q(i2, j1) and Q(i2, j2), wherein i1=2p−1, i2=2p, j1=2q−1 and j2=2q, wherein p and q are indexes of the encoded image cell 58, $D_k$ within the selected-color-component array Q. Then, in step (1810), the first encoded image cell 58, $D_k$ is selected for decoding, for example, by setting k=1. Referring to FIG. 22, each element of the encoded image cell 58, $D_k$ contains a legacy-color-precision value comprising $N_{MS}$ bits, for example, 8 bits.

Figure 23:
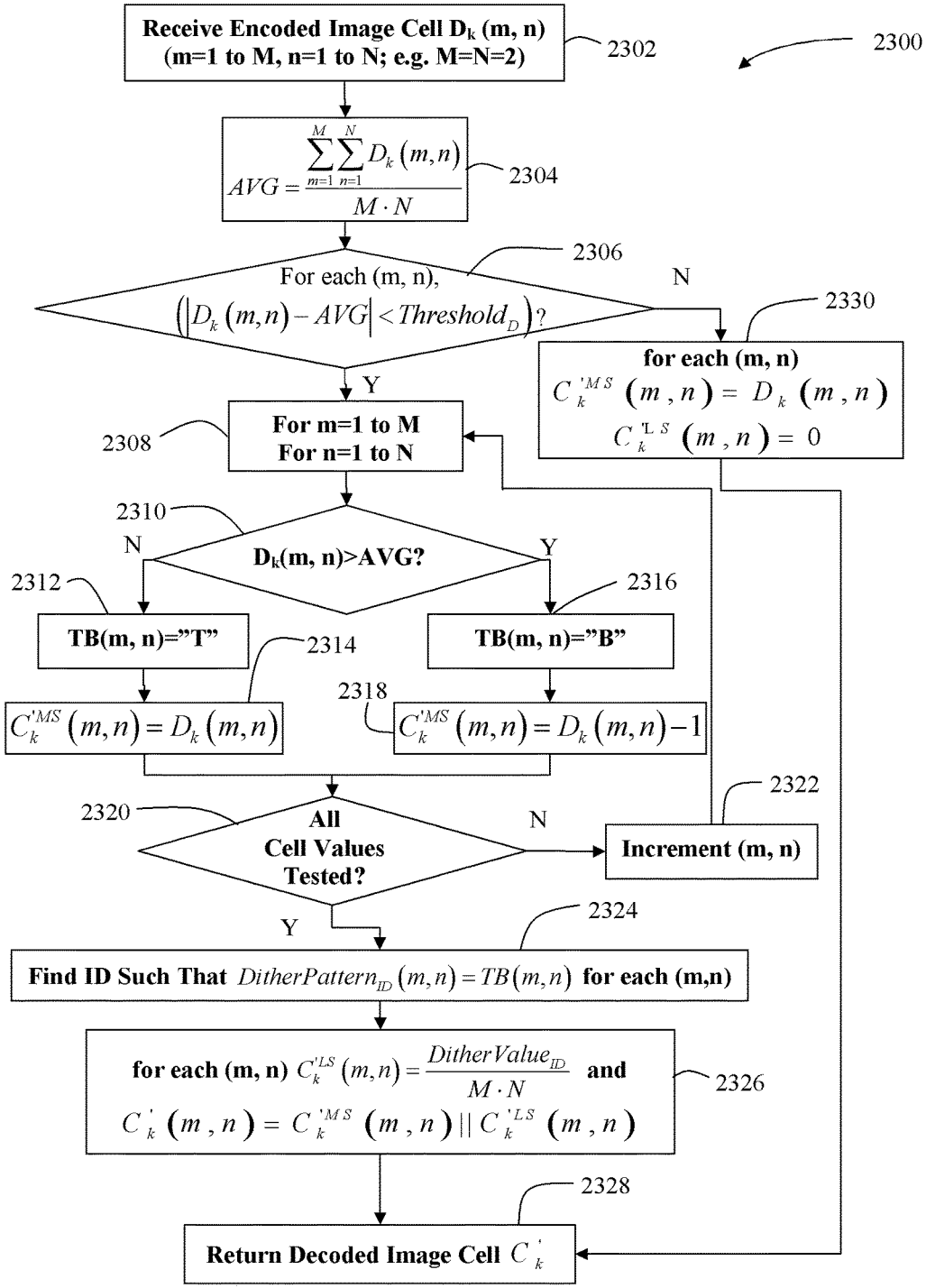
FIG. 23 illustrates a flow chart of a first embodiment of a relatively-lower-level portion of an image decoding process called from the process illustrated in FIG. 18 and carried out by the image decoding subsystem illustrated in FIG. 1.

In step (1812), in accordance with a first aspect, the selected encoded image cell 58, $D_k$ is decoded in accordance with an image decoding subprocess 2300, 2600, a first embodiment 2300 of which is illustrated in FIG. 23.

Referring to FIG. 23, the first embodiment of the image decoding subprocess 2300 commences with step (2302), with the receipt of the encoded image cell 58, $D_k$ containing encoded legacy-color-precision values $D_k(m, n)$ for the color component R, G, or B being encoded. In step (2304), a cell average AVG of the values $D_k(m, n)$ of the encoded image cell 58, $D_k$ is calculated by dividing the sum of the values $D_k(m, n)$ of all the elements of the encoded image cell 58, $D_k$, i.e. $D_k(m, n)$ for m=1 to M and n=1 to N, by (M·N), the number of elements of the encoded image cell 58, $D_k$. Then, in step (2306), if each of the values $D_k(m, n)$ of the encoded image cell 58, $D_k$ deviates from the cell average AVG by no more than a corresponding decode threshold $Threshold_D$, the associated encoded image cell 58, $D_k$ is considered to correspond to a "selected cell" and the image decoding subprocess 2300 continues with step (2308); otherwise the associated encoded image cell 58, $D_k$ is NOT considered to correspond to a "selected cell" and the image decoding subprocess 2300 continues with step (2330). For example, the decode threshold $Threshold_D$ is typically empirically determined, but is generally the value of one least-significant bit (LSB) in legacy-color-precision space, i.e. $2^{N_{LS}}$ in extended-color-precision space, but in practice increased to either account for error or improve performance. Accordingly, for a 2×2 encoded image cell 58, $D_k$, If ($|D_k(1,1)-\text{AVG}|<\text{Threshold}_D$ AND $|D_k(1,2)-\text{AVG}|<\text{Threshold}_D$ AND $|D_k(2,1)-\text{AVG}|<\text{Threshold}_D$ AND $D_k(2,2)-\text{AVG}|<\text{Threshold}_D$) then step (2308); else step (2330). (4)

If the result of step (2306) is TRUE, then, in steps (2308)-(2322), the value of each element $D_k(m, n)$ of the encoded image cell 58, $D_k$ is tested to determine whether the value of the corresponding element $C_k(m, n)$ of the corresponding image cell 42, $C_k$ had been previously either "truncated" value or "bumped" during the associated image encoding process 600 by which the corresponding encoded image cell 58, $D_k$ had been generated. More particularly, in steps (2308), (2320) and (2322), indexes m and n are set to provide for successively selecting each of the elements of the encoded image cell 58, $D_k$. Following step (2308), if, in step (2310), the selected element $D_k(m, n)$ of the encoded image cell 58, $D_k$ is not greater than the value of the cell average AVG calculated in step (2304), then that element $D_k(m, n)$ is assumed have been generated by "truncating" the corresponding element $C_k(m, n)$ of the corresponding image cell 42, $C_k$. Accordingly, in step (2312), a corresponding element TB(m, n) of a binary-valued array TB is set to a first binary value, e.g. "T", and in step (2314), the value of the most-significant portion of a corresponding element $C'_k{}^{MS}(m, n)$ of a corresponding decoded image cell 64, $C'_k$ is set equal to the value of the corresponding element $D_k(m, n)$ of the encoded image cell 58, $D_k$. Otherwise, if, in step (2310), the selected element $D_k(m, n)$ of the encoded image cell 58, $D_k$ is greater than the value of the cell average AVG calculated in step (2304), then that element $D_k(m, n)$ is assumed have been generated by "bumping" the corresponding element $C_k(m, n)$ of the corresponding image cell 42, $C_k$. Accordingly, in step (2316), a corresponding element TB(m, n) of the binary-valued array TB is set to a second binary value, e.g. "B", and in step (2318), the value of the most-significant portion of the corresponding element $C'_k{}^{MS}(m, n)$ of a corresponding decoded image cell 64, $C'_k$ is set equal to the value of the corresponding element $D_k(m, n)$ of the encoded image cell 58, $D_k$ decremented by one, so as to undo the "bumping". Accordingly, the binary-valued array TB provides for determining the associated dither pattern 56' that had been used when generating the encoded image cell 58, $D_k$, which can then be used to determine an approximation for the least-significant portion of the elements $C'_k{}^{LS}(m, n)$ of the corresponding decoded image cell 64, $C'_k$.

More particularly, following step (2320) after all elements $D_k(m, n)$ have been tested, in step (2324), the value of a corresponding index 46, ID is determined as the value from the first column 50 of the pattern table 48 illustrated in FIG. 14 from the row for which the value of the dither pattern 56' of the dither pattern array 56 from the second column 54 of the pattern table 48 matches the corresponding dither pattern 56' of the binary-valued array TB determined in steps (2308)-(2322). Then, in step (2326), the value of the least-significant portion of each of the elements $C'_k{}^{LS}(m, n)$ of the corresponding decoded image cell 64, $C'_k$ is set equal to an associated dither value DitherValue$_{ID}$ divided by (M·N), the number of elements of the decoded image cell 64, $C'_k$, wherein the dither value DitherValue$_{ID}$ is within the range of cell error energy 44, NRG from the third column 52 of the pattern table 48 for the row for which the value of the first column 50 of the pattern table 48 is equal to the above-determined index 46, ID from step (2324). For example, the dither value DitherValue$_{ID}$ could be any value within the range of values from the third column 52 of the pattern table 48 for the particular index 46, ID, for example, a value closest to either a median of the range or an average of the extremes of the range. Referring also to FIG. 24, the resulting value of each element $C'_k(m, n)$ of the corresponding decoded image cell 64, $C'_k$ is then given by the concatenation of the most-significant portion $C'_k{}^{MS}(m, n)$ from steps (2314) or (2318), with the least-significant portion $C'_k{}^{LS}(m, n)$=DitherValue$_{ID}$/(M·N) from step (2326).

If the conditions of step (2306) were not satisfied, then, in step (2330), for each element $C'_k(m, n)$ of the decoded image cell 64, $C'_k$, the most-significant portion $C'_k{}^{MS}(m, n)$ thereof is set equal to the value of the corresponding element $D_k(m, n)$ of the encoded image cell 58, $D_k$, and the least-significant portion $C'_k{}^{LS}(m, n)$ thereof is set equal to zero (or some other value that is constant for each element $C'_k(m, n)$ of the decoded image cell 64, $C'_k$).

Then, in step (2328), the decoded image cell 64, $C'_k$ is returned, thereby completing step (1812) of the first embodiment of the image decoding process 1800.

Figure 25:
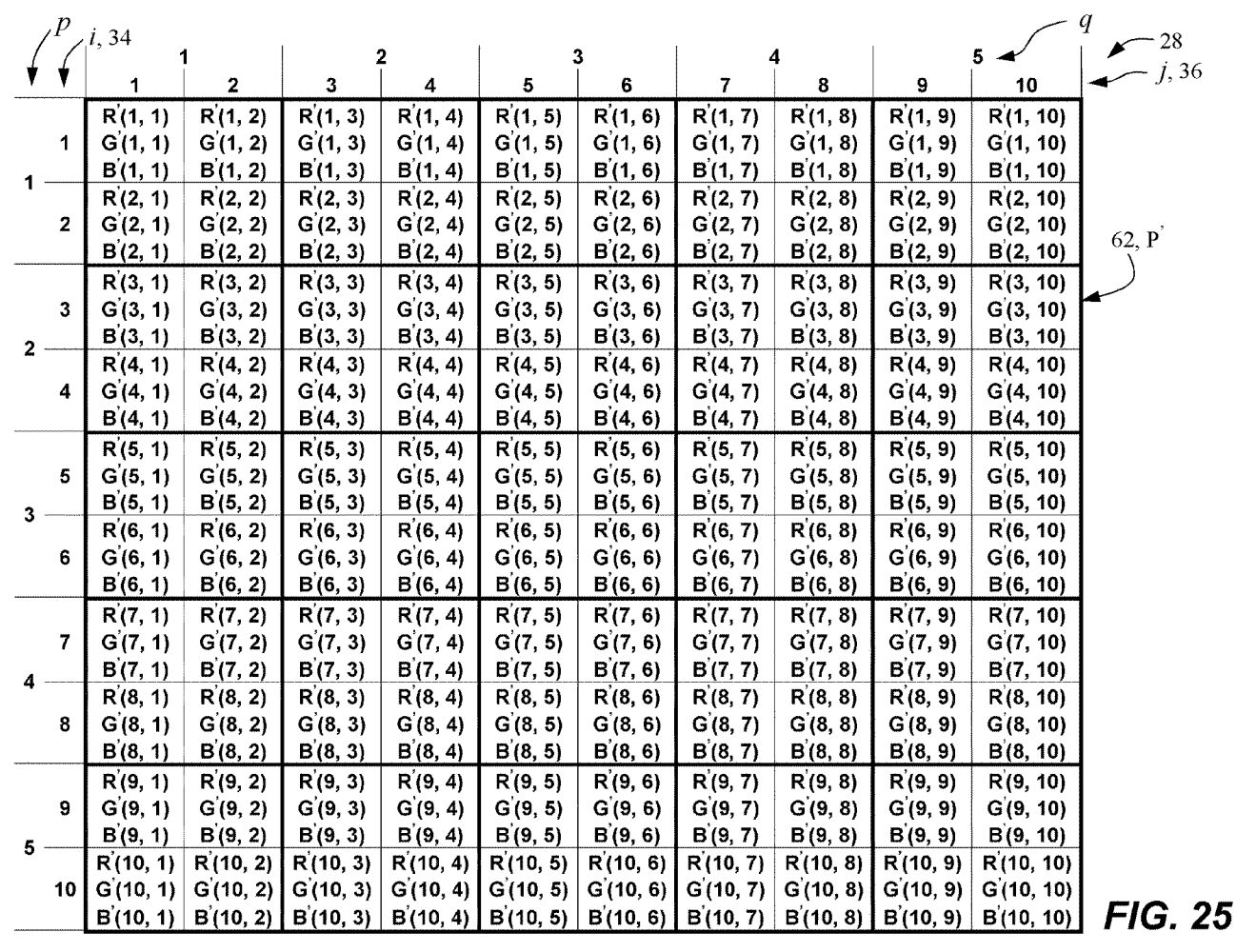

Returning to FIG. 18, following step (1812), in step (1814), the $k^{th}$ decoded image cell 64, $C'_k$ for the currently selected color component R, G or B is stored in the corresponding portions of the corresponding decoded pixels 62, P' of the decoded extended-color-precision image 28. FIG. 25 illustrates the decoded pixels 62, P' of a 10×10 portion of a decoded extended-color-precision image 28 generated from, and corresponding to, the encoded image 16 illustrated in FIG. 16, and corresponding to the extended-color-precision image 12, 12.1 illustrated in FIG. 2. For example, designating the selected color component as X, then step (1814) would result in X'(2p−1,2q−1)=$C'_k(1,1)$, X' (2p,2q−1)=$C'_k(2,1)$, X' (2p−1,2q)=$C'_k(1,2)$, X' (2p,2q)=$C'_k(2,2)$, wherein indexes (p, q) of cells within the decoded extended-color-precision image 28 correspond to index k of both the associated image cell 42, $C_k$ and decoded image cell 64, $C'_k$. For example, with respect to the decoded extended-color-precision image 28 illustrated in FIG. 25, k=5·(p−1)+q.

Then, in step (1816), if all K image cells 42, $C_k$ have not been processed, then in step (1818), index k is incremented so as to point to the next cell, and the first embodiment of the image decoding process 1800 is repeated beginning with step (1812). Otherwise, from step (1816), if, in step (1820), all color components R, G and B have not been processed, then, in step (1822), the next color component R, G or B is selected, and the first embodiment of the image decoding process 1800 is repeated beginning with step (1806), for example, by then selecting either a sub-array of green $E_G$(i, j) encoded color components, for example, as illustrated in FIG. 19b, or a sub-array of blue $E_B$(i, j) encoded color components, for example, as illustrated in FIG. 19c. Otherwise, from step (1820), in step (1824), the first embodiment of the image decoding process 1800 completes and returns to the point of invocation, with the decoded extended-color-precision image 28 complete and suitable for display on, or use by, an extended-color-precision image display or processing subsystem 30.

The image encoding process 600 does not necessarily preserve the exact value of the least-significant portion LS of the extended-color-precision image 12 in the encoded image 16, 16', nor is this recoverable in the associated decoded extended-color-precision image 28. Instead, the least-significant portion LS is approximated by DitherValue$_{ID}$/(M·N) in the decoded extended-color-precision image 28. This approximation is generally sufficient to preserve the visual spatial detail in the image wherever significant intra-cell pixel value variations are present, because the process of conversion to legacy-color-precision does not represent a large, noticeable change in pixel values that are already substantially different from each other. However, where such intra-cell variation is small and therefore where removal of dithering patterns is of greatest value to remove graininess, such removal still leaves each pixel value of such a cell at the same level. If such cells of small variation are proximate to each other, then the transition from one such cell to the next in the new extended-color-precision image can be noticeable as a step in intensity where a gradual gradient is expected. Such an artifact can also be interpreted as a loss in spatial resolution since each such cell of pixels is effectively displayed as a single value, appearing now as one large pixel. A second embodiment of an image decoding subprocess 2600—illustrated in FIG. 26—provides for mitigating these effects as follows, particularly when decoding an encoded image 16, 16' that had been encoded in accordance with the second embodiment of the image encoding subprocess 1700.

Figure 26:
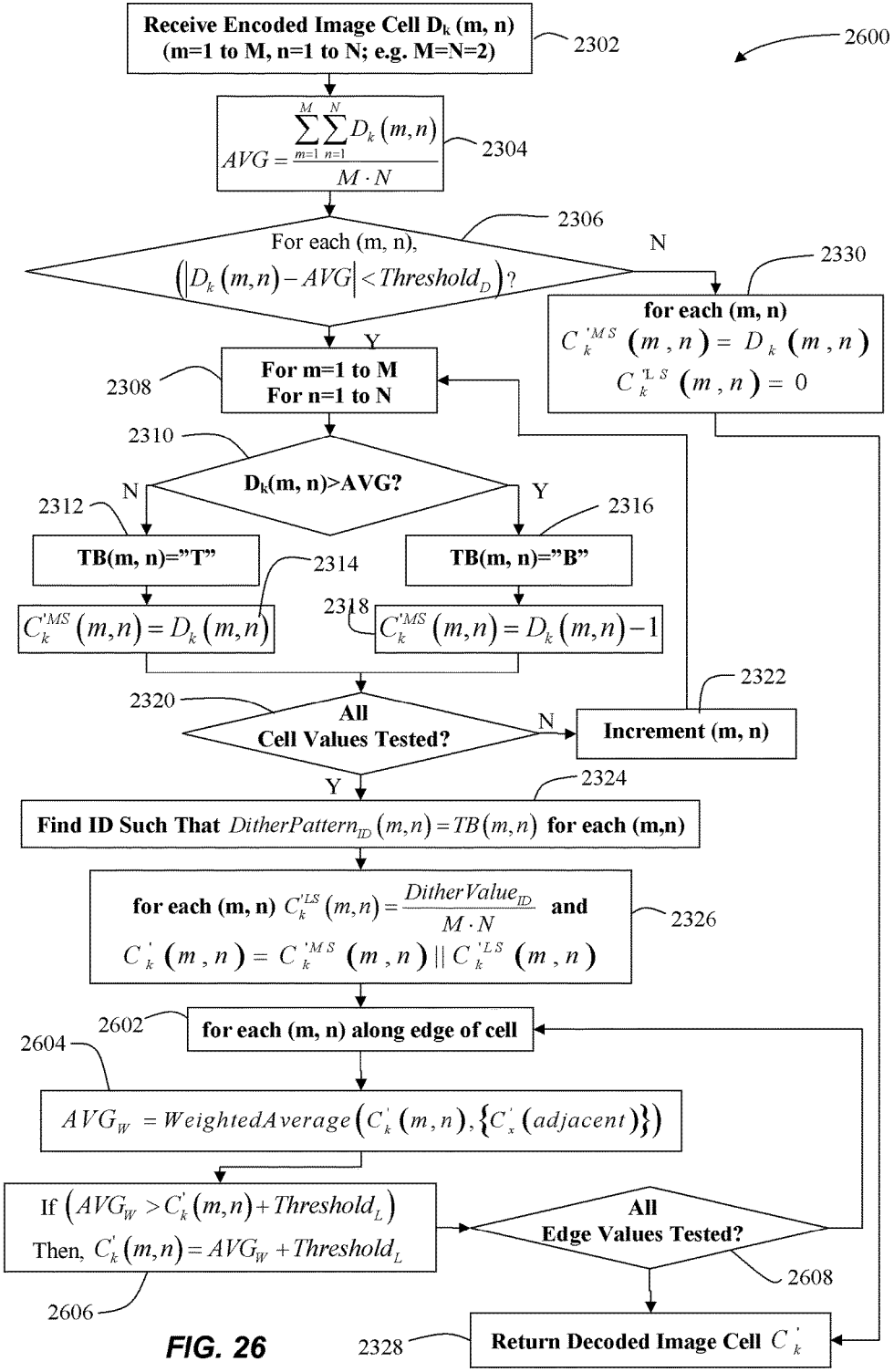
FIG. 26 illustrates a flow chart of a second embodiment of a relatively-lower-level portion of an image decoding process called from the process illustrated in FIG. 18 and carried out by the image decoding subsystem illustrated in FIG. 1.

Referring to FIG. 26, the second embodiment of the image decoding subprocess 2600 can alternatively be used to perform step (1812) of the image decoding process 1800. More particularly, the second embodiment of the image decoding subprocess 2600 is the same as the first embodiment of the image decoding subprocess 2300, except for addition of steps (2602) through (2608) between step (2326) and step (2328). More particularly, following step (2326), steps (2602) and (2608) provide for testing each element $C_k(m, n)$ of the decoded image cell 64, $C_k$ along an edge of the decoded image cell 64, $C_k$. In step (2604), a weighted average $AVG_W$ of the selected element $C_k(m, n)$ and the adjacent elements $C'_X(m, n)$ from adjacent decoded image cells 64, $C'_X$ is calculated, wherein an adjacent element $C'_X(m, n)$ is adjacent to the selected element $C'_k(m, n)$ if touching and in either the same row i or the same column j as the selected element $C'_k(m, n)$. For example, for an upper left UL selected element $C'_k(1, 1)$, the weighted average $AVG_W$ would include the adjacent elements from decoded image cells 64, $C'_X$ both above and to the left of the selected element $C'_k(m, n)$. For example, in one embodiment, the weighted average $AVG_W$ is given by:

$$AVG_W(m, n) = \frac{3 \cdot \sum C'_X + 5 \cdot C'_k(m, n)}{8}, \qquad (5)$$

wherein $\Sigma C'_X$ is the sum of the adjacent decoded image cells 64, $C'_X$, $AVG_W(m, n)$ is the value of the weighted average $AVG_W$ for the selected element $C'_k(m, n)$, and formulation of equation (5) provides for implementation using relatively fast binary computation using binary shift and addition operations.

Then, in step (2606), if the value of the weighted average $AVG_W$ is greater than the sum of the value of the selected element $C'_k(m, n)$ and a leveling threshold $Threshold_L$, then the value of the selected element $C'_k(m, n)$ is replaced with the sum of the weighted average $AVG_W$ and the leveling threshold $Threshold_L$, i.e. $AVG_W+Threshold_E$. If, in step (2604), any of the adjacent decoded image cells 64, $C'_X$ had not been previously determined in step (2326), then steps (2604) and (2606) can be postponed for the selected element $C'_k(m, n)$ until all of the adjacent decoded image cells 64, $C'_X$ have been so determined. Then, from step (2608), steps (2604) and (2606) are repeated until all edge elements have been processed. After all edge elements have been processed, following step (2608), the second embodiment of the image decoding subprocess 2600 continues with step (2328)—which returns to step (1812) of the image decoding process 1800,—the same as for the first embodiment of the image encoding subprocess 2300 described hereinabove and illustrated in FIG. 23. Generally, steps (2604) and (2606) could include other types of modifications or formulas that provide for a visually smoother transition between the selected element $C'_k(m, n)$ and the two edge-adjacent $C'_X(m, n)$, including but not limited to weighted averaging.

When used to decode and encoded image 16 that had been encoded using the second embodiment of the image encoding subprocess 1700, step (2606) can optionally provide for limiting the maximum deviation of any element $C_k(m, n)$ relative to the corresponding cell average AVG. In view of the extended-color-precision cell energy of each decoded image cell 64, $C'_k$ having been substantially restored—representing at least a good estimate of the original average value of all pixel values in the extended-color-precision decoded image cell 64, $C'_k$—the known maximum allowable deviation from the encoding process can be used to constrain the maximum modification of any decoded pixel 62, P' value for best conformance to its corresponding original value in the extended-color-precision image 12.

It should be understood that generally, every cell need not necessarily be encoded or decoded, but instead, the selection of which cells to encode or decode can be adapted so as to reduce visual artifacts, for example, as provided for the above-described second embodiment 1700 of the encoding process.

Furthermore, it should be understood that although legacy-color-precision generally refers to a color-component digital value of $N_{MS}$ bits in length, and extended-color-precision generally refers to a color-component digital value of a relatively larger $(N_{MS}+N_{LS})$ bits in length, legacy-color-precision images are not necessarily limited to display on, or use by, a legacy-color-precision image display or processing subsystem 18 per se.

Although M×N image cells 42, C of general size and shape have been disclosed herein, it has been observed that 2×2 image cells 42, C can be beneficial for video applications. The encoding and decoding processes disclosed herein can be adapted to encode an original image having 12-bit color values into a representative image having only 8-bit color values, which is therefore compatible with conventional 8-bit storage, transmission, playback and display methods and devices. However, any device which can decode the 8-bit image back into a representative 12-bit image may do so in accordance with the decoding processes disclosed herein, in support of displays which can present a greater color gamut without artifacts that might otherwise be apparent if only the 8-bit representation is used.

The proposed spatial energy dithering patterns support the restoration of extended-color-precision cell energies to 14 finer distinguishable levels, substantially close to the 15 distinguishable levels offered by a full 4 bits of additional precision for an image cell 42, C. Accordingly, a 2×2 image cell 42, C size is sufficient to encode a 12 bits-per-color image into an 8-bit per color image, at least with respect to the energy of a cell. Furthermore, an image cell 42, C represents a relatively small cell size so as to minimize the loss of spatial detail when actual pixel values are forced to average energy values. As spatial display resolutions increase to newer standards such as 3840×2160, and especially when such displays are presenting realistic imagery that typically does not contain extreme detail, such loss of spatial detail becomes increasingly unnoticeable within such a relatively small image cell 42, C. Yet further, a 2×2 image cell 42, C is also small enough that every averaged pixel element in the image cell 42, C has edge-adjacent neighboring pixel elements to provide strong clues to modify those pixel elements so as to be closer to their original values so that details within such an image cell 42, C are at least partially restored, reducing the visibility of the cell structure altogether.

Figure 27:
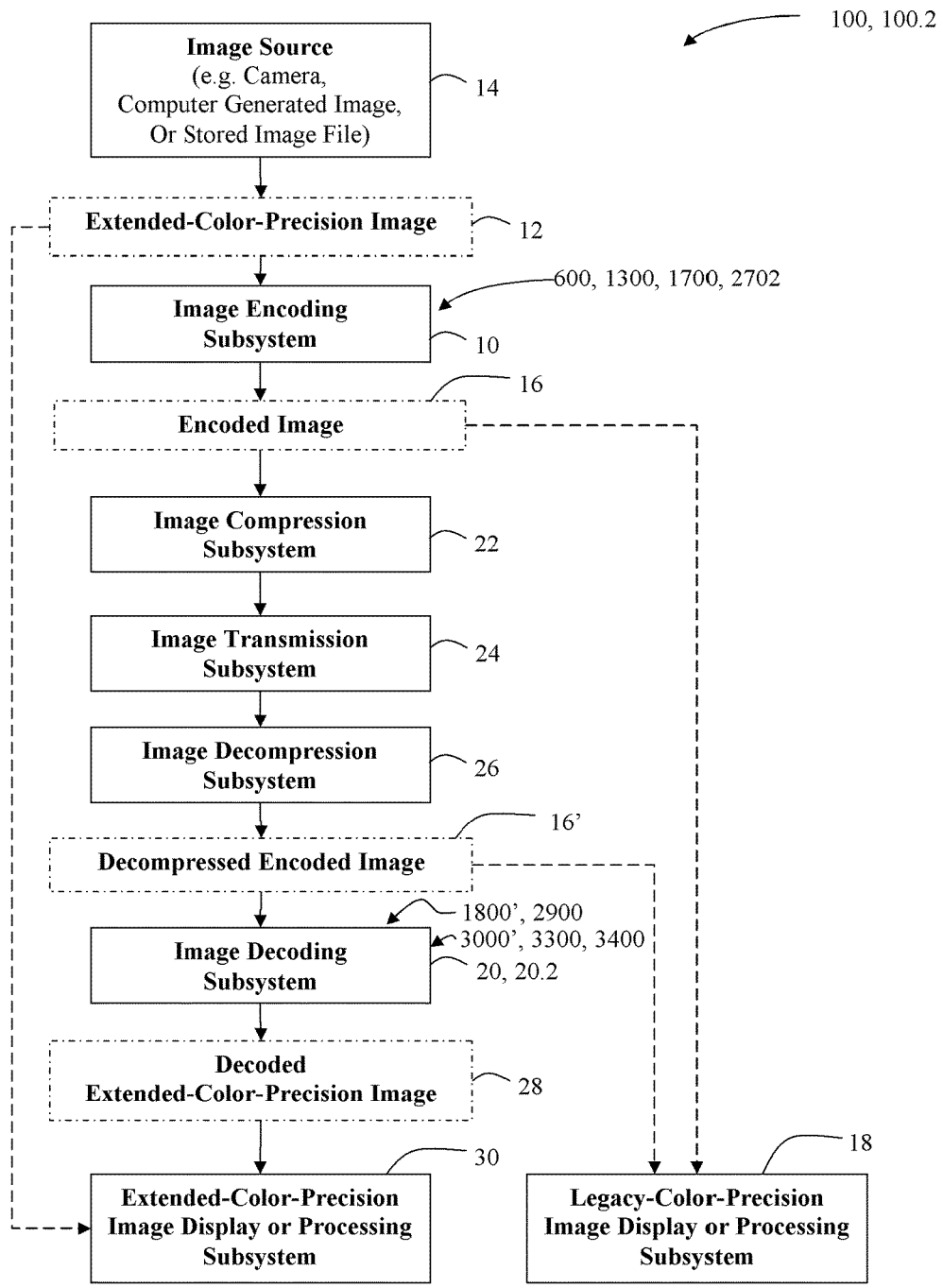
FIG. 27 illustrates a block diagram of a second aspect of an image processing system incorporating image encoding and image decoding subsystems and associated processes.

Referring to FIG. 27, a second aspect of an image processing system 100, 100.2—similar, except as described otherwise hereinbelow, to the above-described first aspect of the image processing system 100, 100.1—provides for reduced susceptibility to errors or artifacts in the associated encoded image 16 introduced by the associated image compression 22, image transmission 24 or image decompression 26 subsystems, for example, which adversely affect the least-significant portion of the data of the encoded pixels 40, $P_E$.

More particularly, the second aspect of the image processing system 100, 100.2 provides for decoding an encoded image 16 that has been encoded by either any of the above-described image encoding processes 600, 1300 or 1700, or that has been encoded by a conventional dithering process 2702, for example, in accordance with—but not limited to—conventional dithering processes described in either http://en.wikipedia.org/wiki/Ordered_dithering or http://michael.is/projects/image-dithering-in-matlab/, each of which documents is incorporated herein by reference.

Figure 28:
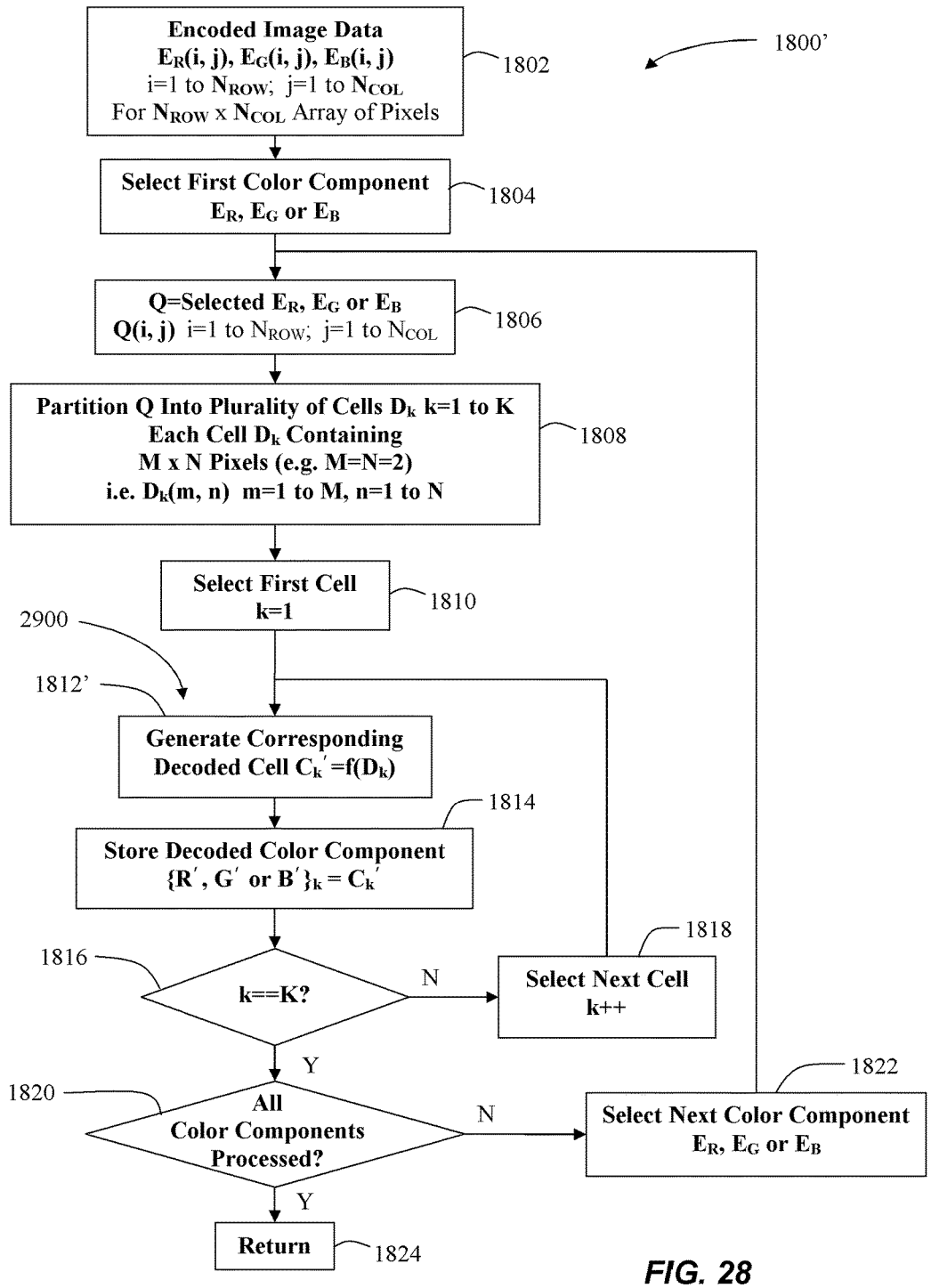
FIG. 28 illustrates a flow chart of a second aspect of a relatively-higher-level portion of an image decoding process carried out by the image decoding subsystem illustrated in FIG. 27.

Referring also to FIG. 28, in accordance with the second aspect of an image processing system 100, 100.2, a second aspect of an associated image decoding subsystem 20, 20.2 operates in accordance with an associated second aspect of an image decoding process 1800'—illustrated in FIG. 28—that, as with the first aspect of the image decoding process 1800 illustrated in FIG. 18, provides for transforming the encoded image 16, 16' into a decoded extended-color-precision image 28 that is suitable for display on, or use by, extended-color-precision image display or processing subsystem 30 substantially without the above-described visual banding or "posturization" artifacts.

More particularly, the second aspect of an image decoding process 1800' operates the same as the first aspect of the image decoding process 1800 as described hereinabove, except for step (1812')—following step (1810) or subsequently following step (1818), and preceding step (1814)—in which the selected encoded image cell 58, $D_k$ is decoded in accordance with a third embodiment of an image decoding subprocess 2900.

Figure 29:
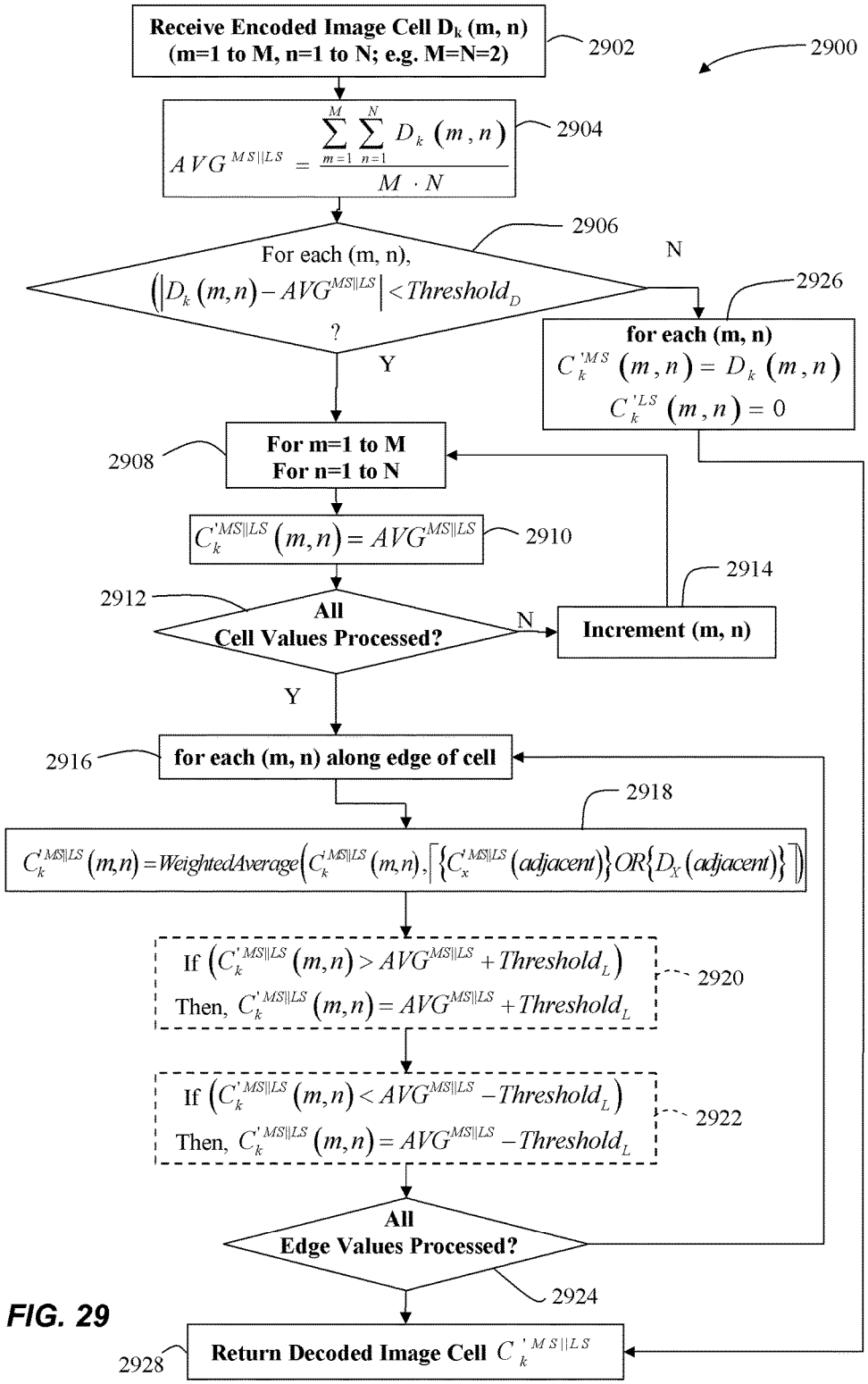
FIG. 29 illustrates a flow chart of a third embodiment of a relatively-lower-level portion of an image decoding process called from the process illustrated in FIG. 28 and carried out by the image decoding subsystem illustrated in FIG. 27.

Referring to FIG. 29, the third embodiment of the image decoding subprocess 2900 commences with step (2902), with the receipt of the encoded image cell 58, $D_k$ containing encoded legacy-color-precision values $D_k(m, n)$ for the color component R, G, or B being encoded. In step (2904), a full-color precision cell average $AVG^{MS\|LS}$ of the values $D_k(m, n)$ of the encoded image cell 58, $D_k$ is calculated by dividing the sum of the values $D_k(m, n)$ of all the elements of the encoded image cell 58, $D_k$, i.e. $D_k(m, n)$ for m=1 to M and n=1 to N, by (M·N), the number of elements of the encoded image cell 58, $D_k$. Then, in step (2906), if each of the values $D_k(m, n)$ of the encoded image cell 58, $D_k$ deviates from the full-color precision cell average $AVG^{MS\|LS}$ by y no more than a corresponding decode threshold $Threshold_D$, the associated encoded image cell 58, $D_k$ is considered to correspond to a "selected cell" and the image decoding subprocess 2300 continues with step (2908); otherwise the associated encoded image cell 58, $D_k$ is NOT considered to correspond to a "selected cell" and the image decoding subprocess 2300 continues with step (2928). For example, the decode threshold $Threshold_D$ is typically empirically determined, but is generally the value of one least-significant bit (LSB) in legacy-color-precision space, i.e. $2^{N_{LS}}$ in extended-color-precision space, but in practice increased to either account for error or improve performance. Accordingly, for a 2×2 encoded image cell 58, $D_k$, If ($|D_k(1,1)-AVG^{MS\|LS}|<Threshold_D$ AND $|D_k(1,2)-AVG^{MS\|LS}|<Threshold_D$ AND $|D_k(2,1)-AVG^{MS\|LS}|<Threshold_D$ AND $|D_k(2,2)-AVG^{MS\|LS}|<Threshold_D$) then step (2908);
   else step (2928). (6)

If the result of step (2906) is TRUE, then, in steps (2908)-(2914), the value of each element, $C'^{MS\|LS}_k(m, n)$ of the corresponding decoded image cell 64, $C'_k$ is set equal to the full-color precision cell average $AVG^{MS\|LS}$ that was calculated in step (2906), wherein $C'^{MS\|LS}_k(m, n)$ is the full-color-precision value of the element (m, n) of the decoded image cell 64, $C'_k$.

Then, steps (2916) and (2624) provide for processing each element $C'^{MS\|LS}_k(m, n)$ of the decoded image cell 64, $C'_k$ along an edge of the decoded image cell 64, $C'_k$. In step (2918), the value of the element $C'^{MS\|LS}_k(m, n)$ of the decoded image cell 64, $C'_k$ is set equal to a weighted average of the selected element $C'^{MS\|LS}_k(m, n)$ and either the adjacent elements $C'^{MS\|LS}_X(m, n)$ from adjacent decoded image cells 64, $C'_X$, or the corresponding adjacent elements $D_X(m, n)$ of adjacent encoded image cells 58, $D_X$, or a combination of adjacent elements $C'^{MS\|LS}_X(m, n)$, $D_X(m, n)$. For example, when processing the first element $C'^{MS\|LS}_1(m, n)$, each of the adjacent elements will necessarily be from adjacent encoded image cells 58, $D_X$, whereas when processing subsequent element $C'^{MS\|LS}_k(m, n)$, either an adjacent element $C'^{MS\|LS}_X(m, n)$ of an adjacent decoded image cell 64, $C'_X$ may be used if available, or alternatively, the corresponding adjacent element $D_X(m, n)$ of adjacent encoded image cell 58, $D_X$ may be used. For example, for a 2×2 image cell 42, $C_k$, in one embodiment, the weighted average is given by, the sum of the element $C'^{MS\|LS}_k(m, n)$ of the decoded image cell 64, $C'_k$ and the average of the associated adjacent elements $C'^{MS\|LS}_X(m, n)$ from adjacent decoded image cells 64, $C'_X$, i.e.:

$$C'^{MS\|LS}_k(m, n) = \frac{\sum C'_X + 2 \cdot C'^{MS\|LS}_k(m, n)}{4}, \quad (7a)$$

or, the sum of the element $C'^{MS\|LS}_k(m, n)$ of the decoded image cell 64, $C'_k$ and the average of the associated adjacent elements $D_X(m, n)$ of adjacent encoded image cells 58, $D_X$, i.e.:

$$C'^{MS\|LS}_k(m, n) = \frac{\sum D_X + 2 \cdot C'^{MS\|LS}_k(m, n)}{4}, \quad (7b)$$

or, the sum of the element $C'^{MS\|LS}_k(m, n)$ of the decoded image cell 64, $C'_k$ and the average of a combination of associated adjacent elements $C'^{MS\|LS}_X(m, n)$ from adjacent decoded image cells 64, C'$_X$ and associated adjacent elements D$_X$(m, n) of adjacent encoded image cells 58, D$_X$ i.e.:

$$C_k'^{MS\|LS}(m,n) = \frac{\sum\{C_X', D_X\} + 2 \cdot C_k'^{MS\|LS}(m,n)}{4}. \quad (7c)$$

Following step (2918), optionally, in step (2920), if the value of the element C'$_k^{MS\|LS}$(m, n) of the decoded image cell 64, C'$_k$ from step (2918) exceeds value of the full-color precision cell average AVG$^{MS\|LS}$ by more than a leveling threshold Threshold$_L$ then the value of the element C'$_k^{MS\|LS}$(m, n) of the decoded image cell 64, C'$_k$ is clipped as follows:

$$C_k'^{MS\|LS}(m,n) = \text{AVG}^{MS\|LS} + \text{Threshold}_L. \quad (8a)$$

Similarly, following steps (2918) or (2920), optionally, in step (2922), if the value of the full-color precision cell average AVG$^{MS\|LS}$ exceeds value of the element C'$_k^{MS\|LS}$(m, n) of the decoded image cell 64, C'$_k$ from step (2918) by more than a leveling threshold Threshold$_L$ then the value of the element, C'$_k^{MS\|LS}$(m, n) of the decoded image cell 64, C'$_k$ is clipped as follows:

$$C_k'^{MS\|LS}(m,n) = \text{AVG}^{MS\|LS} - \text{Threshold}_L. \quad (8b)$$

Following step (2924), then steps (2916) and (2918),—and then, optionally, also steps (2920) and (2622),—are repeated until all edge elements have been processed.

If the conditions of step (2906) were not satisfied, then, in step (2926), for each element C'$_k$(m, n) of the decoded image cell 64, C'$_k$, the most-significant portion C'$_k^{MS}$(m, n) thereof is set equal to the value of the corresponding element D$_k$(m, n) of the encoded image cell 58, D$_k$, and the least-significant portion C$_k^{LS}$(m, n) thereof is set equal to zero (or some other value that is constant for each element C'$_k$(m, n) of the decoded image cell 64, C'$_k$).

After all edge elements have been processed, following step (2924), or from step (2926), in step (2928), the third embodiment of the image decoding subprocess 2900 returns to step (1812') of the second aspect of the image decoding process 1800', which then continues with step (1814) et seq., the same as described hereinabove for the first aspect of the image decoding process 1800.

The effect of weighted averaging of step (2918), or the clipping of steps (2920) and (2922), of the second aspect of the image decoding process 1800', provides for substantially mitigating against the otherwise relative inaccuracy of the uniform cell average of step (2910)—which necessarily removes the dithering graininess within that cell—relative to the relatively more accurate approximations of the first aspect of the image decoding process 1800, the latter of which provides for more closely returning the average energy of the cell to the corresponding level of the original relatively extended-color-precision image. Accordingly, the second aspect of the image decoding process 1800' provides results that are substantially similar in appearance to that of the first aspect of the image decoding process 1800, because by selecting only cells of minimal internal variation, it is highly likely that sufficient values of higher precision for those cells can be predicted by some combination of average cell and surrounding values to produce a result visually devoid of banding artifacts. Furthermore, because the second aspect of the image decoding process 1800' is primarily responsive to deviations of individual pixel values from a cell average in combination with the influence of edge adjacent pixel values, any error or noise in the lower significant bits of the lower precision image becomes more effectively blended out in comparison with the first aspect of the image decoding process 1800, the latter which relies on individual pixel values to determine restored cell average values. The second aspect of the image decoding process 1800' can be tuned to respond to different levels of error, noise, or the particular dithering method that had been used to encode the image, by adjustment primarily of the decode threshold Threshold$_D$ and secondarily of the leveling threshold Threshold$_L$, the latter of which may be different for steps (2920) and (2922). Accordingly, the second aspect of the image decoding process 1800' can be alternatively used to process a non-encoded image that has been otherwise affected by either error or noise.

Figure 30:
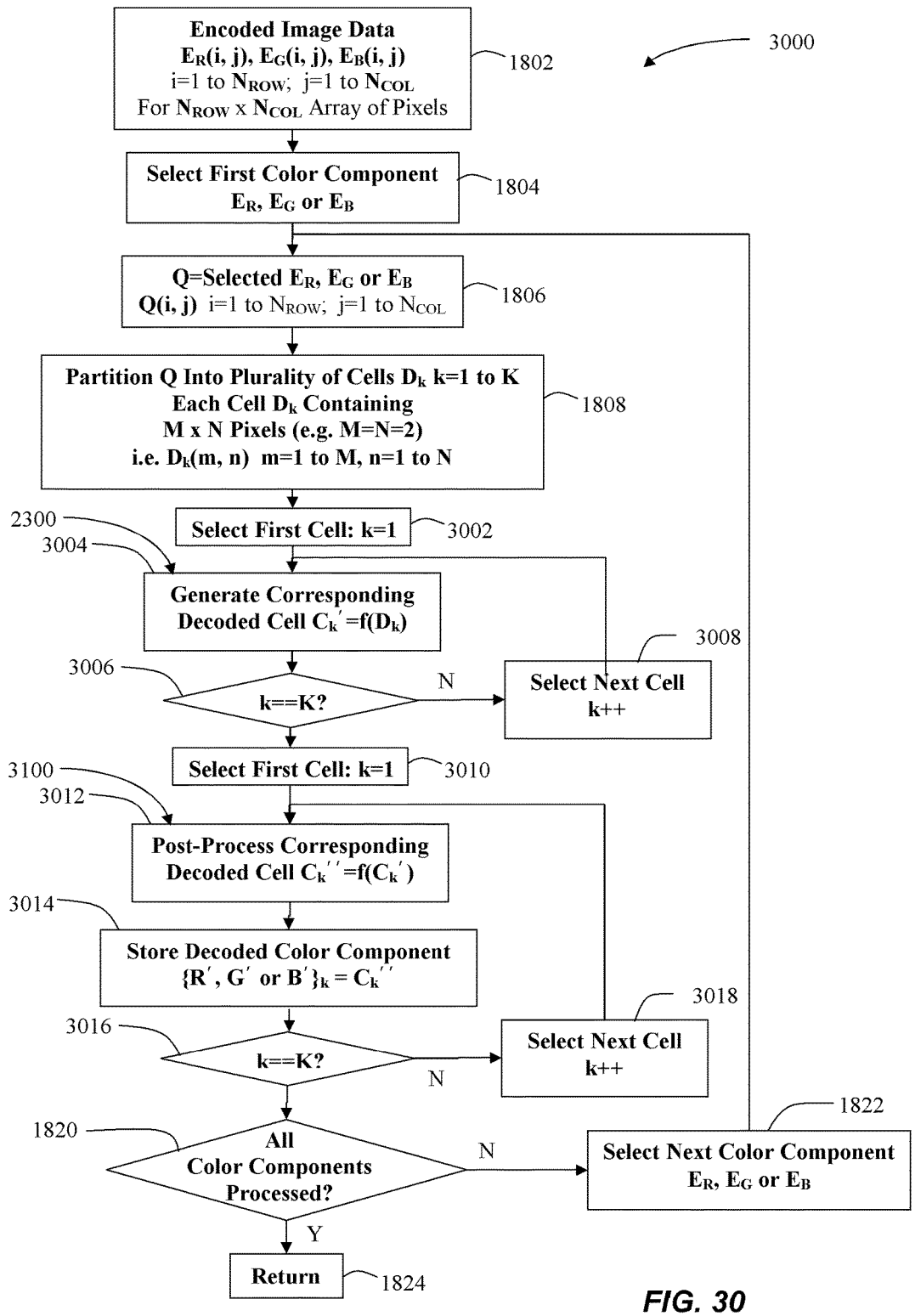
FIG. 30 illustrates a flow chart of an alternative embodiment of the first aspect of a relatively-higher-level portion of an image decoding process carried out by the image decoding subsystem illustrated in FIG. 1.
Figure 31:
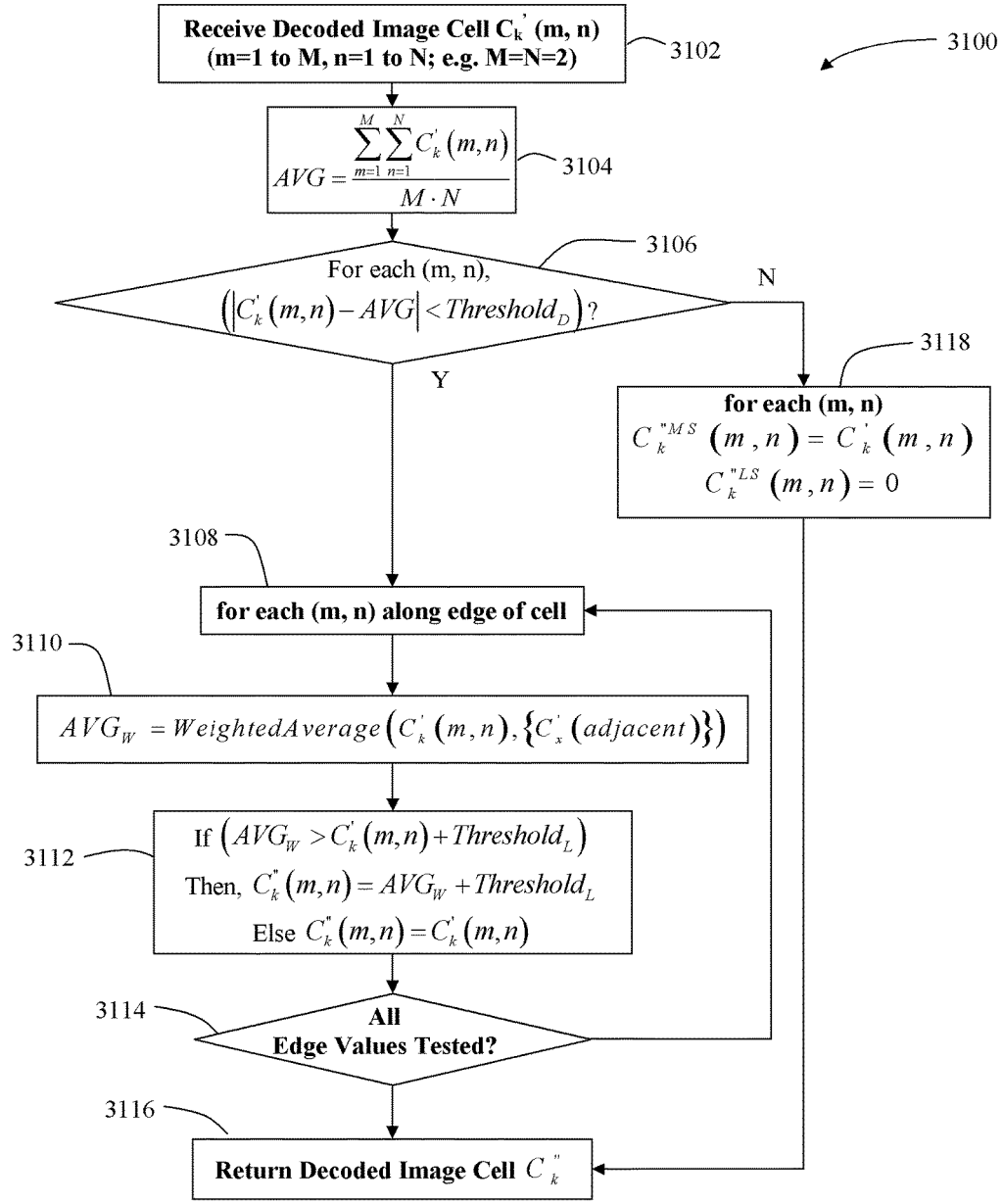
FIG. 31 illustrates a flow chart of a portion of an alternative second embodiment of a relatively-lower-level portion of an image decoding process called from the process illustrated in FIG. 30 and carried out by the image decoding subsystem illustrated in FIG. 1.

Referring to FIGS. 30 and 31, in an alternative embodiment of the first aspect of the relatively-higher-level portion of an image decoding process illustrated in FIGS. 18 and 26, steps (2602) through (2608)—that provide for replacing cell edge values with corresponding weighted averages so as to provide for an influence from pixel values of adjacent cells—are carried out after all of the cells have been initially decoded. More particularly, the image decoding process 3000 illustrated in FIG. 30 is an alternative to the first embodiment of the image decoding process 1800 illustrated in FIG. 18, for which steps (1802)-(1808) and (1820)-(1824) are the same for both, but for which steps (1810)-(1818) of image decoding process 1800 are replaced with steps (3002)-(3018) of image decoding process 3000.

More particularly, in step (3002), the first encoded image cell 58, D$_k$ is selected for decoding, for example, by setting k=1. Then, in step (3004), in accordance with the first aspect, the selected encoded image cell 58, D$_k$ is decoded in accordance with the above-described image decoding subprocess 2300, a first embodiment of which is illustrated in FIG. 23. Then, in step (3006), if all K image cells 42, C$_k$ have not been processed, then in step (3008), index k is incremented so as to point to the next cell, and the image decoding process 3000 is repeated beginning with step (3004).

Then, after all cells have been decoded by the image decoding subprocess 2300, in step (3010), the first decoded image cell 64, C'$_k$ is selected for post-processing, for example, by setting k=1.

Referring to FIG. 31, a post-processing image decoding subprocess 3100 commences with step (3102), with the receipt of the decoded image cell 64, C'$_k$. In step (3104), a cell average AVG of the values C'$_k$(m, n) of the decoded image cell 64, C'$_k$ is calculated by dividing the sum of the values C'$_k$(m, n) of all the elements of the decoded image cell 64, C'$_k$, i.e. C'$_k$(m, n) for m=1 to M and n=1 to N, by (M·N), the number of elements of the decoded image cell 64, C'$_k$. Then, in step (3106), if each of the values C'$_k$(m, n) of the decoded image cell 64, C'$_k$ deviates from the cell average AVG by no more than a corresponding decode threshold Threshold$_D$, the associated decoded image cell 64, C'$_k$ is considered to correspond to a "selected cell" and the post-processing image decoding subprocess 3100 continues with step (3108); otherwise the associated decoded image cell 64, C'$_k$ is NOT considered to correspond to a "selected cell" and the post-processing image decoding subprocess 3100 continues with step (3118).

If the result of step (3106) is TRUE, then, steps (3108) and (3114) provide for testing each element C'$_k$(m, n) of the decoded image cell 64, C'$_k$ along an edge of the decoded image cell 64, C'$_k$. In step (3110), a weighted average AVG$_W$ of the selected element C'$_k$(m, n) and the adjacent elements C'$_X$(m, n) from adjacent decoded image cells 64, C'$_X$ is calculated, wherein an adjacent element C'$_X$(m, n) is adjacent to the selected element C'$_k$(m, n) if touching and in either the same row i or the same column j as the selected element C'$_k$(m, n). For example, for an upper left UL selected element C$_k$(1, 1), the weighted average AVG$_W$ would include the adjacent elements from decoded image cells 64, C'$_X$ both above and to the left of the selected element C'$_k$(m, n). For example, in one embodiment, the weighted average AVG$_W$ is given by equation (5) hereinabove.

Then, in step (3112), if the value of the weighted average AVG$_W$ is greater than the sum of the value of the selected element C'$_k$(m, n) and a leveling threshold Threshold$_L$, then the value of the k$^{th}$ post-processed decoded image cell 64', C"$_k$ corresponding to the selected element C'$_k$(m, n) is set to the sum of the weighted average AVG$_W$ and the leveling threshold Threshold$_L$, i.e. AVG$_W$+Threshold$_E$. Then, from step (3114), steps (3110) and (3112) are repeated until all edge elements have been processed. After all edge elements have been processed, following step (3114), the post-processing image decoding subprocess 3100 continues with step (3116)—which returns to step (3012) of the image decoding process 3000. Generally, steps (3110) and (3112) could include other types of modifications or formulas that provide for a visually smoother transition between the selected element C'$_k$(m, n) and the two edge-adjacent C'$_X$(m, n), including but not limited to a weighted averaging. If the conditions of step (3106) were not satisfied, then, in step (3118), for each element C"$_k$(m, n) of the k$^{th}$ post-processed decoded image cell 64', C"$_k$, the most-significant portion C"$_k^{MS}$(m, n) thereof is set equal to the value of the corresponding element C'$_k$(m, n) of the decoded image cell 64, C'$_k$, and the value of the corresponding least-significant portion C"$_k^{LS}$(m, n) thereof is set equal to zero (or some other value that is constant for each element C'$_k$(m, n) of the decoded image cell 64, C'$_k$).

Returning to FIG. 30, following step (3012), in step (3014), the k$^{th}$ post-processed decoded image cell 64', C"$_k$ for the currently selected color component R, G or B is stored in the corresponding portions of the corresponding decoded pixels 62, P' of the decoded extended-color-precision image 28.

Then, in step (3016), if all K image cells 42, C$_k$ have not been processed, then in step (3018), index k is incremented so as to point to the next cell, and the image decoding process 3000 is repeated beginning with step (3012). Otherwise, from step (3016), if, in step (1820), all color components R, G and B have not been processed, then, in step (1822), the next color component R, G or B is selected, and the image decoding process 3000 is repeated beginning with step (1806). Otherwise, from step (1820), in step (1824), the image decoding process 3000 completes and returns to the point of invocation, with the decoded extended-color-precision image 28 complete and suitable for display on, or use by, an extended-color-precision image display or processing subsystem 30.

Figure 32:
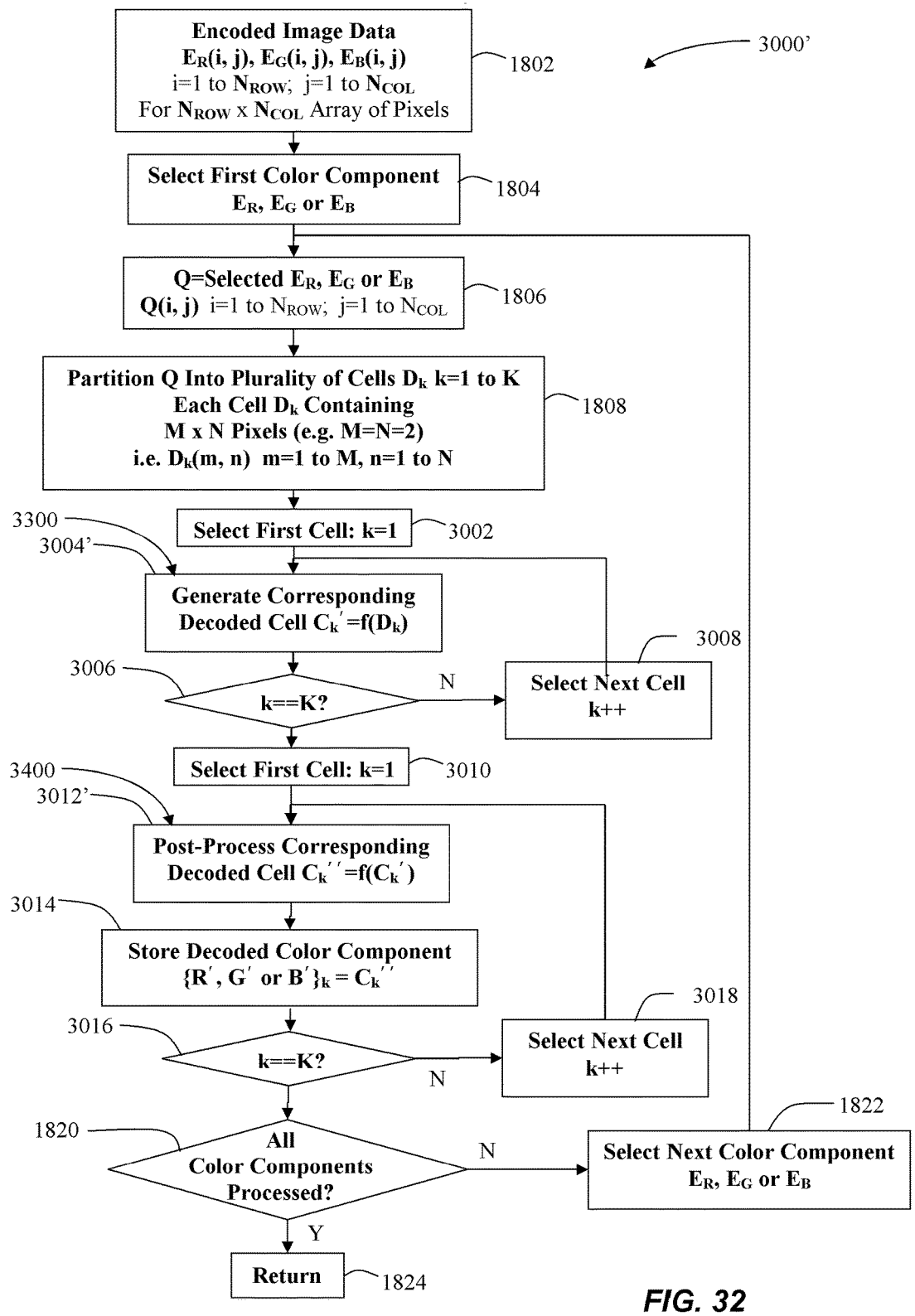
FIG. 32 illustrates a flow chart of an alternative embodiment of the second aspect of a relatively-higher-level portion of an image decoding process carried out by the image decoding subsystem illustrated in FIG. 27.
Figure 33:
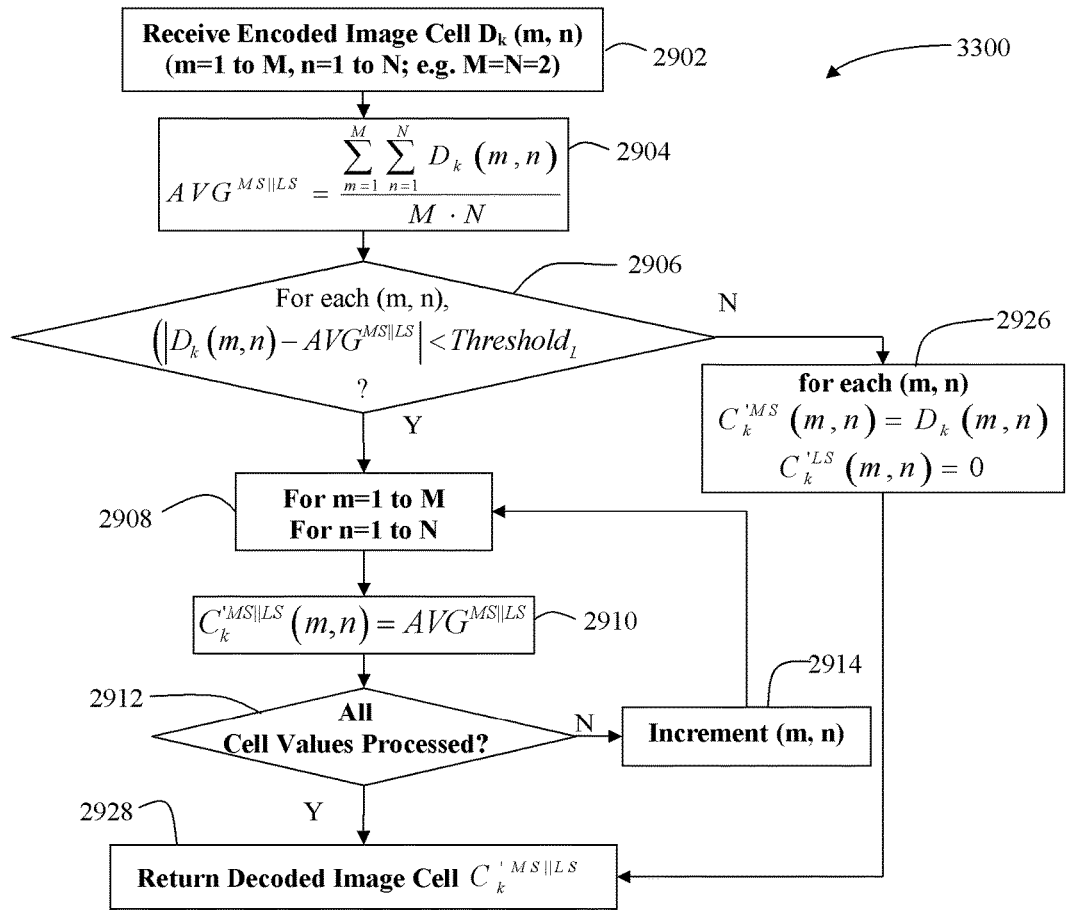
FIG. 33 illustrates a flow chart of a first portion of an alternative third embodiment of a relatively-lower-level portion of an image decoding process called from the process illustrated in FIG. 32 and carried out by the image decoding subsystem illustrated in FIG. 27.
Figure 34:
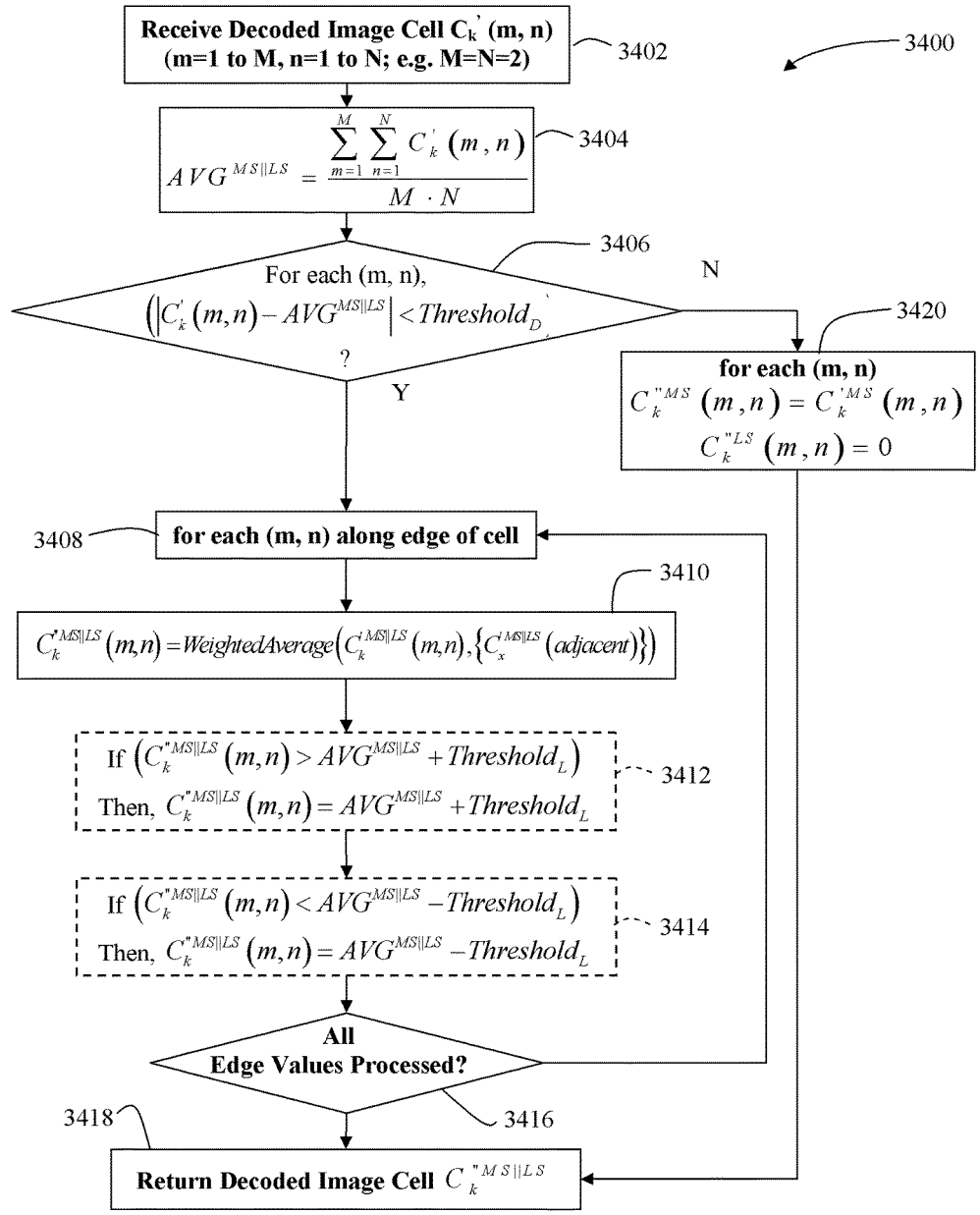
FIG. 34 illustrates a flow chart of a second portion of the alternative third embodiment of a relatively-lower-level portion of an image decoding process called from the process illustrated in FIG. 32 and carried out by the image decoding subsystem illustrated in FIG. 27.

Referring to FIGS. 32-34, in an alternative embodiment of the second aspect of the relatively-higher-level portion of an image decoding process illustrated in FIGS. 28 and 29, steps (2916) through (2924)—that provide for replacing cell edge values with corresponding weighted averages so as to provide for an influence from pixel values of adjacent cells—are carried out after all of the cells have been initially decoded. More particularly, the image decoding process 3000' illustrated in FIG. 32 is an alternative to the image decoding process 1800' illustrated in FIG. 28, but which otherwise corresponds to the alternative embodiment of the image decoding process 3000 illustrated in FIG. 30, but with steps (3004') and (3012') of the image decoding process 3000' superseding steps (3004) and (3012) of image decoding process 3000.

More particularly, in step (3004'), following step (3002), in accordance with the second aspect, the selected encoded image cell 58, D$_k$ is decoded in accordance with steps (2902) through (2928) of an associated image decoding subprocess 3300 illustrated in FIG. 33, which are the same as for the above-described third embodiment of the image decoding subprocess 2900.

Furthermore, in step (3012'), following step (3010), is carried out by an associated post-processing image decoding subprocess 3400 illustrated in FIG. 34, that commences with step (3402), with the receipt of the decoded image cell 64, C'$_k$ for the color component R, G, or B being decoded. Then, in step (3404), a full-color precision cell average AVG$^{MS\|LS}$ of the values C'$_k$(m, n) of the decoded image cell 64, C'$_k$ is calculated by dividing the sum of the values C'$_k$(m, n) of all the elements of the decoded image cell 64, C'$_k$, i.e. C'$_k$(m, n) for m=1 to M and n=1 to N, by (M·N), the number of elements of the decoded image cell 64, C'$_k$. Then, in step (3406), if each of the values C'$_k$(m, n) of the decoded image cell 64, C'$_k$ deviates from the full-color precision cell average AVG$^{MS\|LS}$ by no more than a corresponding decode threshold Threshold$_D$, the associated decoded image cell 64, C'$_k$ is considered to correspond to a "selected cell" and the image decoding subprocess 2300 continues with step (3408); otherwise the associated decoded image cell 64, C'$_k$ is NOT considered to correspond to a "selected cell" and the image decoding subprocess 2300 continues with step (3420).

If the result of step (3406) is TRUE, then, steps (3408) and (3416) provide for processing each element C'$_k^{MS\|LS}$(m, n) of the decoded image cell 64, C'$_k$ along an edge of the decoded image cell 64, C'$_k$. In step (3410), the value of the corresponding element of the k$^{th}$ post-processed decoded image cell 64', C"$_k$ is set equal to a weighted average of the selected element C'$_k^{MS\|LS}$(m, n) and the adjacent elements C n) from adjacent decoded image cells 64, C'$_X$. For example, for a 2×2 image cell 42, C$_k$, in one embodiment, the weighted average is given by, the sum of the element, C'$_k^{MS\|LS}$(m, n) of the decoded image cell 64, C'$_k$ and the average of the associated adjacent elements, C'$_X^{MS\|LS}$(m, n) from adjacent decoded image cells 64, C'$_X$, i.e.:

$$C''^{MS\|LS}_k(m, n) = \frac{\sum C'_X + 2 \cdot C'^{MS\|LS}_k(m, n)}{4}. \qquad (9)$$

Following step (3410), optionally, in step (3412), if the value of the element C"$_k^{MS\|LS}$(m, n) of the post-processed decoded image cell 64', C"$_k$ from step (3412) exceeds value of the full-color precision cell average AVG$^{MS\|LS}$ by more than a leveling threshold Threshold$_L$ then the value of the element, C"$_k^{MS\|LS}$(m, n) of the post-processed decoded image cell 64', C"$_k$ is clipped as follows:

$$C''^{MS\|LS}_k(m,n) = AVG^{MS\|LS} + Threshold_L. \qquad (10a)$$

Similarly, following steps (3410) or (3412), optionally, in step (3414), if the value of the full-color precision cell average AVG$^{MS\|LS}$ exceeds value of the element C"$_k^{MS\|LS}$(m, n) of the post-processed decoded image cell 64', C"$_k$ from step (3410) by more than a leveling threshold Threshold$_L$ then the value of the element C"$_k^{MS\|LS}$(m, n) of the post-processed decoded image cell 64', C"$_k$ is clipped as follows:

$$C''^{MS\|LS}_k(m,n) = AVG^{MS\|LS} - Threshold_L. \qquad (10b)$$

Following step (3416), then steps (3408) and (3410),—and then, optionally, also steps (3412) and (3414),—are repeated until all edge elements have been processed.

If the conditions of step (3406) were not satisfied, then, in step (3420), for each element $C''^{MS|LS}_k(m, n)$ of the post-processed decoded image cell 64', $C''_k$, the most-significant portion $C''^{MS}_k(m, n)$ thereof is set equal to the value of the corresponding most-significant portion $C'^{MS}_k(m, n)$ of the decoded image cell 64, $C'_k$, and the least-significant portion $C''^{LS}_k(m, n)$ thereof is set equal to zero (or some other value that is constant for each element $C'_k(m, n)$ of the decoded image cell 64, $C'_k$).

After all edge elements have been processed, following step (3416), or from step (3420), in step (3418), the image decoding subprocess 3400 returns to step (3012') of the image decoding process 3000', which then continues with step (3014) et seq., the same as described hereinabove for the image decoding process 3000 illustrated in FIG. 30.

Figure 35:
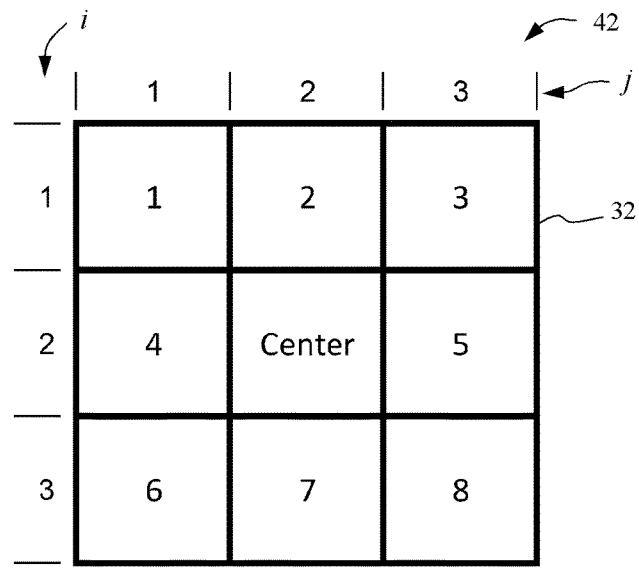
FIG. 35 illustrates a 3×3 cell of pixels.
Figure 37:
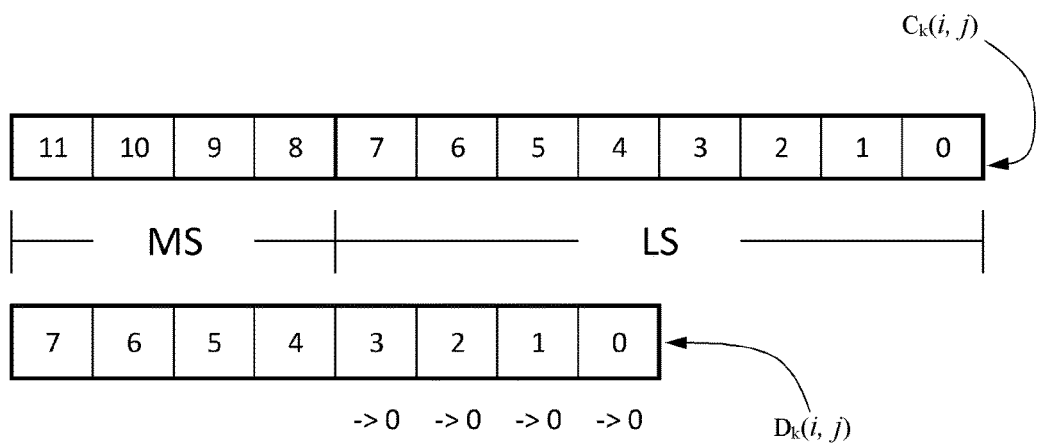
FIG. 37 illustrates a partitioning of an extended-color-precision color component in relation to a corresponding encoded value.

Referring to FIGS. 35-37, in an alternative to the encoding embodiment illustrated in FIG. 17 and the decoding embodiments illustrated in FIGS. 23, 26 and 31, and as an alternative to the pattern table 48 illustrated in FIG. 14, a relatively larger image cell 42, $C_k$ and a corresponding greater number of associated dithering patterns 56' may be used so as to provide for greater immunity to artifacts that might otherwise be introduced by the image compression 22 and decompression 26 subsystems. More particularly, for example, referring to FIG. 35, in one embodiment, each image cell 42, $C_k$ comprises a 3×3 array of nine pixels 32, P(i, j), for which only the eight edge pixels 32, P(i, j)—numbered 1 through 8 in FIG. 35, are subject to dithering. Referring to FIGS. 36a-f, this provides for 256 different dithering patterns, of which 254 are unique, which provides for recovering 8 bits of color value information, but at the expense of reduced spatial resolution. In the pattern table 48' illustrated in FIGS. 36a-f, the column labeled "ID" corresponds to the first column 50 of the pattern table 48 illustrated in FIG. 14 and provides the associated index 46, ID, column labeled "Cell Energy" corresponds to the third column 52 of the pattern table 48 illustrated in FIG. 14, and the columns labeled "8" through "1" provide the dither values associated with the corresponding edge pixels 32, P(i, j) identified in FIG. 35, wherein these dither values are generated from a binary representation of a pattern value PV (with values from 0 to 255) that is sorted by the number of "ones" in the binary value (indicated as "#1's"), with fewer numbers of bumped values associated with lower associate cell error energy levels.

Otherwise, the processes of FIGS. 17, 23, 26 and 31 are substantially the same, with the following exceptions: in steps (1702), (1306), (1310), (2304)-(2308), (2602) and (3104)-(3108), only the edge pixels 32, P(i, j) of each cell are operated upon, and division is by the number of edge pixels (e.g. 8, which provides for faster binary computation) that are operated upon, rather than by M·N, wherein, for example, the value of the center pixel—i.e. (2, 2) in FIG. 35—would be set to the associated cell average value. Furthermore, referring to FIG. 37, for purposes of dithering only, for the example of 12-bit extended-color-precision values, the most-significant portion (MS) of the extended-color-precision values comprises the most-significant four bits, and the least-significant portion (LS) of the extended-color-precision values comprises the least-significant four bits. The cell dithering would convert 12-bit cell pixel values to those with only the greater four significant bits so that, when only the 8 bits of a legacy-color-precision image are used, the four least significant bits of that legacy-precision image are set to zero. Since compression artifacts primarily impact the least significant bits, this approach means the four higher significant bits with the encoded dithering patterns will better survive the compression process. This example is not intended to propose a specific limitation to the invention. For example the five most significant bits could be used instead. However such an implementation would not be as resistant to compression error. Accordingly, during encoding,—for example, in steps (1314) or (1706)—the Most-Significant MS portion of the legacy-color-precision encoded image cell 58, $D_k(m, n)$ is set equal to either the corresponding Most-Significant MS portion of the value of the image cell 42, $C_k^{MS}(m, n)$, or a bumped version thereof, and each of the bits of the remaining least-significant LS' portion of the encoded image cell 58, $D_k(m, n)$ are each set equal to zero (or some other value that is constant for each element $D_k(m, n)$ of the encoded image cell 58, $D_k(m, n)$).

Referring to FIGS. 38-45, a third aspect of an image processing system 100, 100.3 provides for processing an extended-color-precision image 12 of a first color space 66, (R1, G1, B1, W1) into a set of two associate legacy-color-precision images: 1) a legacy-color-precision image 68 of a second color space 70 (R2, G2, B2, W2) that can be directly displayed on, or processed by, a legacy-color-precision image display or processing subsystem 18, and 2) a legacy-color-precision encoded difference image 72 that, in combination with the legacy-color-precision image 68, can be decoded to regenerate the original corresponding extended-color-precision image 12 following conventional compression, transmission, and decompression of both the legacy-color-precision image 68 and the legacy-color-precision image encoded difference image 72.

Figure 38:
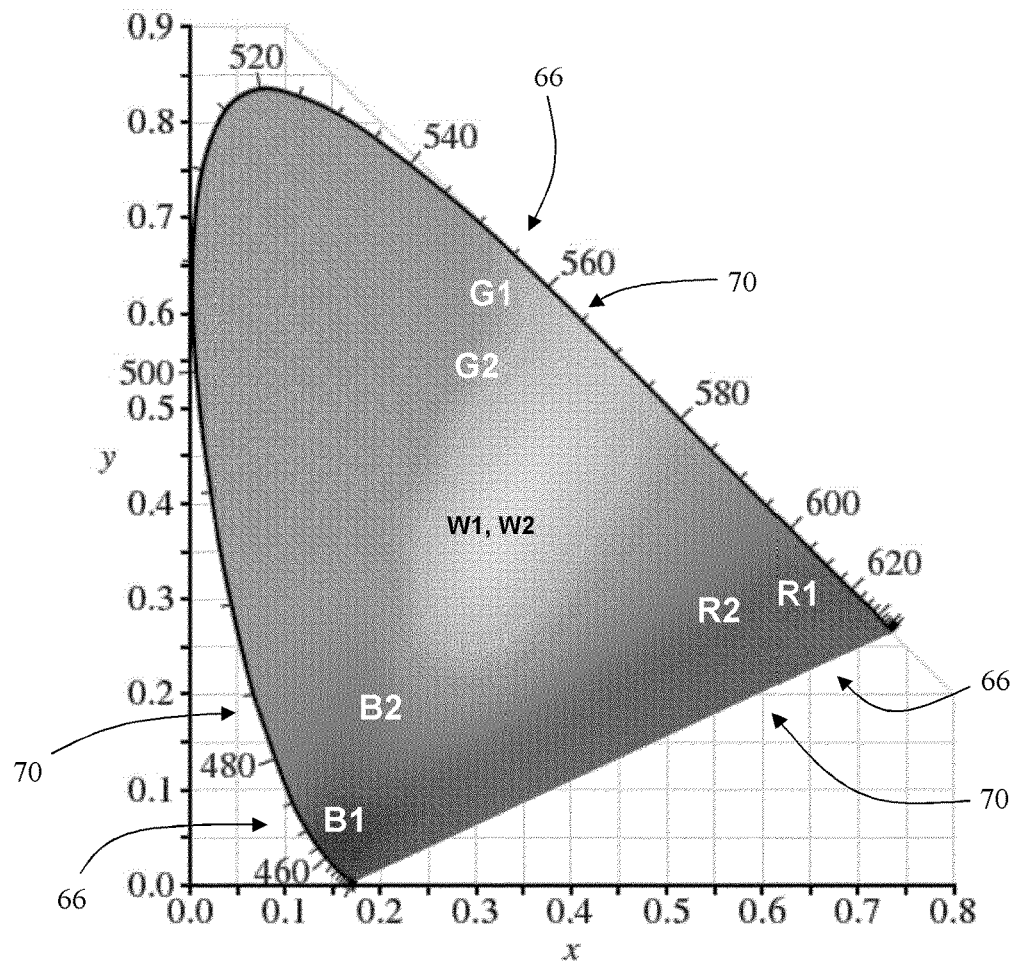
FIG. 38 illustrates first and second color spaces plotted on a CIE xy chromaticity diagram.

Digital image content is typically made up of pixels 32 each represented by a range of numerical values that describe a location within a standardized color space (also referred to as a "color volume" or a "color gamut"). Referring to FIG. 38, such a color space is defined with respect to two dimensions—for example, chromaticity coordinates x and y—to include specific chrominance coordinates of three primary colors, a white point color coordinate, and then, in a third dimension, a range of intensity or luminance values. In accordance with customary practice, such luminance and chrominance values of a pixel can be transformed to a range of red, green and blue values, each similarly representing intensity values of each specified color primary of the color space specification. For example, a first color space 66 associated with an extended-color-precision image 12 is illustrated in FIG. 38 by the associated CIE chromaticity coordinates of the red R1, green G1 and blue B1 primary colors, and the associated white point W1, and a relatively-smaller-volume second color space 70 associated with a legacy-color-precision image 68 is illustrated in FIG. 38 by the associated CIE chromaticity coordinates of the red R2, green G2 and blue B2 primary colors, and the associated white point W2. Accordingly, for a given particular set of primary colors and white point, i.e. R1, G1, B1, W1 of the relatively larger first color space 66 for the extended-color-precision image 12, or R2, G2, B2, W2 of the relatively smaller second color space 70 for the legacy-color-precision image 68, the associated image 12, 68 is then defined by corresponding respective intensity values R(i, j), G(i, j), B(i, j) for each pixel 32, P(i, j) in the image 12, 68.

As digital image technology has evolved there has been a motivation to communicate and present a broader range of colors and intensities so that presented imagery is increasingly realistic. This necessarily implies a broader color space supported by different and more pure primary colors and an even greater perceived range of brightness, altogether succinctly referred to by some as High Dynamic Range (HDR) imaging—for example, as illustrated in FIG. 38as represented by the first color space 66, which is relatively larger than the second color space 70 representing a legacy color space. However, displays capable of presenting HDR content—i.e. extended-color-precision image display or processing subsystems 30—are not yet widely commercially available (or affordable), so the demand for HDR content does not yet exist. And without such content there is little motivation to accelerate development of HDR displays.

As is typical with migrations to next generation technology, one solution to this problem is to generate HDR content in a form that is backward compatible so that it can be played and displayed on conventional display devices such as Blu-ray players and flat panel TVs, i.e. legacy-color-precision image display or processing subsystems 18. Even though the benefits of HDR might not be realized on such devices, such an approach nonetheless provides for growing an awareness and library of HDR content that increasingly motivates the later migration to HDR display devices.

Accordingly, the communication of HDR content with backward compatibility can involve accommodating both a plurality of different color spaces and a plurality of different color precisions (i.e. bit depths) so as to provide for images from the same source to be used on, or with, both legacy-color-precision image display or processing subsystems 18 and extended-color-precision image display or processing subsystems 30.

Figure 39:
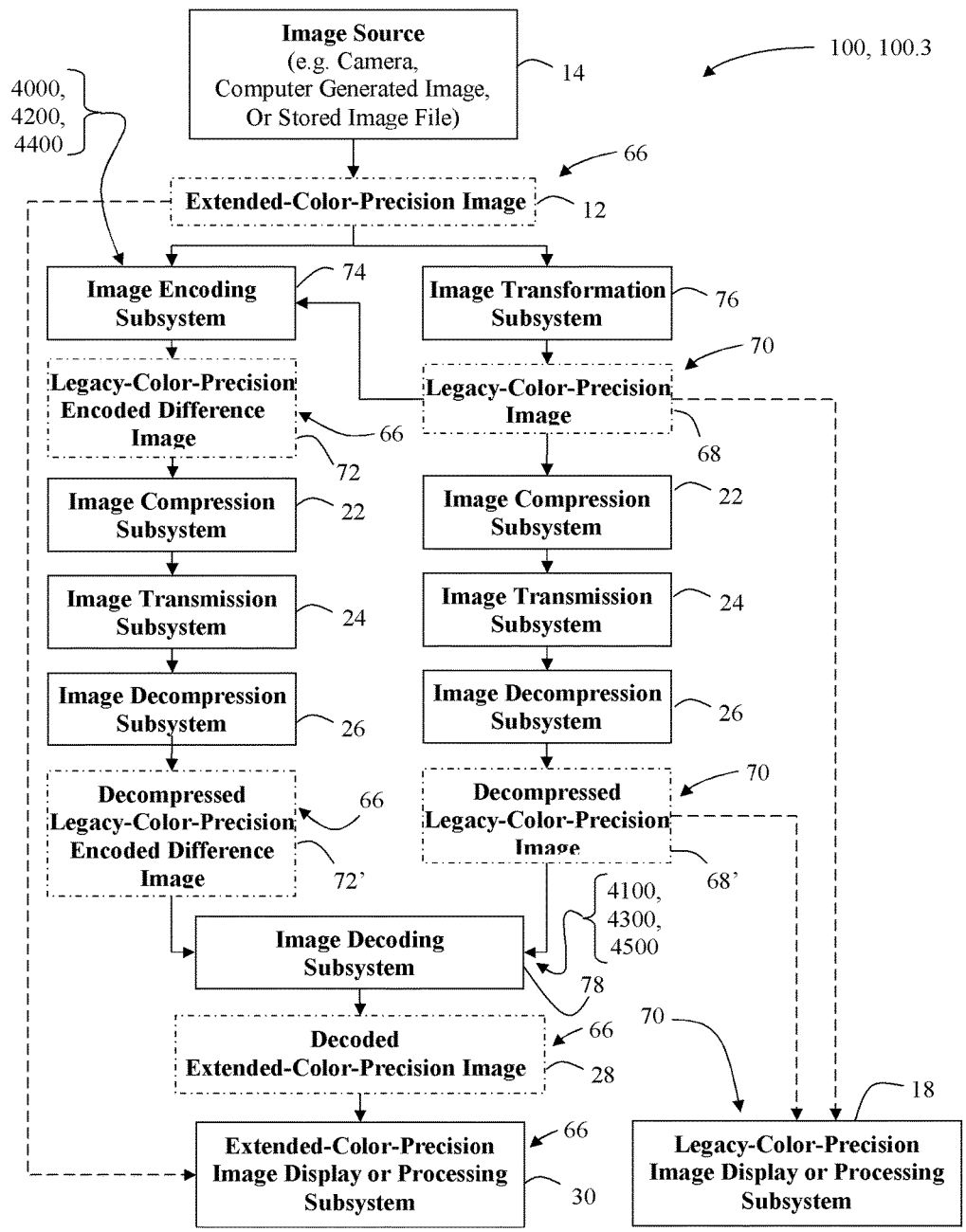
FIG. 39 illustrates a block diagram of a third aspect of an image processing system incorporating image encoding and image decoding subsystems and associated processes.

More particularly, referring to FIG. 39, in accordance with the third aspect of the image processing system 100, 100.3, an extended-color-precision image 12 from an image source 14 is both encoded by an image encoding system 74—described more fully hereinbelow—so as to generate an associated legacy-color-precision encoded difference image 72, and transformed to a legacy-color-precision image 68 by an associated image transformation system 76, wherein the extended-color-precision image 12 is colorized with relatively greater color precision with respect to the relatively-larger first color space 66, and the legacy-color-precision encoded difference image 72 is colorized with relatively lesser, i.e. legacy, color precision with respect to the relatively-smaller second color space 70, and the legacy-color-precision encoded difference image 72 is responsive to both the extended-color-precision image 12 and the legacy-color-precision image 68.

In one set of embodiments, the image transformation system 76 provides for transforming both the color precision—i.e. the number of bits used to represent the intensity of each color component—and the color space to which the associated color-component intensity values refer. The image transformation system 76 operates in accordance with known methods—for example, as described in the reference "Colour Space Conversions" by Adrian Ford and Alan Roberts, dated 11 Aug. 1998 and available on the internet at http://www.poynton.com/PDFs/coloureq.pdf, the particulars of which would depend upon the particular first 66 and second 70 color spaces, but which typically use associated matrix operations to transform between the first 66 and second 70 color spaces. Generally, transforming from a relatively larger color space (i.e. one with more saturated color primaries) to a smaller color space is not analytic (i.e. reversible), because the smaller color space is effectively a subset of the larger color space, so that transforming from a larger color space to a smaller color space necessarily involves at least some mapping of colors in the larger color space that don't exist in the smaller space to a best approximation of the colors of the larger space. Once such mapping has been completed, then an analytic transformation matrix can be applied to transform from the color primaries of one color space to the other.

Both the legacy-color-precision encoded difference image 72 and the legacy-color-precision image 68 are of legacy-color precision, for example, using 8-bit representations for each of the associated three color components R, G and B, whereas the extended-color-precision image 12 might use, for example, 12-bit or 16-bit representations for each of the corresponding associated three color components R, G and B. Each of the legacy-color-precision encoded difference image 72 and the legacy-color-precision image 68 are generated separately, and accordingly, can be subsequently separately compressed, transmitted and decompressed by respective image compression 22, image transmission 24 and image decompression 26 subsystems, wherein the associated image compression subsystems 22 separately compresses the legacy-color-precision encoded difference image 72 and the legacy-color-precision image 68, and the image decompression subsystems 26 respectively generate a corresponding decompressed legacy-color-precision encoded difference image 72' and a corresponding decompressed legacy-color-precision image 68', respectively, that together are decoded by an associated image decoding subsystem 78—described more fully hereinbelow—so as generate a decoded extended-color-precision image 28 that is suitable for display on, or use by, an extended-color-precision image display or processing subsystem 30. Alternatively, the legacy-color-precision encoded difference image 72 and the legacy-color-precision image 68 could be multiplexed onto and transmitted over a single communications channel, with the associated compression and decompression operations performed on the separate signals before and after transmission, or on the multiplexed signal. Furthermore, the decompressed legacy-color-precision image 68' is suitable for direct display on, or use by, an associated legacy-color-precision image display or processing subsystem 18.

Accordingly, the third aspect of the image processing system 100, 100.3 provides for utilizing a variety of transmission methods, so as to provide for transmitting the legacy-color-precision image 68 and the legacy-color-precision encoded difference image 72 either simultaneously or separately, for example, on physical media or via data streaming. For example, in one embodiment, the legacy-color-precision image 68 and the legacy-color-precision encoded difference image 72 are stored on separate image channels of a 3D compatible Blu-ray disc, wherein the legacy-color-precision image 68 is provided as the primary 1920×1080 resolution image—that can be directly displayed using a legacy-color-precision image display or processing subsystem 18—and the additional 1920×1080 dependent frame (i.e. that typically used for the other eye for stereoscopic 3D content) is used to store the legacy-color-precision encoded difference image 72 for later reconstruction of the original extended-color-precision image 12, wherein both images can then be processed using standard 8-bit practices, but the legacy-color-precision encoded difference image 72 provides for later restoring the original, for example, 12-bit or 16-bit, original extended-color-precision image 12 using information from both the associated legacy-color-precision encoded difference image 72 and legacy-color-precision image 68 stored on the Blu-ray disc.

The image encoding system 74 operates pixel 32 by pixel 32, and color component R, G, B by color component R, G, B on both the extended-color-precision image 12 and the legacy-color-precision image 68 so as to generate a corresponding set of legacy-color-precision values of a corresponding associated legacy-color-precision encoded difference image 72, wherein each legacy-color-precision value is responsive to a difference between corresponding values of the extended-color-precision image 12 and the legacy-color-precision image 68.

Similarly, the image decoding system 78 operates pixel 32 by pixel 32, and color component R, G, B by color component R, G, B on the resulting decompressed legacy-color-precision encoded difference image 72' and the decompressed legacy-color-precision image 68' so as to generate a corresponding set of extended-color-precision values of a corresponding associated decoded extended-color-precision image 28, wherein the operation of the image decoding system 78 are inverse to those of the image encoding system 74.

Figure 40:
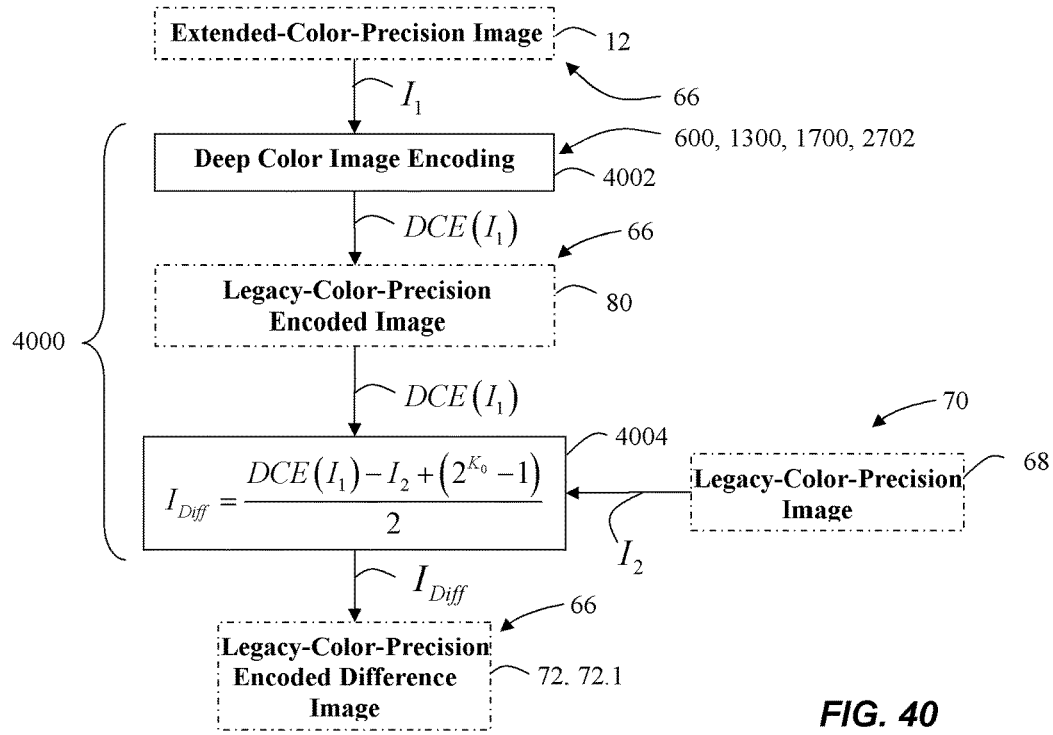
FIG. 40 illustrates a flow chart of a first embodiment of an image encoding process in accordance with the third aspect of the image processing system illustrated in FIG. 39.

More particularly, referring to FIG. 40, in accordance with a first embodiment of an image encoding process 4000 of the third aspect of the image processing system 100, 100.3, in step (4002), the extended-color-precision image 12 is processed using the above-described image encoding process 600 and associated image encoding subprocesses 1300 or 1700, or using a conventional dithering process 2702, as described hereinabove, which collectively will generally referred to hereinafter as a Deep Color Image Encoding process, or DCE. Designating the extended-color-precision image 12 as the first image $I_1$, the Deep Color Image Encoding process generates a corresponding intermediate encoded image $DCE(I_1)$, also referred to as a legacy-color-precision encoded image 80. Then, in step (4004), the legacy-color-precision encoded image 80 is linearly combined—pixel 32 by pixel 32, and color component R, G, B by color component R, G, B—with the associated legacy-color-precision image 68, designated as the second image $I_2$, in accordance with the following equation:

$$I_{Diff} = \frac{DCE(I_1) - I_2 + (2^{K_0} - 1)}{2}, \tag{11}$$

wherein $K_0$ is the number of bits used to represent each color component of the legacy-color-precision image 68, (e.g. 8 bits), and the $I_{Diff}$ is the resulting legacy-color-precision encoded difference image 72, 72.1, for which each color component R, G, B of each pixel 32 has legacy color precision (e.g. 8 bits).

Figure 41:
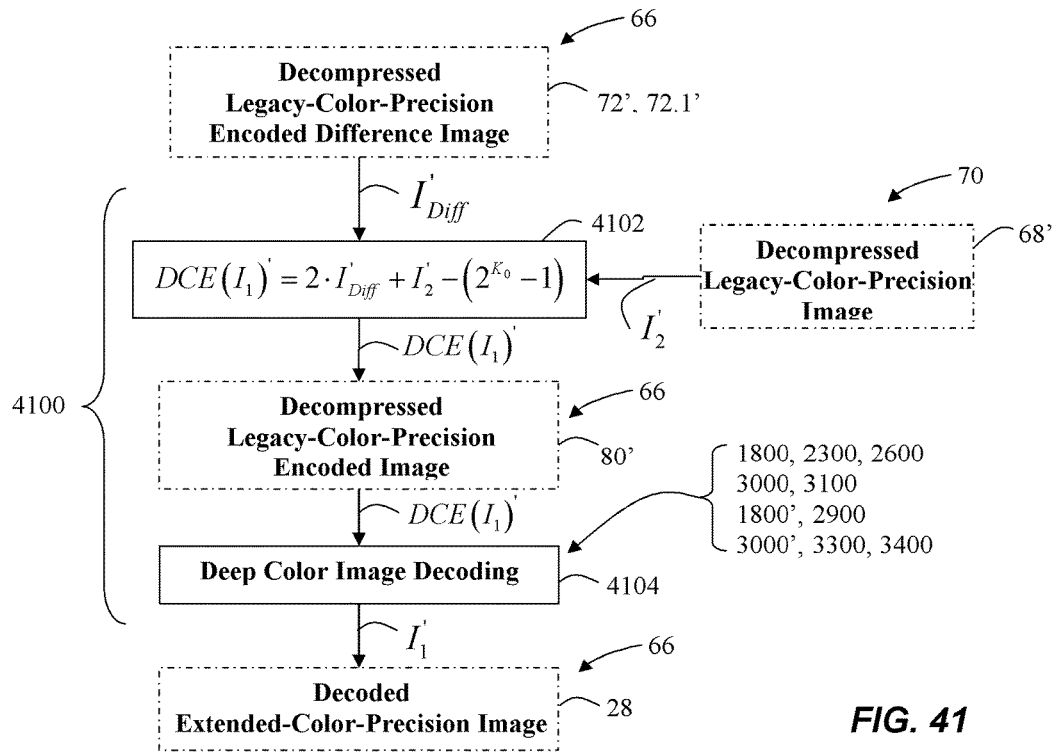
FIG. 41 illustrates a flow chart of a first embodiment of an image decoding process in accordance with the third aspect of the image processing system illustrated in FIG. 39.

Furthermore, referring to FIG. 41, in accordance with a corresponding first embodiment of an image decoding process 4100 of the third aspect of the image processing system 100, 100.3, in step (4102), the decompressed legacy-color-precision encoded image 80', i.e. $DCE(I_1)'$ is calculated—pixel 32 by pixel 32, and color component R, G, B by color component R, G, B—from the corresponding values of the decompressed legacy-color-precision encoded difference image 72', 72.1', designated as $I_{Diff}'$, and the decompressed legacy-color-precision image 68', designated as $I_2'$, in accordance with the following equation:

$$DCE(I_1)' = 2 \cdot I_{Diff}' + I_2' - (2^{K_0} - 1) \tag{12}$$

Then, in step (4104), the resulting decompressed legacy-color-precision encoded image 80' is decompressed using any of the above-described image decoding processes 1800, 1800', 3000 or 3000' and associated image decoding subprocesses 2300, 2600, 3100, 2900 or 3300 and 3400, as described hereinabove, which collectively will generally referred to hereinafter as a Deep Color Image Decoding process, so as to generate the corresponding associated decoded extended-color-precision image 28 that is suitable for display on, or use by, an extended-color-precision image display or processing subsystem 30.

Given that mathematically equations (11) and (12) are each simply a linear combination of two input image values to create a third, it should be noted that in the alternative, the different input image values could be associated with different color components R, G, B. For example, the blue color component of the first image $I_1$ could be combined with the green color component of the second image $I_2$, because fundamentally the difference value is just a value used to eventually recover the decoded extended-color-precision image 28 provided that the decompressed legacy-color-precision image 68' is available and the color associating schemes of the image encoding 4000 and decoding 4100 processes are consistent.

The relative similarity between the first $I_1$ and second $I_2$ images being differenced in equation (11) provides for generating corresponding relatively "neutral" differenced values $I_{Diff}$, which has a beneficial effect on the associated image compression and decompression processes by the corresponding associated image compression 22 and decompression 26 subsystems, and upon the resulting size of the images being transmitted. Whereas two highly detailed images of highly varying pixel values will each compress to relatively large storage and transmission sizes, if those images are nonetheless similar, their difference image will have relatively low variation. In the extreme case where both images are identical, the difference image becomes perfectly smooth, leading to a very small storage and transmission size after compression. Accordingly, since both input images are fundamentally slightly different representations of the same original image, such similarities are inherent in the process. The corresponding color pixel values of both images will likely provide such similarities. For example, while the green primaries of both color spaces may be different, a green pixel value in both input images will still likely be high for a greater amount of green in both images. So while the ultimate presented green color of that pixel may be different, the relative difference of the numerical value representing that color will likely still be small in the differenced image.

Figure 42:
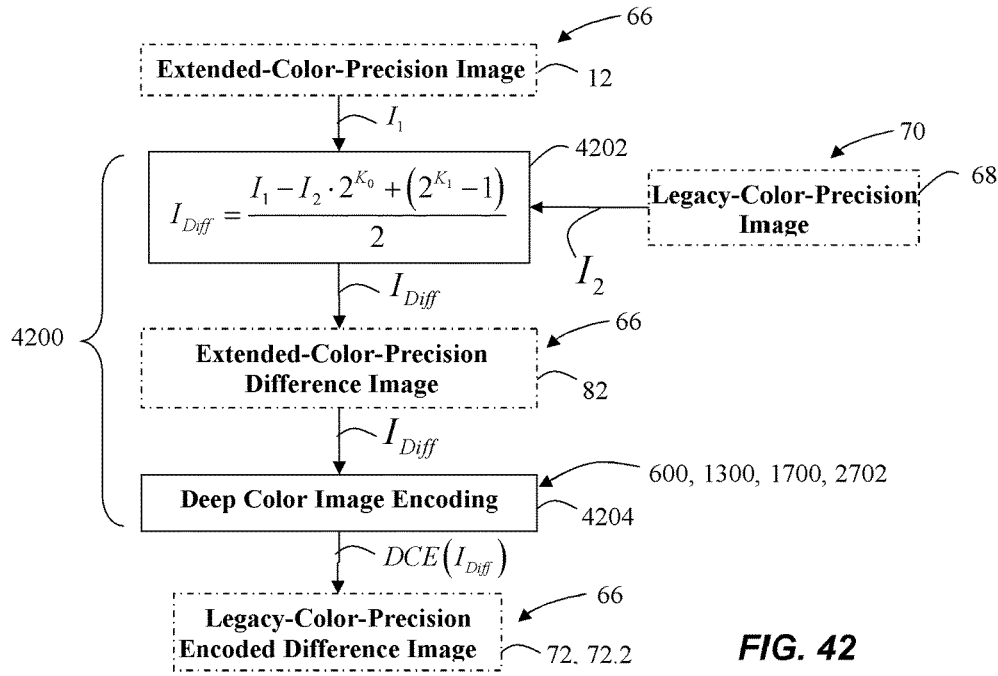
FIG. 42 illustrates a flow chart of a second embodiment of an image encoding process in accordance with the third aspect of the image processing system illustrated in FIG. 39.
Figure 43:
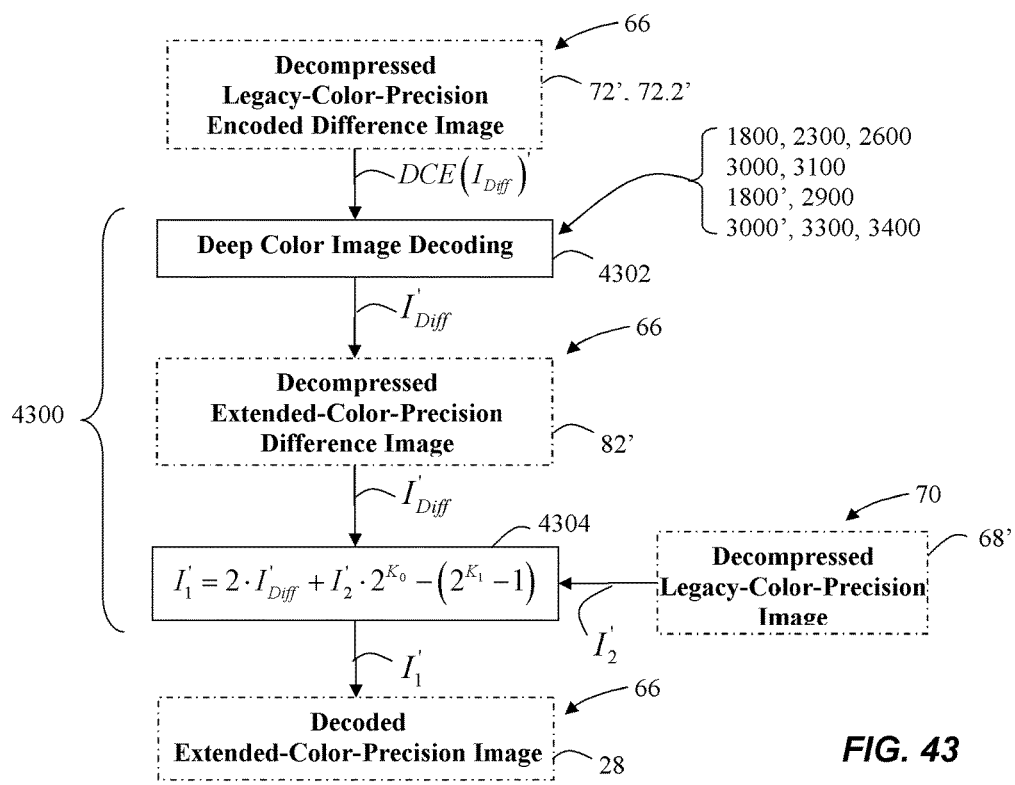
FIG. 43 illustrates a flow chart of a second embodiment of an image decoding process in accordance with the third aspect of the image processing system illustrated in FIG. 39.

Referring to FIGS. 42 and 43, in accordance with an alternative, second embodiment of the image encoding 4200 and decoding 4300 processes, respectively, the associated differencing operation may be performed at extended color precision, with the Deep Color Image Encoding and Decoding processes being used to encode and decode the associated extended-color-precision difference value.

More particularly, referring to FIG. 42, in accordance with a second embodiment of an image encoding process 4200 of the third aspect of the image processing system 100, 100.3, in step (4202), an extended-color-precision difference image 82, $I_{Diff}$ is calculated from a combination of the extended-color-precision image 12, designated as the first image $I_1$, and the associated legacy-color-precision image 68, designated as the second image $I_2$, in accordance with the following equation:

$$I_{Diff} = \frac{I_1 - I_2 \cdot 2^{K_0} + (2^{K_1} - 1)}{2}. \tag{13}$$

wherein $K_1$ is the number of bits used to represent each color component of the extended-color-precision image 12, (e.g.

12 or 16 bits). Then, in step (4204), the resulting extended-color-precision difference image 82, $I_{Diff}$ is then decoded using any of the above-described Deep Color Image Encoding processes so as to generate the corresponding associated legacy-color-precision encoded difference image 72, 72.2.

Furthermore, referring to FIG. 43, in accordance with a corresponding second embodiment of an image decoding process 4300 of the third aspect of the image processing system 100, 100.3, in step (4302), the corresponding resulting decompressed legacy-color-precision encoded difference image 72',72.2' is decoded using any of the above-described Deep Color Image Decoding processes so as to generate a corresponding associated decompressed extended-color-precision difference image 82', which, in step (4304), is then combined with the corresponding associated decompressed legacy-color-precision image 68', designated as $I_2'$, in accordance with the following equation:

$$I'_1 = 2 \cdot I'_{Diff} + I'_2 \cdot 2^{K_0} - (2^{K_1} - 1) \tag{14}$$

so as to generate corresponding associated decoded extended-color-precision image 28, $I_1'$ that is suitable for display on, or use by, an extended-color-precision image display or processing subsystem 30.

Figure 44:
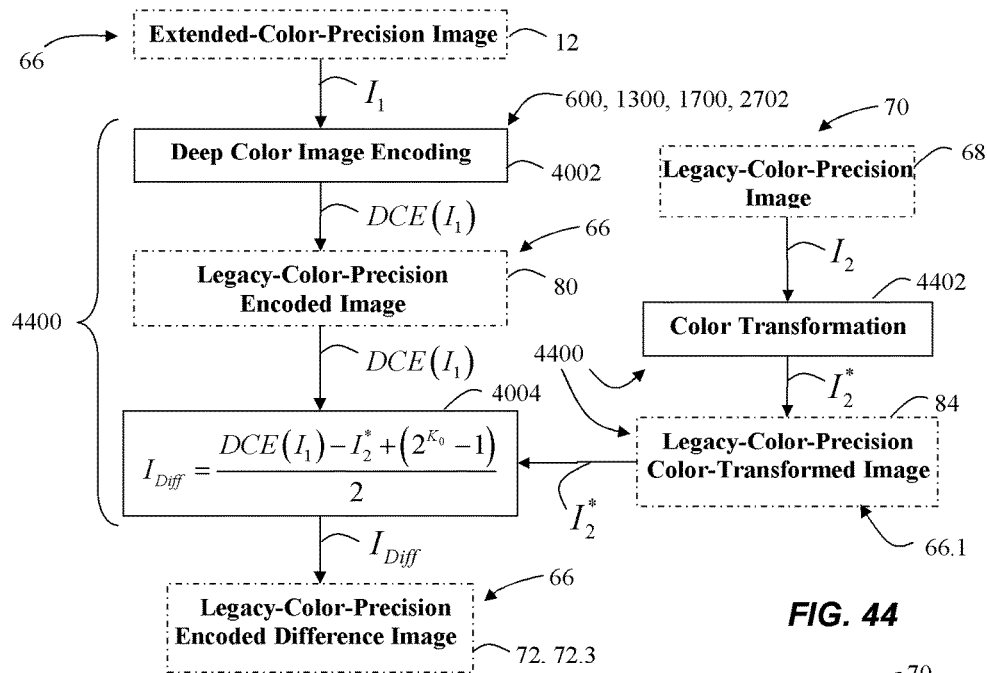
FIG. 44 illustrates a flow chart of a third embodiment of an image encoding process in accordance with the third aspect of the image processing system illustrated in FIG. 39.
Figure 45:
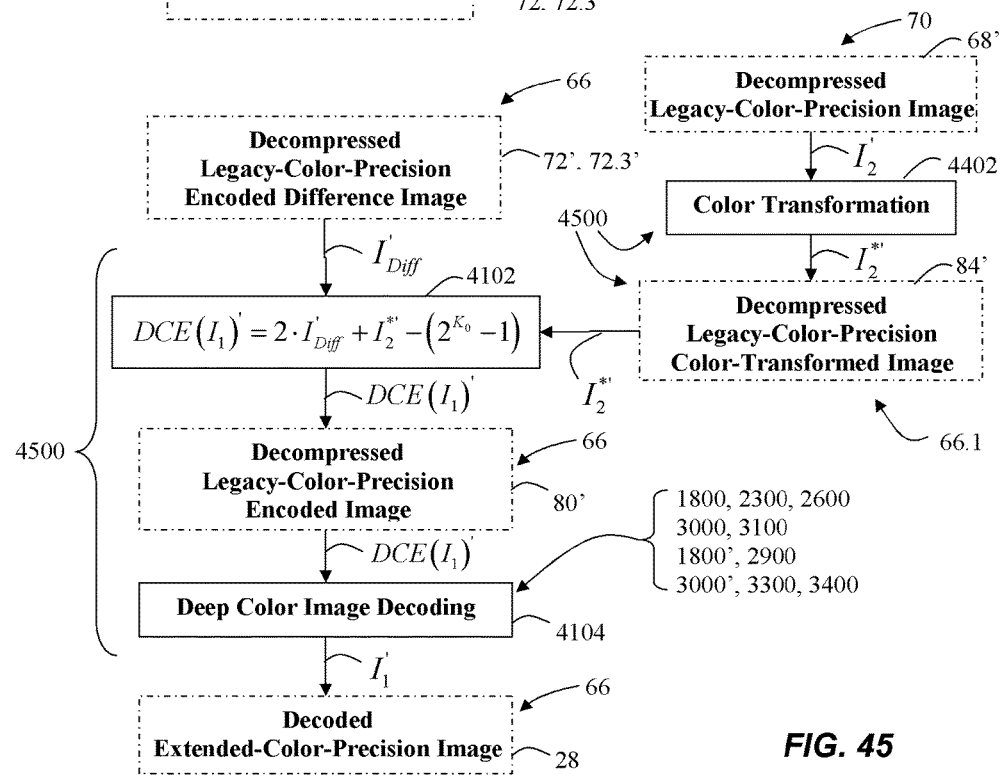
FIG. 45 illustrates a flow chart of a third embodiment of an image decoding process in accordance with the third aspect of the image processing system illustrated in FIG. 39.

Notwithstanding the above-described presumed relatively-small differences between the first $I_1$ and second $I_2$ images, any departures between intensities of the two input images following Deep Color Image Encoding will still result in variation in the differenced image as a result of the different color spaces of the images being combined. Referring to FIGS. 44 and 45, in accordance with an alternative, third embodiment of the image encoding 4400 and decoding 4500 processes,—an alternative of the first embodiment—during the encoding process the legacy-color-precision image 68, second image $I_2$ is first transformed into an intermediate image $I_2^*$, i.e. a legacy-color-precision color-transformed image 84, wherein such values are made more similar to those of the legacy-color-precision encoded image 80. This intermediate image $I_2^*$ is then used in place of the second image $I_2$ to create the associated legacy-color-precision encoded difference image 72, 72.3, $I_{Diff}$. Such transforms may include, but are not limited to, conventional color transforms to convert from one volume and set of primaries to another, for example, as used by the above-described image transformation system 76. For example, consider a first color space 66 where the red primary is best approximated by a large part of the red primary and a small part of the blue primary of a second color space 70. This would mean that the intensity value of red for the first color space 66 representation would be greater than the intensity value of red for the second color space 70 representation, since part of the second color space 70 representation requires some intensity in blue. By transforming the second image $I_2$ to an intermediate image $I_2^*$ where the red color value is more similar to that of the first color space 66, the difference in values will be reduced. This intermediate image $I_2^*$ will not necessarily represent either color space with reasonable accuracy, but it nonetheless serves to create a legacy-color-precision encoded difference image 72, 72.3, $I_{Diff}$ with less complexity and therefore a smaller compressed size.

More particularly, referring to FIG. 44, a corresponding third embodiment of an image encoding process 4400 of the third aspect of the image processing system 100, 100.3 is similar in all respects to the above-described first embodiment of the image encoding process 4000, except that in step (4004), instead of using the legacy-color-precision image 68, $I_2$, equation (11) is replaced the following equation which uses instead a legacy-color-precision color-transformed image 84, $I_2^*$ that is generated in step (4402) from the legacy-color-precision image 68 by the above-described color transformation:

$$I_{Diff} = \frac{DCE(I_1) - I_2^* + (2^{K_0} - 1)}{2}. \tag{15}$$

Similarly, referring to FIG. 45, a corresponding third embodiment of an image decoding process 4500 of the third aspect of the image processing system 100, 100.3 is similar in all respects to the above-described first embodiment of the image decoding process 4100, except that in step (4102), instead of using the legacy-color-precision image 68, $I_2$, equation (12) is replaced the following equation which uses instead a decompressed legacy-color-precision color-transformed image 84', $I_2^*$ that is generated in step (4402) from the legacy-color-precision image 68 by the above-described color transformation that is the same color transformation as was used during the corresponding image encoding process 4400:

$$DCE(I_1)' = 2 \cdot I'_{Diff} + I^{*'}_2 - (2^{K_0} - 1). \tag{16}$$

Accordingly, for each of the embodiments of the third aspect of the image processing system 100, 100.3, the second image $I_2$ represents a backward compatible image which can be conventionally transmitted and viewed. Such an image can also be used with the associated differenced image to restore a higher precision representation of the original higher precision image in the original color space thereof by an associated decoding process that is the inverse of the encoding process.

It should be understood that the first 66 and second 70 color spaces need not necessarily be different. For example, the third aspect of the image processing system 100, 100.3 could be utilized to process an extended-color-precision image 12 and a corresponding legacy-color-precision image 68 that are both in the same color space 66, but with different color precisions. For example, just as the third aspect of the image processing system 100, 100.3 can be used to provide images with two different color spaces on one Blu-ray disc by using the dependent frame for the differenced image, two different precisions of the same color space can also be provided on the same disc, providing backward compatibility with the lower precision image for legacy displays and forward compatibility for future displays capable of presenting the decoded higher precision image.

For one set of embodiments, an image encoding method comprises partitioning an image into a plurality of cells, each cell containing a plurality of pixels; evaluating all cells of pixels of an image to select those with inter-cell deviations from a corresponding extended-color-precision cell average that are less than a threshold; determining the difference between the extended-color-precision cell average and a corresponding legacy-color-precision average for such selected cells; then applying a dithering pattern to the legacy-color-precision cell pixel values to communicate such differences so they can be later used to reconstruct extended-color-precision cell averages during a decoding process. To further minimize contamination due to compression; to potentially minimize the size of the compressed legacy-color-precision image; or for other practical reasons, such selected cell differences may alternatively be communicated separately from the legacy-color-precision image. For example, such differences may be represented as an array of values, each of which values represents a cell of the image, all of which values together represent all cells of the image, wherein for selected cells, each value represents the average cell difference, and for non-selected cells, the value is set to a unique value such as zero. The separate communication of average cell difference values with the inclusion of information regarding selected and non-selected cells provides for speeding up the decoding process because the legacy-color-precision image does not then need to be evaluated to determine which cells were selected during the encoding process.

Such an array of average cell difference values may be provided through a variety of means including, but not limited to, a separate file or stream of information temporally communicated in parallel with or in sequence with the legacy-color-precision image, a separate file or stream of information communicated at a different time and/or via a different media as that of the legacy-color-precision image, or within the same communication process as used for the legacy-color-precision image but notably separate from such image, such as within a digital image container wherein the legacy-color-precision image occupies a certain position within such container and the array of average difference values occupies a different position (or plurality of positions sufficient to include all the information) such as, for example, the black bars above and below a letterbox format image.

As a particular example of a process providing greater precision in a final image while utilizing only legacy-color-precision means of communication, an extended-color-precision image—for example, having 12-bit values per color—is first analyzed to select or not select each particular cell of the image. The difference between the 12-bit average of such cells and that 12-bit average truncated to 4 bits yields an 8-bit average difference value for that cell that is assigned as the corresponding cell average data for that cell. The selected cell values are then set to the most-significant 4-bits of the 12-bit average value, with this 4-bit value occupying the four uppermost significant bits of an 8-bit value, and the remaining four least-significant bits of the 8-bit value each set to zero values. The pixels of all non-selected cells are truncated or rounded to their 8-bit representations and the corresponding cell average data values are set to zero. Accordingly, both the legacy-color-precision image and the array of cell average data values each comprise 8 bit values. Upon decoding, the non-zero values of the array of cell average data values can therefore be used to identify selected cells. The pixel values of all such cells are first sanitized to remove compression and other process errors which typically contaminate lower significant bits such as by, but not limited to, rounding to the nearest 4-bit average value for the cell. Each cell pixel value is then increased by the corresponding 8-bit value of the cell average data array, applying the most significant bit of the difference value to the $5^{th}$ bit of the cell pixel value, thereby reconstructing a total cell pixel value having 12 bits of precision.

Figure 46:
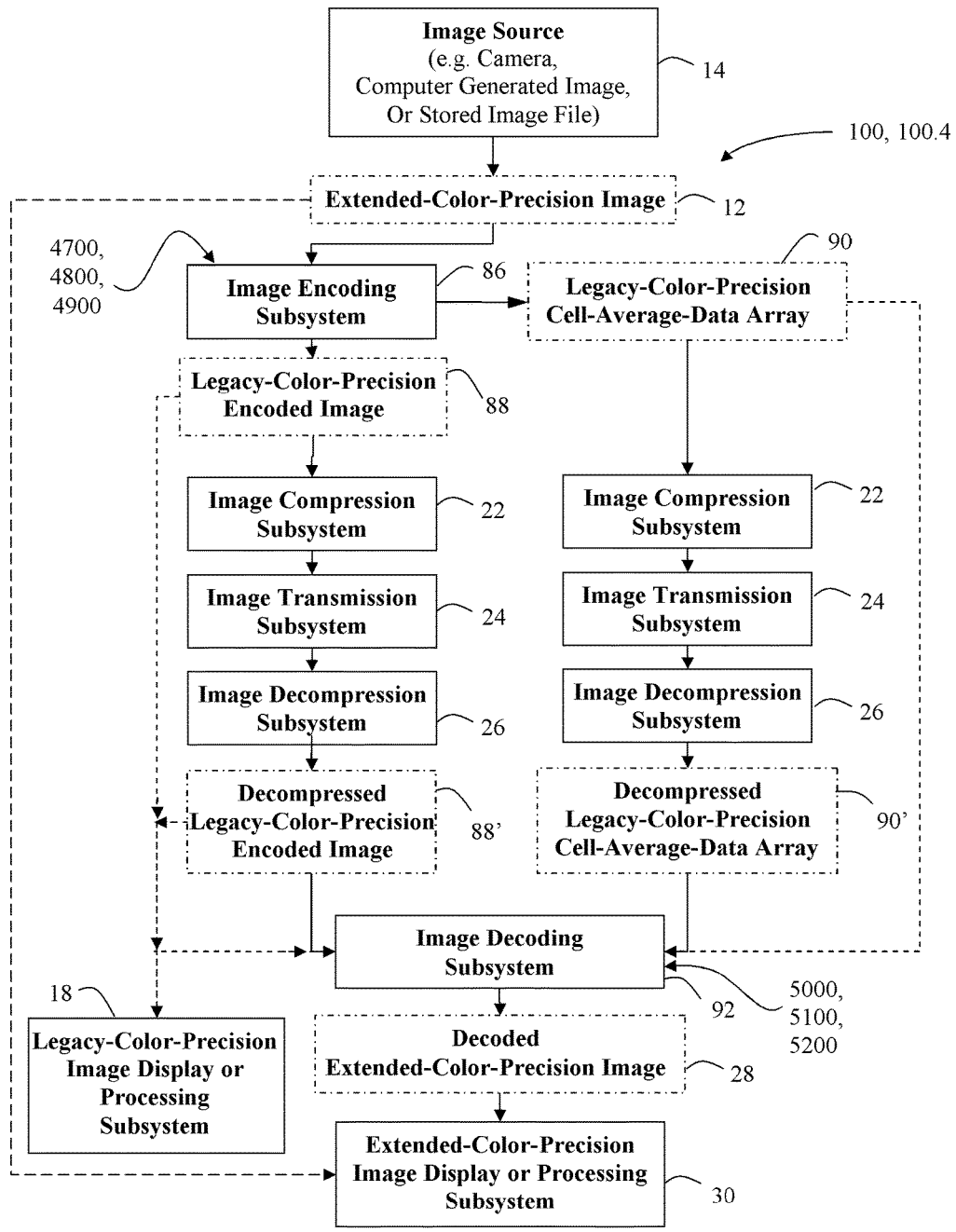
FIG. 46 illustrates a block diagram of a fourth aspect of an image processing system incorporating image encoding and image decoding subsystems and associated processes.

More generally, referring to FIG. 46, in accordance with a fourth aspect of the image processing system 100, 100.4, an extended-color-precision image 12 from an image source 14 is encoded by an image encoding system 86—described more fully hereinbelow—so as to generate both an associated legacy-color-precision encoded image 88 and an associated legacy-color-precision average-cell-data array 90. The legacy-color-precision encoded image 88 is of legacy-color precision, for example, using 8-bit representations for each of the associated three color components R, G and B, whereas the extended-color-precision image 12 might use, for example, 12-bit or 16-bit representations for each of the corresponding associated three color components R, G and B.

In one set of embodiments, the legacy-color-precision encoded image 88 and the legacy-color-precision average-cell-data array 90 are subsequently separately compressed, transmitted and decompressed by respective image compression 22, image transmission 24 and image decompression 26 subsystems, wherein the separate image compression subsystems 22 separately compresses the legacy-color-precision encoded image 88 and the legacy-color-precision average-cell-data array 90, and the separate image decompression subsystems 26 respectively generate a corresponding decompressed legacy-color-precision encoded image 88' and a corresponding decompressed legacy-color-precision average-cell-data array 90', respectively, that together are decoded by an associated image decoding subsystem 92—described more fully hereinbelow—so as generate a decoded extended-color-precision image 28 that is suitable for display on, or use by, an extended-color-precision image display or processing subsystem 30. Alternatively, the legacy-color-precision encoded image 88 and the legacy-color-precision average-cell-data array 90 could be multiplexed onto and transmitted over a single communications channel—for example, colocated together with the legacy-color-precision encoded image 88 in the same container—with the associated compression and decompression operations performed on the separate signals before and after transmission, or on the multiplexed signal. Furthermore, the legacy-color-precision average-cell-data array 90 could alternatively be transmitted to the image decoding subsystem 92 directly without distortion by the image compression 22, image transmission 24 and image decompression 26 subsystems.

Figure 47:
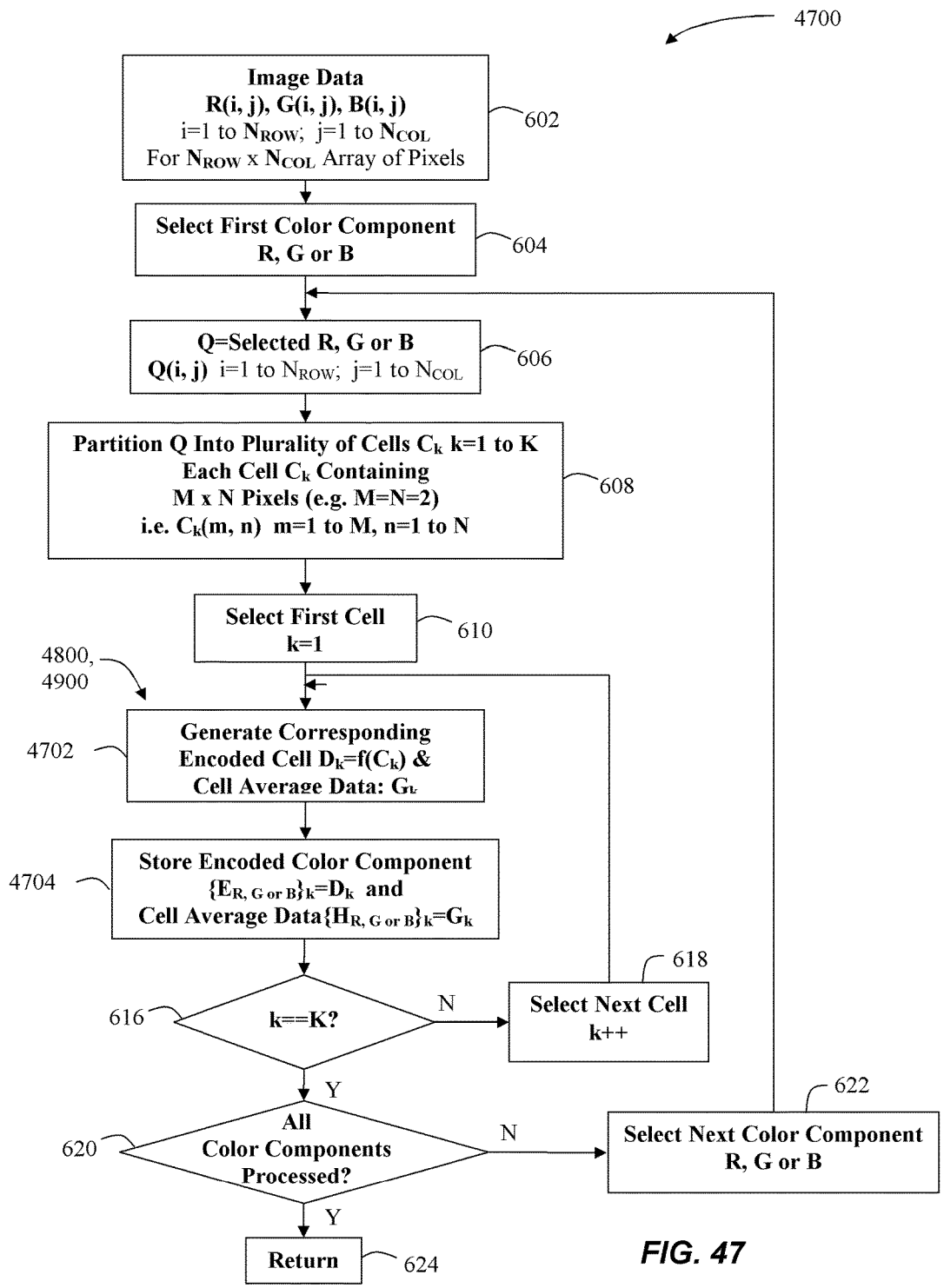
FIG. 47 illustrates a flow chart of a relatively-higher-level portion of an image encoding process carried out by the fourth aspect of the image encoding subsystem illustrated in FIG. 46.

Referring to FIG. 47, the image encoding subsystem 86 operates in accordance with an image encoding process 4700 that provides for generating the legacy-color-precision encoded image 88 that is suitable for display on, or use by, a legacy-color-precision image display or processing subsystem 18, and that may be subsequently decoded by the image decoding subsystem 92 so as to provide for generating the decoded extended-color-precision image 28 that is suitable for display on, or use by, extended-color-precision image display or processing subsystem 30. The image encoding process 4700 of the fourth aspect of the image processing system 100, 100.4 illustrated in FIG. 46 is the same as the image encoding process 600 illustrated in FIG. 6 except that steps (612) and (614) of the image encoding process 600 are respectively replaced with steps (4702) and (4704) of the image encoding process 4700 illustrated in FIG. 46.

Figure 48:
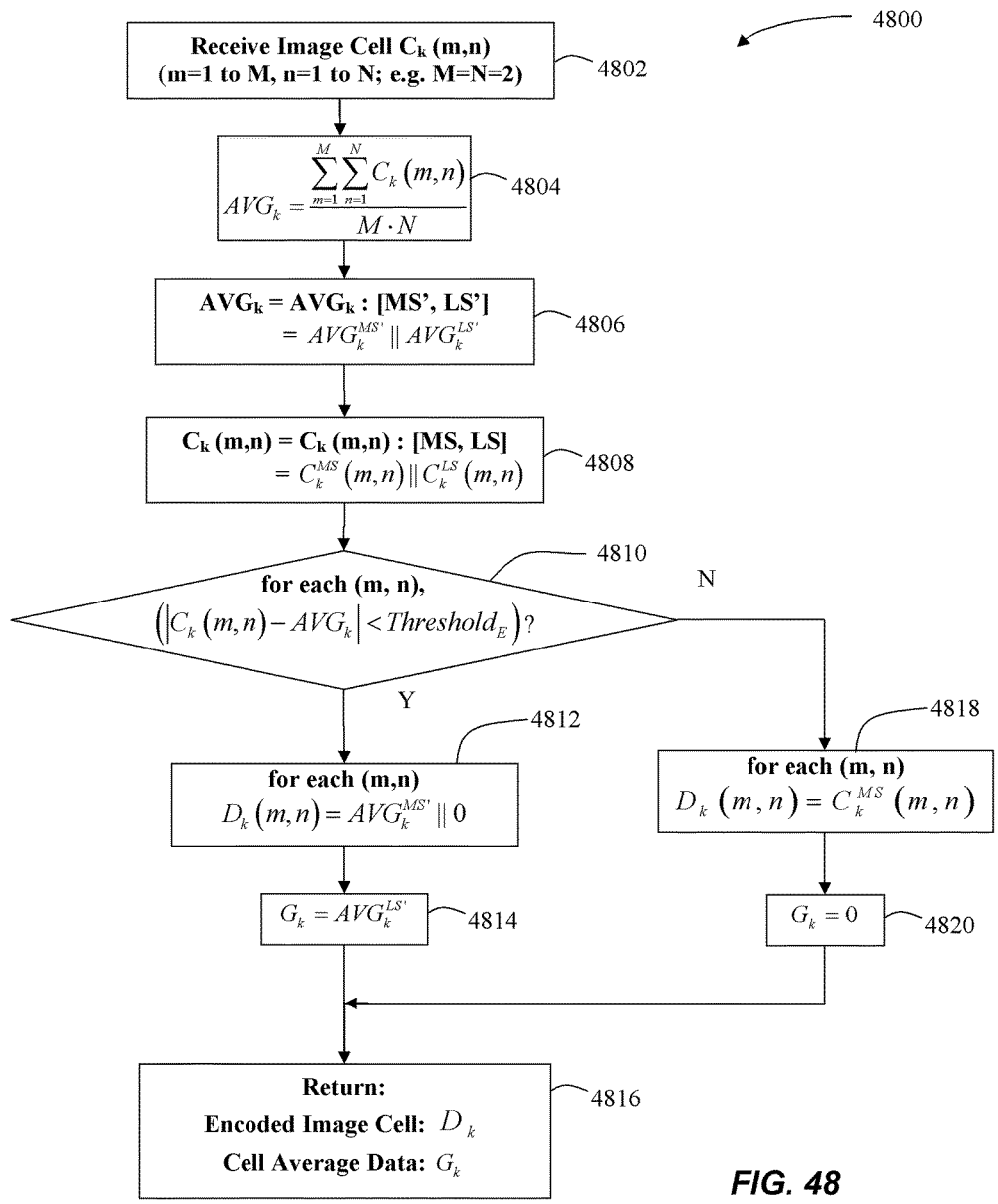
FIG. 48 illustrates a flow chart of a first embodiment of a relatively-lower-level portion of an image encoding process called from the process illustrated in FIG. 47 and carried out by the fourth aspect of the image encoding subsystem illustrated in FIG. 46.
Figure 49:
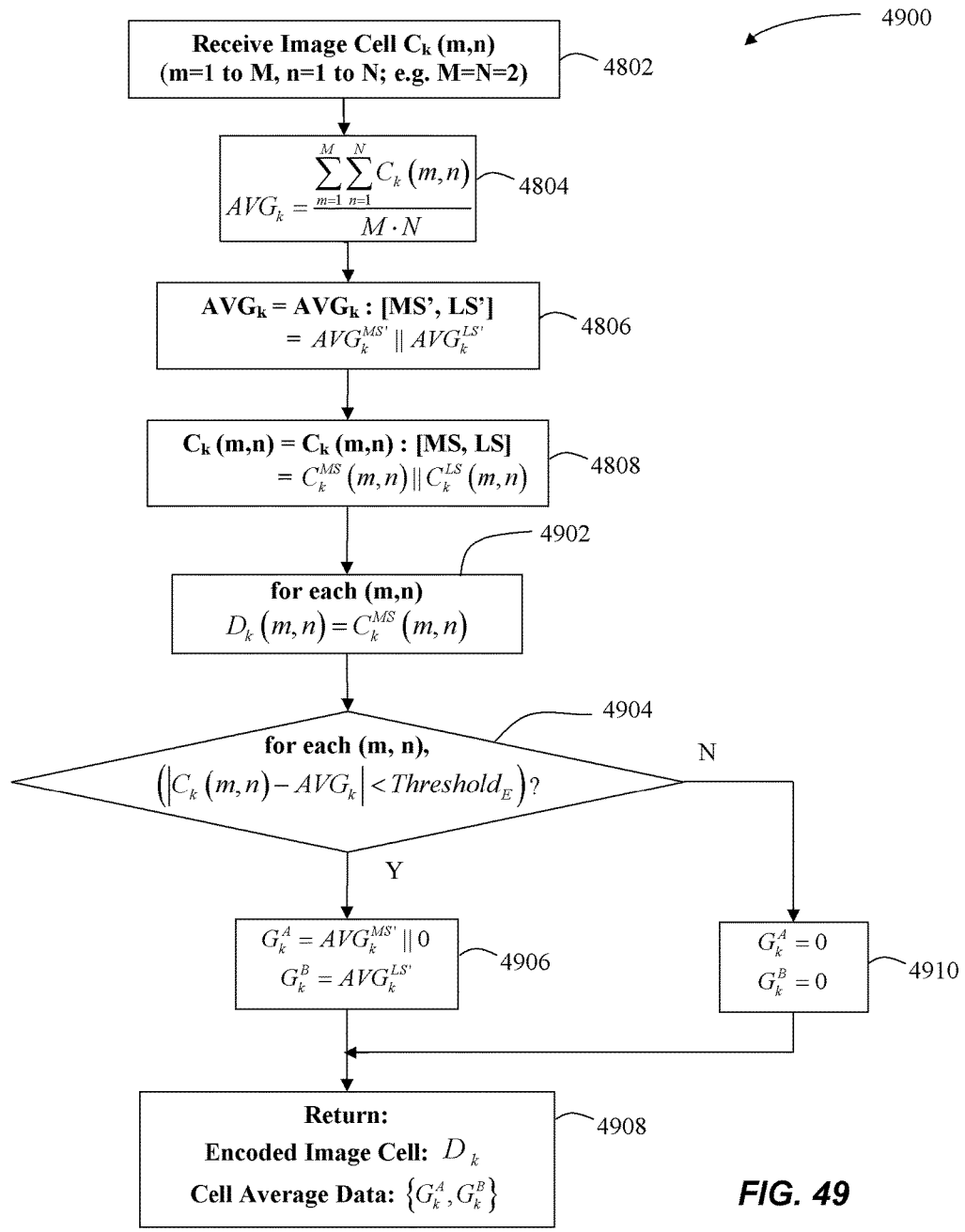
FIG. 49 illustrates a flow chart of a second embodiment of a relatively-lower-level portion of an image encoding process called from the process illustrated in FIG. 47 and carried out by the fourth aspect of the image encoding subsystem illustrated in FIG. 46.

In step (4702), the selected image cell 42, $C_k$ is encoded in accordance with an image encoding subprocess 4800, 4900, a first embodiment 4800 of which is illustrated in FIG. 48, a second embodiment 4900 of which is illustrated in FIG. 49.

From step (4702), in accordance with a first embodiment, referring to FIG. 48, the first embodiment of the image encoding subprocess 4800 commences with step (4802), with the receipt of the image cell 42, $C_k$ containing extended-color-precision values $C_k(m, n)$ for the color component R, G, or B being encoded. Then, in step (4804), an extended-color-precision cell average AVG of the values $C_k(m, n)$ of the image cell 42, $C_k$ is calculated by dividing the sum of the values $C_k(m, n)$ of all the elements of the image cell 42, $C_k$, i.e. $C_k(m, n)$ for m=1 to M and n=1 to N, by the number (M·N) of elements in the image cell 42, $C_k$.

Following step (4804), in step (4806), the extended-color-precision cell average AVG is partitioned into a most-significant portion MS', $AVG^{MS'}$ and a least significant portion LS', $AVG^{LS'}$ that are respectively $N_{MS'}$ bits in length and $N_{LS'}$ bits in length, wherein $N_{MS'}$ is the bit length of a most-significant portion of a legacy-color-precision color component value and sufficiently small so that that portion of a legacy-color-precision pixel P would NOT be substantially affected by the associated compression and decompression processes of the image compression 22 and image decompression 26 subsystems. For example, in one set of embodiments for a 12-bit extended color resolution, $N_{MS'}=4$ and $N_{LS'}=8$, so that $N_{LS'}$ is equal to the bit length of a legacy-color-precision color component value. Furthermore, in step (4808), each extended-color-precision value $C_k(m, n)$ is partitioned into a most-significant portion MS, $C_k^{MS}$ and a least significant portion LS, $C_k^{LS}$ each respectively $N_{MS}$ bits in length and $N_{LS}$ bits in length, wherein $N_{MS}$ is the bit length of a legacy-color-precision color component value, for example, $N_{MS}=8$.

Then, in step (4810), if each of the values $C_k(m, n)$ of the image cell 42, $C_k$ deviates from the extended-color-precision cell average AVG by no more than the above-described corresponding leveling threshold $Threshold_E$, then the associated image cell 42, $C_k$ is considered to correspond to a "selected cell", otherwise the associated image cell 42, $C_k$ is considered to NOT correspond to a "selected cell".

If, from step (4810), the image cell 42, $C_k$ is considered to correspond to a "selected cell", then, in step (4812), the upper $N_{MS'}$-bit most-significant portion of the value $D_k(m, n)$ of each element of the encoded image cell 58, $D_k$ is set equal to the most-significant portion MS', $AVG^{MS'}$ of the extended-color-precision cell average AVG, and the remaining least-significant portion of the value $D_k(m, n)$ of each element of the encoded image cell 58, $D_k$ is set equal to zero. Then, in step (4814), a corresponding cell average data value $G_k$ for the $k^{th}$ image cell 42, $C_k$ is set equal to the legacy-color precision least significant portion LS', $AVG^{LS'}$ of the extended-color-precision cell average AVG, after which, in step (4816), the encoded image cell 58, $D_k$ and the cell average data value $G_k$ are returned, thereby ending the image encoding subprocess 4800 and ending step (4702) of the image encoding process 4700.

Otherwise, from step (4810), if the image cell 42, $C_k$ is considered to NOT correspond to a "selected cell", then, in step (4818), each element $D_k(m, n)$ of the encoded image cell 58, $D_k$ is set equal to the most-significant portion MS of the corresponding element $C_k^{MS}(m, n)$ of the image cell 42, $C_k$. Then, in step (4820), a corresponding cell average data value $G_k$ for the $k^{th}$ image cell 42, $C_k$ is set equal to zero (or some other fixed indicating value) so as to subsequently indicate that the $k^{th}$ image cell 42, $C_k$ does NOT correspond to a "selected cell", after which the encoded image cell 58, $D_k$ and the cell average data value $G_k$ are returned, thereby ending the image encoding subprocess 4800 and ending step (4702) of the image encoding process 4700.

Alternatively, from step (4702), in accordance with a second embodiment, referring to FIG. 49, the second embodiment of the image encoding subprocess 4900 is the same as the above-described first embodiment of the image encoding subprocess 4800 illustrated in FIG. 48 in respect of above-described steps (4802) through (4808), and accordingly also commences with step (4802). Following step (4808), in step (4902), each element $D_k(m, n)$ of the encoded image cell 58, $D_k$ is set equal to the most-significant portion MS of the corresponding element $C_k^{MS}(m, n)$ of the image cell 42, $C_k$. Then, in step (4904), if each of the values $C_k(m, n)$ of the image cell 42, $C_k$ deviates from the extended-color-precision cell average AVG by no more than the above-described corresponding leveling threshold $Threshold_E$, then the associated image cell 42, $C_k$ is considered to correspond to a "selected cell", otherwise the associated image cell 42, $C_k$ is considered to NOT correspond to a "selected cell".

If, from step (4904), the image cell 42, $C_k$ is considered to correspond to a "selected cell", then, in step (4906), the upper $N_{MS'}$-bit most-significant portion of the value of a corresponding first cell average data value $G_k^A$ for the $k^{th}$ image cell 42, $C_k$ is set equal to the most-significant portion MS', $AVG^{MS'}$ of the extended-color-precision cell average AVG, and the remaining least-significant portion of the value of the first cell average data value $G_k^A$ is set equal to zero. Furthermore, a second cell average data value $G_k^B$ for the $k^{th}$ image cell 42, $C_k$ is set equal to the legacy-color precision least significant portion LS', $AVG^{LS'}$ of the extended-color-precision cell average AVG, after which, in step (4908), the encoded image cell 58, $D_k$ and the first $G_k^A$ and second $G_k^B$ cell average data values are returned, thereby ending the image encoding subprocess 4900 and ending step (4702) of the image encoding process 4700.

Otherwise, from step (4904), if the image cell 42, $C_k$ is considered to NOT correspond to a "selected cell", then, in step (4910), first $G_k^A$ and second $G_k^B$ cell average data value for the $k^{th}$ image cell 42, $C_k$ are each set to a value of zero (or some other fixed indicating value) so as to subsequently indicate that the $k^{th}$ image cell 42, $C_k$ does NOT correspond to a "selected cell", after which the encoded image cell 58, $D_k$ and the first $G_k^A$ and second $G_k^B$ cell average data values are returned, thereby ending the image encoding subprocess 4900 and ending step (4702) of the image encoding process 4700.

Returning to FIG. 47, following step (4702), in step (4704), the $k^{th}$ encoded image cell 58, $D_k$ for the currently selected color component R, G or B is stored in the corresponding portions of the corresponding encoded pixels 40, $P_E$ of the encoded image 16, and the corresponding cell average data $G_k$, $\{G_k^A, G_k^B\}$ for the currently selected color component R, G or B is stored in a corresponding cell-average-data array $H_R$, $H_G$ or $H_B$. Thereafter, the remaining steps of the image encoding process 4700 are the same as for the above-described image encoding process 600 illustrated in FIG. 6.

Figure 50:
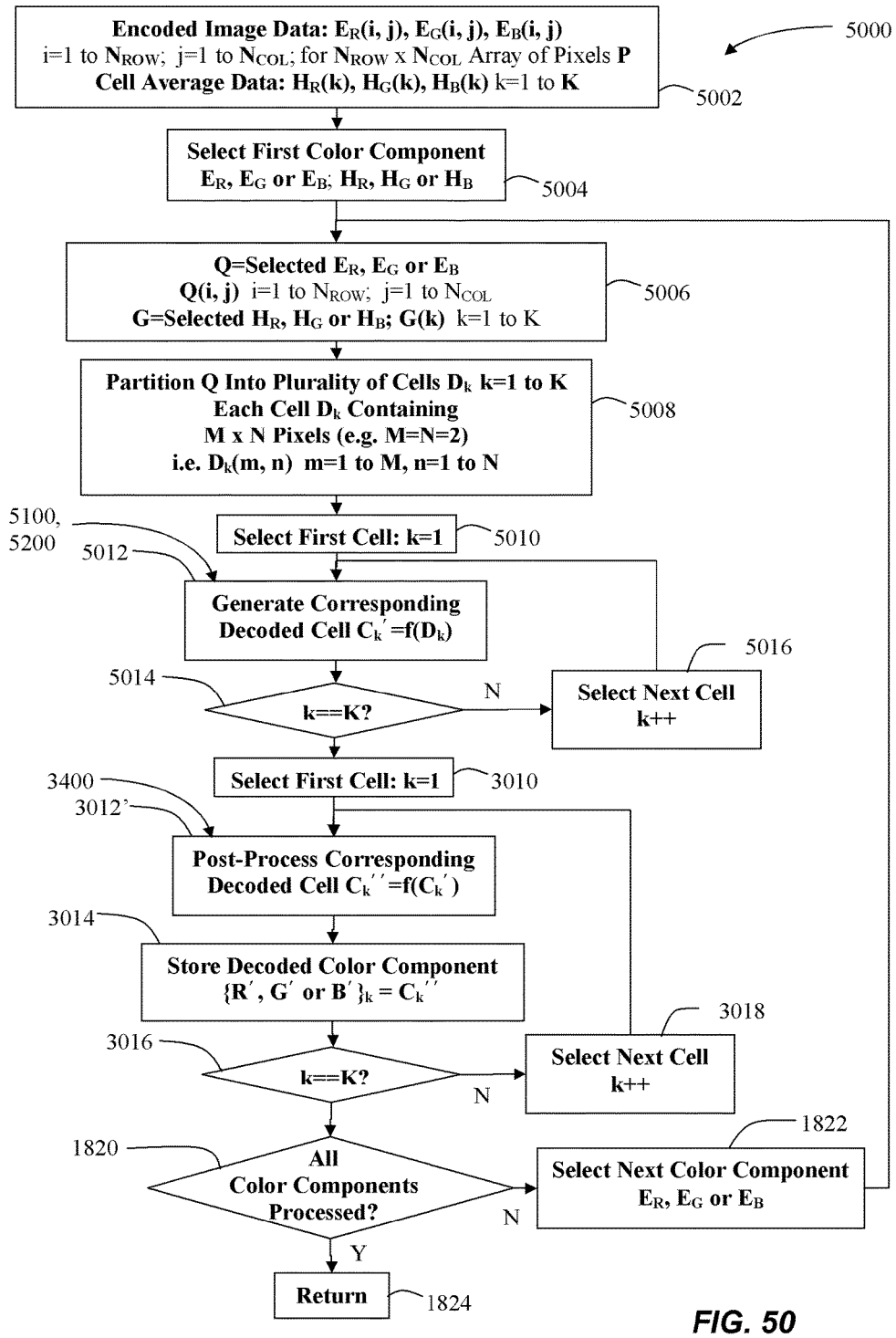
FIG. 50 illustrates a flow chart of a third aspect of a relatively-higher-level portion of an image decoding process carried out by the image decoding subsystem illustrated in FIG. 46.

Referring to FIG. 50, the image decoding subsystem 92 operates in accordance with a third aspect of an image decoding process 5000 that provides for transforming the legacy-color-precision encoded image 88, 88' in combination with the associated cell-average-data arrays $H_R$, $H_G$, $H_B$ into a decoded extended-color-precision image 28 that is suitable for display on, or use by, extended-color-precision image display or processing subsystem 30.

The third aspect of an image decoding process 5000 begins with step (5002), with input of an array of encoded pixels 40, $P_E$ of the legacy-color-precision encoded image 16, 16'—each encoded pixel 40, $P_E(i, j)$ comprising values for each of the three encoded color components $E_R(i, j)$, $E_G(i, j)$ and $E_B(i, j)$,—and input of the associated above-described cell-average-data arrays $H_R$, $H_G$, $H_B$. Then, in step (5004), the first of the three encoded color components $E_R$, $E_G$ and $E_B$ is selected, as is a corresponding first of the three corresponding cell-average-data arrays $H_R$, $H_G$, $H_B$. Then, in step (5006), the selected color component $E_R$, $E_G$ and $E_B$ is assigned to the corresponding selected-color-component array Q, and the selected cell-average-data array $H_R$, $H_G$, $H_B$ is assigned to the corresponding selected cell-average-data array G, the latter comprising an element $G_k$ or $\{G_k^A, G_k^B\}$ for each of the K image cells 42. Then, in step (5008), the selected-color-component array Q is partitioned into the plurality of encoded image cell 58, $D_k$—K in number—each encoded image cell 58, $D_k$ comprising an array of M rows and N columns with M×N elements, wherein the elements of the encoded image cell 58, $D_k$ are collectively in one-to-one correspondence with the elements Q(i, j) of the selected-color-component array Q. Then, in step (5010), the first encoded image cell 58, $D_k$ is selected for decoding, for example, by setting k=1.

Figure 51:
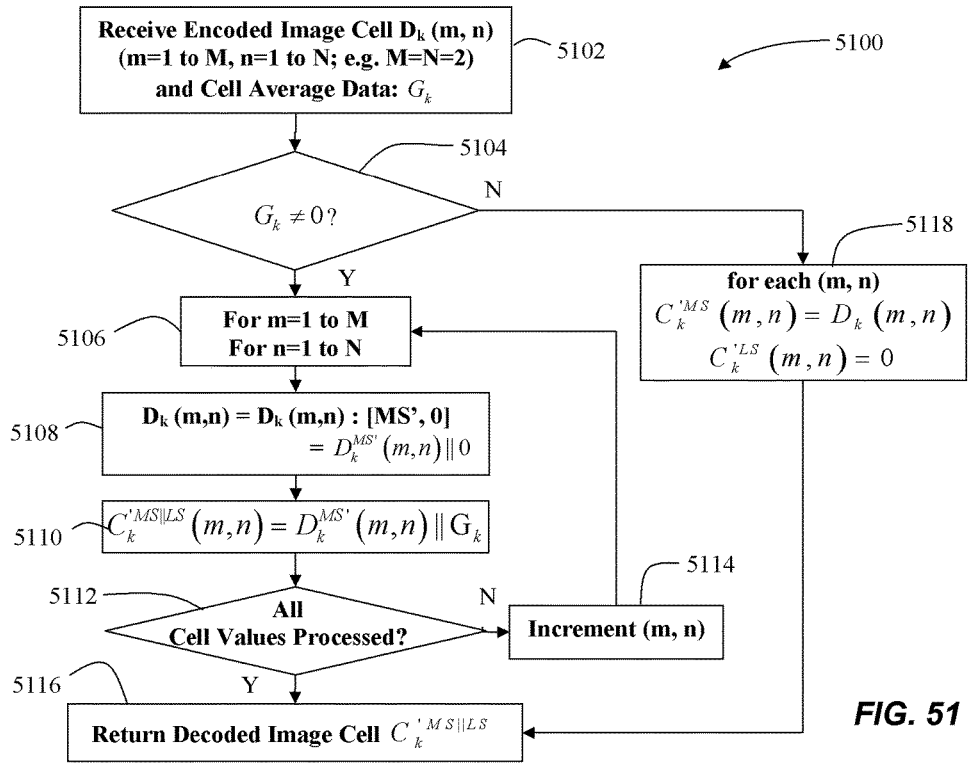
FIG. 51 illustrates a flow chart of a first embodiment of a third aspect of a relatively-lower-level portion of an image decoding process called from the process illustrated in FIG. 50 and carried out by the fourth aspect of the image decoding subsystem illustrated in FIG. 46.
Figure 52:
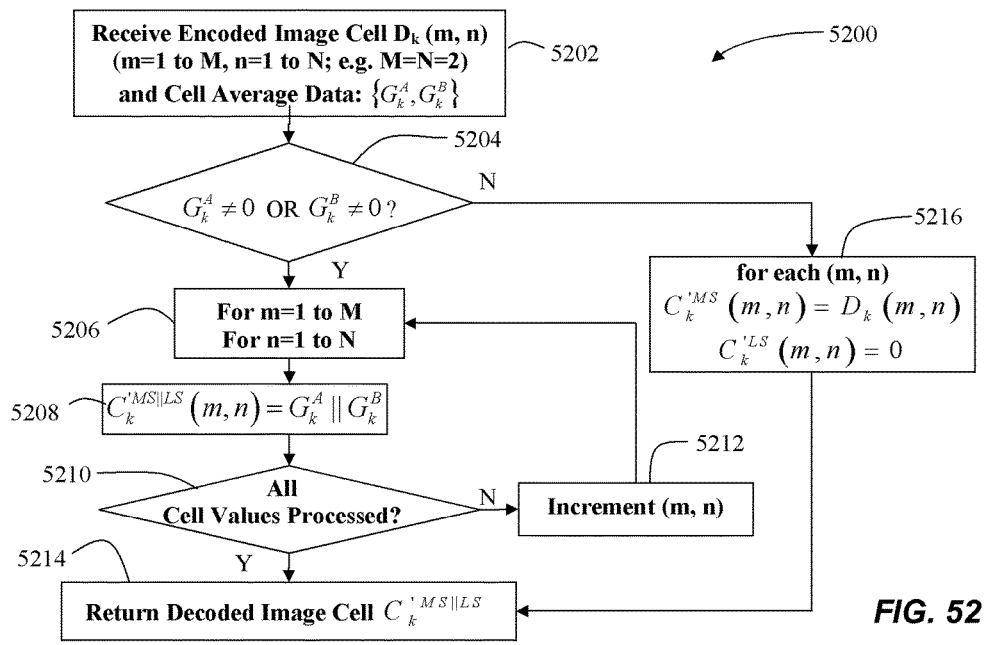
FIG. 52 illustrates a flow chart of a second embodiment of the third aspect of a relatively-lower-level portion of an image decoding process called from the process illustrated in FIG. 50 and carried out by the fourth aspect of the image decoding subsystem illustrated in FIG. 46.

In step (5012), the selected encoded image cell 58, $D_k$ is decoded in accordance with an associated image decoding subprocess 5100, 5200, a first embodiment 5100 of which is illustrated in FIG. 51, a second embodiment 5200 of which is illustrated in FIG. 52, wherein the first embodiment of the image decoding subprocess 5100 is used to decode a legacy-color-precision encoded image 88, 88' that had been encoded by the first embodiment of the image encoding subprocess 4800, and the second embodiment of the image decoding subprocess 5200 is used to decode a legacy-color-precision encoded image 88, 88' that had been encoded by the second embodiment of the image encoding subprocess 4900.

From step (5012), in accordance with the first embodiment, referring to FIG. 51 the first embodiment of the third aspect of an image decoding subprocess 5100 commences with step (5102), with the receipt of the encoded image cell 58, $D_k$ containing encoded legacy-color-precision values $D_k(m, n)$ for the color component R, G, or B being encoded, and receipt of the corresponding cell average data value $G_k$. In step (5104), the cell average data value $G_k$ is tested to determine whether or not the encoded image cell 58, $D_k$ corresponds to a "selected cell". If, in step (5104), the cell average data value $G_k$ is not equal to zero (or the associated fixed indicating value), then the encoded image cell 58, $D_k$ is considered to correspond to a "selected cell", so that the image decoding subprocess 5100 continues with step (5106); otherwise the associated encoded image cell 58, $D_k$ is NOT considered to correspond to a "selected cell" and the image decoding subprocess 2300 continues with step (5118).

If the result of step (5104) is TRUE, then, for each element of the encoded image cell 58, $D_k$ as selected by steps (5106), (5112) and (5114), in step (5108), the most-significant portion MS' of the value $D_k(m, n)$ of the selected element of the encoded image cell 58, $D_k$—i.e. the most-significant $N_{MS'}$ bits thereof (e.g. 4 bits)—are extracted from the value $D_k(m, n)$, and, in step (5110), the value of the corresponding element $C'^{MS\|LS}_k(m, n)$ of the corresponding decoded image cell 64, $C'_k$ is set equal to a concatenation of the most-significant portion MS' of the value $D_k(m, n)$ of the selected element of the encoded image cell 58, $D_k$ and the cell average data value $G_k$, the latter of which forms the least-significant portion LS, $C^{LS}_k$ of the decoded image cell 64, $C'_k$. Then, from step (5112), after all elements of the encoded image cell 58, $D_k$ have been processed in steps (5108) and (5110), then in step (5116), the values of the decoded image cell 64, $C'_k$ are returned, thereby ending the image decoding subprocess 5100 and ending step (5012) of the image decoding process 5000.

Otherwise, from step (5104), if the cell average data value $G_k$ is equal to zero indicating that the encoded image cell 58, $D_k$ is considered to NOT correspond to a "selected cell", then, in step (5118), for each element $C'_k(m, n)$ of the decoded image cell 64, $C'_k$, the most-significant portion $C'^{MS}_k(m, n)$ thereof is set equal to the value of the corresponding element $D_k(m, n)$ of the encoded image cell 58, $D_k$, and the least-significant portion $C^{LS}_k(m, n)$ thereof is set equal to zero (or some other value that is constant for each element $C'_k(m, n)$ of the decoded image cell 64, $C'_k$), after which, in step (5116), the values of the decoded image cell 64, $C'_k$ are returned, thereby ending the image decoding subprocess 5100 and ending step (5012) of the image decoding process 5000.

Alternatively, from step (5012), in accordance with the second embodiment, referring to FIG. 52 the second embodiment of the third aspect of an image decoding subprocess 5200 commences with step (5202), with the receipt of the encoded image cell 58, $D_k$ containing encoded legacy-color-precision values $D_k(m, n)$ for the color component R, G, or B being encoded, and receipt of the corresponding cell average data $\{G^A_k, G^B_k\}$. In step (5204), the first $G^A_k$ and second GB cell average data values are tested to determine whether or not the encoded image cell 58, $D_k$ corresponds to a "selected cell". If, in step (5204), either of the first $G^A_k$ and second GB cell average data values is not equal to zero (or the associated fixed indicating value), then the encoded image cell 58, $D_k$ is considered to correspond to a "selected cell" and the image decoding subprocess 5200 continues with step (5206); otherwise the associated encoded image cell 58, $D_k$ is NOT considered to correspond to a "selected cell" and the image decoding subprocess 2300 continues with step (5216).

If the result of step (5204) is TRUE, then, for each element of the encoded image cell 58, $D_k$ as selected by steps (5206), (5210) and (5212), in step (5208), the value of the corresponding element $C'^{MS\|LS}_k(m, n)$ of the corresponding decoded image cell 64, $C'_k$ is set equal to a concatenation of the first $G^A_k$ and second $G^B_k$ cell average data values, the latter of which forms the least-significant portion LS, $C^{LS}_k$ of the decoded image cell 64, $C'_k$. Then, from step (5210), after all elements of the encoded image cell 58, $D_k$ have been processed in step (5208), then in step (5214), the values of the decoded image cell 64, $C'_k$ are returned, thereby ending the image decoding subprocess 5200 and ending step (5012) of the image decoding process 5000.

Otherwise, from step (5204), if the cell average data value $G_k$ is equal to zero indicating that the encoded image cell 58, $D_k$ is considered to NOT correspond to a "selected cell", then, in step (5216), for each element $C'_k(m, n)$ of the decoded image cell 64, $C'_k$, the most-significant portion $C'^{MS}_k(m, n)$ thereof is set equal to the value of the corresponding element $D_k(m, n)$ of the encoded image cell 58, $D_k$, and the least-significant portion $C^{LS}_k(m, n)$ thereof is set equal to zero (or some other value that is constant for each element $C'_k(m, n)$ of the decoded image cell 64, $C'_k$), after which, in step (5214), the values of the decoded image cell 64, $C'_k$ are returned, thereby ending the image decoding subprocess 5200 and ending step (5012) of the image decoding process 5000.

Referring again to FIG. 50, following step (5012), steps (5014) and (5016) provide for repeating step (5012) until all encoded image cells 58, $D_k$ have been decoded, after which the remaining steps beginning with step (3010) are the same as described hereinabove for the image decoding process 3000' illustrated in FIG. 32, with the exception of step (3012') being optional.

Although the image encoding and decoding processes are disclosed herein in the context of supporting the communication of video images, it should be understood that the same processes can also be applied to still images or, in general, any image content made up of one or more frames of pixel values representing a first color space and having a corresponding one or more frames of pixels representing a second color space.

While specific embodiments have been described in detail in the foregoing detailed description and illustrated in the accompanying drawings, those with ordinary skill in the art will appreciate that various modifications and alternatives to those details could be developed in light of the overall teachings of the disclosure, including, but not limited to, modifications to cell shapes and sizes; modifications of spatial energy dithering patterns; modifications to truncation or rounding operations during the encoding process to lower bit-depth; modifications to cell selection criteria during either or both stages of encoding or decoding, especially for accommodation of computational error, compression error and noise; modifications to energy leveling thresholds, and modifications to the blending of cell pixels.

It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the' or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of any claims that are supported by the above description and drawings, and any and all equivalents thereof.

What is claimed is:

1. A method of encoding a digitized image, comprising:
   a. selecting a subset of image pixels of an image cell of a first digitized image, wherein said subset of image pixels contains a plurality of image pixels;
   b. selecting a color component to be encoded;
   c. encoding said plurality of image pixels of said image cell so as to generate a corresponding color component corresponding to the selected color component for each encoded image pixel of a plurality of encoded image pixels of a corresponding encoded image cell, wherein said plurality of encoded image pixels are in one-to-one correspondence with said plurality of image pixels of said image cell, a bit length of each image pixel of said plurality of image pixels of said color component of said image cell exceeds a bit length of each said encoded image pixel of said corresponding color component of said corresponding encoded image cell, said corresponding encoded image cell can be subsequently decoded so as to generate a corresponding decoded image cell containing a plurality of decoded image pixels in one-to-one correspondence with said plurality of image pixels of said image cell, and when said corresponding encoded image cell is subsequently decoded:
   i. each decoded image pixel of said corresponding decoded image cell contains a corresponding color component corresponding to said selected color component;
   ii. a bit length of each said decoded image pixel of said corresponding color component of said corresponding decoded image cell is the same as said bit length of each said image pixel of said color component of said image cell; and
   iii. said corresponding decoded image cell contains extended color information in excess of corresponding base color information contained in the corresponding most significant portions of said plurality of image pixels of said image cell for said selected color component, wherein a bit length of each of said corresponding most significant portions is the same as said bit length of each said encoded image pixel of said corresponding color component of said corresponding encoded image cell.

2. A method of encoding a digitized image as recited in claim 1, wherein the operation of encoding said plurality of image pixels of said image cell comprises:
   a. calculating an image-cell energy responsive to a sum of a corresponding plurality of values of said selected color component from each image pixel of said plurality of image pixels of said image cell;
   b. identifying a dither pattern responsive to said image-cell energy, wherein said dither pattern comprises a plurality of binary elements in one-to-one correspondence with said plurality of image pixels of said image cell, each said binary-valued dither-pattern element of said dither pattern has either a first value or a second value, a count of a subset of said plurality of binary-valued dither-pattern elements each having said first value is directly related to said image-cell energy, and a permutation of said binary-valued dither-pattern elements of said dither pattern is responsive to said image-cell energy; and
   c. encoding each value of said plurality of values of said selected color component responsive to said dither pattern so as to generate a corresponding plurality of encoded values, wherein if a corresponding binary-valued dither-pattern element of said dither pattern has said first value, then a corresponding encoded value of said plurality of encoded values is generated as a most-significant portion of a corresponding value of said plurality of values of said selected color component, otherwise if said corresponding binary-valued dither-pattern element of said dither pattern has said second value, then a corresponding encoded value of said plurality of encoded values is generated as a most-significant portion of a corresponding value of said plurality of values of said selected color component incremented by one, wherein a bit length of said most significant portion is less than a corresponding bit length of said value of said selected color component.

3. A method of encoding a digitized image as recited in claim 2, wherein if each value of said selected color component differs from an average of values of said selected color component from each image pixel of said plurality of image pixels of said image cell, by no more than a threshold value for every image pixel of said plurality of image pixels of said image cell, then each said corresponding encoded value of said plurality of encoded values is generated as a most-significant portion of a corresponding value of said plurality of values of said selected color component regardless of the value of said corresponding binary-valued dither-pattern element of said dither pattern.

4. A method of encoding a digitized image as recited in claim 2, wherein steps a-c are repeated for a plurality of different said image cells spanning at least a substantial portion of said first digitized image so as to generate a corresponding encoded digitized image from said plurality of encoded values associate with said plurality of different said image cells.

5. A method of encoding a digitized image as recited in claim 4, further comprising:
   a. forming a corresponding second digitized image from said first digitized image with respect to a second color space, wherein each color value of said second digitized image has a second resolution, said first digitized image is with respect to a first color space, each said selected color value of said first digitized image has a first resolution, a bit length associated with said second resolution is less than a bit length associated with said first resolution, and except for differences in resolution and color space, said first and second digitized images otherwise have the same image content,
   b. forming an encoded difference image responsive to a linear combination of said encoded image and said second digitized image, wherein each color value of said encoded difference image has said second resolution, and said encoded difference image provides, in cooperation with said second digitized image or a representation thereof, for recovering said first digitized image.

6. A method of encoding a digitized image as recited in claim 4, further comprising forming a corresponding second digitized image from a third digitized image with respect to a second color space, wherein each color value of said second digitized image has a second resolution, said third digitized image is with respect to a first color space, each said selected color value of said third digitized image has a first resolution, a bit length associated with said second resolution is less than a bit length associated with said first resolution, and said first digitized image is formed as an encoded difference image responsive to a linear combination of said third digitized image and a corresponding second digitized image, each color value of said second digitized image is binary shifted to correspond in magnitude to corresponding color values of said third digitized image when forming said linear combination, and each color value of said difference image has said first resolution, and except for differences in resolution and color space, said third and second digitized images otherwise have the same image content, each color value of said encoded difference image has said second resolution, and said encoded difference image provides, in cooperation with said second digitized image or a representation thereof, for recovering said third digitized image.

7. A method of encoding a digitized image as recited in claim 5, further comprising transforming the color space of said second digitized image so as to more closely match said first color space prior to the operation of forming said encoded difference image.

8. A method of encoding a digitized image as recited in claim 6, wherein the color space of said second digitized image is transformed so as to more closely match said first color space prior to the operation of forming said encoded difference image.

9. A method of encoding a digitized image as recited in claim 5, wherein said linear combination is responsive to a combination of like color components from said second and third digitized images.

10. A method of encoding a digitized image as recited in claim 5, wherein said linear combination is responsive to a combination of different color components from said second and third digitized images.

11. A method of encoding a digitized image as recited in claim 6, wherein said linear combination is responsive to a combination of like color components from said encoded image and said second digitized image.

12. A method of encoding a digitized image as recited in claim 6, wherein said linear combination is responsive to a combination of different color components from said encoded image and said second digitized image.

13. A method of encoding a digitized image as recited in claim 1, wherein the operation of encoding said plurality of image pixels of said image cell comprises:
   a. determining a cell average value, wherein said cell average value is calculated as an average of values of said selected color component from each image pixel of said plurality of image pixels of said image cell; and
   b. if each value of said selected color component differs from said cell average value for every image pixel of said plurality of image pixels of said image cell, then a corresponding set of encoded values for said selected color component for each of said plurality of image pixels if generated responsive to a first set of encoding operations, otherwise said corresponding set of encoded values for said selected color component for each of a corresponding plurality of encoded image pixels is generated responsive to a second set of encoding operations, wherein said first set of encoding operations comprises:
      i. storing a least significant portion of said cell average value as a cell average value element associated with said image cell; and
      ii. for each image pixel of said image cell, setting a most significant portion of each corresponding encoded value to the value of a most significant portion of said cell average value, and a setting a remaining portion of each said encoded value of said plurality of encoded values to zero, wherein a sum of bit lengths of said most-significant and least-significant portions of said cell average value is equal to a bit length of said cell average value; and
   c. said second set of decoding operations comprises:
      i. setting said cell average value element associated with said image cell to a fixed indicating value; and
      ii. for each encoded image pixel of said image cell, setting each corresponding encoded value to the value of a most-significant portion of a corresponding value of a corresponding image pixel of said plurality of image pixels of said image cell, wherein the bit length of said most-significant portion of said cell average value is independent of a bit length of said most-significant portion of said corresponding value of said corresponding image pixel of said plurality of image pixels of said image cell, and said bit length said most-significant portion of said corresponding value of said corresponding image pixel of said plurality of image pixels of said image cell is equal to the bit length of each encoded value of said plurality of encoded values.

14. A method of encoding a digitized image as recited in claim 13, wherein said fixed indicating value is equal to zero.

15. A method of encoding a digitized image as recited in claim 13, wherein said bit length of said most-significant portion of said cell average value is sufficiently small so as to substantially reduce the effects of data compression and decompression on said plurality of encoded values when said encoded values are transmitted over a communications channel.

16. A method of encoding a digitized image as recited in claim 1, wherein the operation of encoding said plurality of image pixels of said image cell comprises:
  a. determining a cell average value, wherein said cell average value is calculated as an average of values of said selected color component from each image pixel of said plurality of image pixels of said image cell; and for each image pixel of said image cell, each corresponding encoded value to the value of a most-significant portion of a corresponding value of a corresponding image pixel of said plurality of image pixels of said image cell;
  b. if each value of said selected color component differs from said cell average value for every image pixel of said plurality of image pixels of said image cell, then a corresponding set of encoded values for said selected color component for each of said plurality of image pixels if generated responsive to a first set of encoding operations, otherwise said corresponding set of encoded values for said selected color component for each of a corresponding plurality of encoded image pixels is generated responsive to a second set of encoding operations, wherein said first set of encoding operations comprises:
    i. storing a most significant portion of said cell average value as most-significant portion of a first cell average value element associated with said image cell;
    ii. setting a remaining portion, if any, of said first cell average value element, to zero; and
    iii. storing a least significant portion of said cell average value as a second cell average value element associated with said image cell; wherein a sum of bit lengths of said most-significant and least-significant portions of said cell average value is equal to a bit length of said cell average value; and
  c. said second set of decoding operations comprises:
    i. setting said first and second cell average value elements each to a fixed indicating value, wherein the bit length of said most-significant portion of said cell average value is independent of a bit length of said most-significant portion of said corresponding value of said corresponding image pixel of said plurality of image pixels of said image cell, and
    ii. said bit length said most-significant portion of said corresponding value of said corresponding image pixel of said plurality of image pixels of said image cell is equal to the bit length of each encoded value of said plurality of encoded values.

17. A method of encoding a digitized image as recited in claim 16, wherein said fixed indicating value is equal to zero.

* * * * *